(12) United States Patent
Devenney et al.

(10) Patent No.: US 9,133,581 B2
(45) Date of Patent: Sep. 15, 2015

(54) NON-CEMENTITIOUS COMPOSITIONS COMPRISING VATERITE AND METHODS THEREOF

(71) Applicant: CALERA CORPORATION, Los Gatos, CA (US)

(72) Inventors: Martin Devenney, Mountain View, CA (US); Miguel Fernandez, San Jose, CA (US); Samuel O Morgan, San Jose, CA (US)

(73) Assignee: Calera Corporation, Los Gatos, CA (US)

( * ) Notice: Subject to any disclaimer, the term of this patent is extended or adjusted under 35 U.S.C. 154(b) by 3 days.

(21) Appl. No.: 13/804,558

(22) Filed: Mar. 14, 2013

(65) Prior Publication Data

US 2013/0192783 A1 Aug. 1, 2013

Related U.S. Application Data

(60) Continuation-in-part of application No. 13/153,815, filed on Jun. 6, 2011, now abandoned, which is a continuation of application No. 12/790,317, filed on May 28, 2010, now abandoned, which is a division of (Continued)

(51) Int. Cl.
| | |
|---|---|
| *B01D 53/73* | (2006.01) |
| *B01D 53/62* | (2006.01) |
| *B01D 53/78* | (2006.01) |
| *B01D 53/80* | (2006.01) |
| *D21H 17/66* | (2006.01) |
| *C08K 3/26* | (2006.01) |
| *C04B 28/10* | (2006.01) |
| *C01B 31/24* | (2006.01) |

(52) U.S. Cl.
CPC .............. *D21H 17/66* (2013.01); *C01B 31/24* (2013.01); *C04B 28/10* (2013.01); *C08K 3/26* (2013.01); *Y02W 30/97* (2015.05)

(58) Field of Classification Search
None
See application file for complete search history.

(56) References Cited

U.S. PATENT DOCUMENTS

| | | | |
|---|---|---|---|
| 1,169,766 | A | 2/1916 | Brassert |
| 1,172,930 | A | 2/1916 | Brassert et al. |
| 1,176,747 | A | 3/1916 | Ferguson |
| 1,493,579 | A | 5/1924 | Walter |

(Continued)

FOREIGN PATENT DOCUMENTS

| | | |
|---|---|---|
| AU | 2001213118 B2 | 12/2001 |
| AU | 2007100157 A4 | 4/2007 |

(Continued)

OTHER PUBLICATIONS

"Carbide Lime Slurry." Gilmour Lime.com, available online as of Jan. 12, 2005. Viewed on Nov. 25, 2014 at https://web.archive.org/web/20050112034830/http://www.gilmourlime.com/carbide_lime.html.*

(Continued)

*Primary Examiner* — Stuart Hendrickson
*Assistant Examiner* — Daniel Berns
(74) *Attorney, Agent, or Firm* — Calera Corporation; Vandana Bansal

(57) ABSTRACT

Non-cementitious compositions and products are provided. The compositions of the invention include a carbonate additive comprising vaterite such as reactive vaterite. Additional aspects of the invention include methods of making and using the non-cementitious compositions and products.

13 Claims, 5 Drawing Sheets

Related U.S. Application Data application No. 12/609,491, filed on Oct. 30, 2009, now Pat. No. 7,829,053.

(60) Provisional application No. 61/110,495, filed on Oct. 31, 2008, provisional application No. 61/149,949, filed on Feb. 4, 2009, provisional application No. 61/181,250, filed on May 26, 2009, provisional application No. 61/642,281, filed on May 3, 2012, provisional application No. 61/649,725, filed on May 21, 2012.

(56) References Cited

U.S. PATENT DOCUMENTS

| | | |
|---|---|---|
| 1,543,942 A | 6/1925 | Mathesius |
| 1,655,171 A | 1/1928 | Wagner |
| 1,678,345 A | 7/1928 | Mattison |
| 1,759,361 A | 5/1930 | Miller |
| 1,785,365 A | 12/1930 | Seil |
| 1,823,269 A | 9/1931 | Grilli |
| 1,865,833 A | 7/1932 | Chesny |
| 1,897,725 A | 2/1933 | Gaus et al. |
| 1,924,503 A | 8/1933 | Lambert |
| 1,986,736 A | 1/1935 | Mauthe et al. |
| 2,006,295 A | 6/1935 | Chewning et al. |
| 2,054,315 A | 9/1936 | Ebner et al. |
| 2,082,101 A | 6/1937 | Dougherty |
| 2,204,771 A | 6/1940 | Rice et al. |
| 2,227,465 A | 1/1941 | Roche, Jr. et al. |
| 2,241,674 A | 5/1941 | Mohr, Jr. et al. |
| 2,242,294 A | 5/1941 | Fox et al. |
| 2,304,391 A | 12/1942 | Zimmerman |
| 2,329,940 A | 9/1943 | Ponzer |
| 2,383,674 A | 8/1945 | Osborne |
| 2,458,039 A | 1/1949 | Wait |
| 2,606,839 A | 8/1952 | Evans |
| 2,810,450 A | 10/1957 | Hartmann |
| 2,934,419 A | 4/1960 | Cook |
| 2,967,807 A | 1/1961 | Osborne et al. |
| 3,024,195 A | 3/1962 | Drummond et al. |
| 3,024,237 A | 3/1962 | Drummond et al. |
| 3,046,152 A | 7/1962 | Tsuneyoshi |
| 3,087,936 A | 4/1963 | Le Suer |
| 3,120,426 A | 2/1964 | Crawford, Jr. |
| 3,154,560 A | 10/1964 | Osuch |
| 3,165,460 A | 1/1965 | Zang et al. |
| 3,172,892 A | 3/1965 | Le Suer et al. |
| 3,179,579 A | 4/1965 | Gustave et al. |
| 3,196,092 A | 7/1965 | Beer |
| 3,202,522 A | 8/1965 | Yang et al. |
| 3,202,678 A | 8/1965 | Stuart et al. |
| 3,216,936 A | 11/1965 | Le Suer |
| 3,219,666 A | 11/1965 | Norman et al. |
| 3,254,025 A | 5/1966 | Le Suer |
| 3,262,865 A | 7/1966 | Waters, Jr. |
| 3,264,125 A | 8/1966 | Bourlin et al. |
| 3,322,574 A | 5/1967 | Justi et al. |
| 3,340,003 A | 9/1967 | Judd |
| 3,350,292 A | 10/1967 | Weinberger et al. |
| 3,374,164 A | 3/1968 | Balej et al. |
| 3,420,775 A | 1/1969 | Cadwallader |
| 3,442,808 A | 5/1969 | Traise et al. |
| 3,463,814 A | 8/1969 | Blanco et al. |
| 3,466,169 A | 9/1969 | Nowak et al. |
| 3,471,999 A | 10/1969 | Schon |
| 3,511,595 A | 5/1970 | Fuchs |
| 3,511,712 A | 5/1970 | Giner |
| 3,525,675 A | 8/1970 | Gaudin |
| 3,558,769 A | 1/1971 | Globus |
| 3,574,530 A | 4/1971 | Suriani et al. |
| 3,627,479 A | 12/1971 | Yee |
| 3,627,480 A | 12/1971 | Birchall |
| 3,630,762 A | 12/1971 | Olton et al. |
| 3,663,379 A | 5/1972 | Kendall |
| 3,686,372 A | 8/1972 | Hiatt et al. |
| 3,721,621 A | 3/1973 | Hough |
| 3,725,267 A | 4/1973 | Gelblum |
| 3,733,788 A | 5/1973 | Crowley |
| 3,816,592 A | 6/1974 | Rinaldi et al. |
| 3,834,129 A | 9/1974 | Darlinger et al. |
| 3,847,632 A | 11/1974 | Blengsli |
| 3,861,928 A | 1/1975 | Slater et al. |
| 3,864,236 A | 2/1975 | Lindstrom |
| 3,904,496 A | 9/1975 | Harke et al. |
| 3,907,526 A | 9/1975 | Saleem et al. |
| 3,912,801 A | 10/1975 | Stephens |
| 3,917,795 A | 11/1975 | Pelczarski et al. |
| 3,925,534 A | 12/1975 | Singleton et al. |
| 3,953,568 A | 4/1976 | Seko et al. |
| 3,959,419 A | 5/1976 | Kitterman |
| 3,963,592 A | 6/1976 | Lindstrom |
| 3,970,528 A | 7/1976 | Zirngiebl et al. |
| 3,975,503 A | 8/1976 | Hauschild et al. |
| 3,997,303 A | 12/1976 | Newton |
| 4,000,991 A | 1/1977 | Melin, Jr. et al. |
| 4,002,721 A | 1/1977 | Guffy et al. |
| 4,026,716 A | 5/1977 | Urschel, III et al. |
| 4,036,749 A | 7/1977 | Anderson |
| 4,045,524 A | 8/1977 | Bornert |
| 4,069,063 A | 1/1978 | Ball |
| 4,080,270 A | 3/1978 | O'Leary et al. |
| 4,106,296 A | 8/1978 | Leonard, Jr. et al. |
| 4,107,022 A | 8/1978 | Strempel et al. |
| 4,117,060 A | 9/1978 | Murray |
| 4,128,462 A | 12/1978 | Ghiringhelli et al. |
| 4,140,510 A | 2/1979 | Scholze et al. |
| 4,147,599 A | 4/1979 | O'Leary et al. |
| 4,157,250 A | 6/1979 | Regehr et al. |
| 4,164,537 A | 8/1979 | Drostholm et al. |
| 4,188,291 A | 2/1980 | Anderson |
| 4,217,186 A | 8/1980 | McRae |
| 4,219,396 A | 8/1980 | Gancy et al. |
| 4,242,185 A | 12/1980 | McRae |
| 4,246,075 A | 1/1981 | Hilbertz |
| 4,253,922 A | 3/1981 | Welch |
| 4,263,021 A | 4/1981 | Downs et al. |
| 4,264,367 A | 4/1981 | Schutz |
| 4,303,549 A | 12/1981 | Boylan |
| 4,307,066 A | 12/1981 | Davidson |
| 4,308,298 A | 12/1981 | Chen |
| 4,312,646 A | 1/1982 | Fattinger et al. |
| 4,315,872 A | 2/1982 | Senjo et al. |
| 4,335,788 A | 6/1982 | Murphey et al. |
| 4,337,230 A | 6/1982 | Ellestad et al. |
| 4,340,572 A | 7/1982 | Ben-Shmuel et al. |
| 4,361,475 A | 11/1982 | Moeglich |
| 4,363,667 A | 12/1982 | Birchall |
| 4,370,307 A | 1/1983 | Judd |
| 4,376,101 A | 3/1983 | Sartori et al. |
| 4,377,554 A | 3/1983 | Johnson |
| 4,410,606 A | 10/1983 | Loutfy et al. |
| 4,450,009 A | 5/1984 | Childs et al. |
| 4,477,573 A | 10/1984 | Taufen |
| 4,508,545 A | 4/1985 | DeLoach |
| 4,561,945 A | 12/1985 | Coker et al. |
| 4,588,443 A | 5/1986 | Bache |
| 4,620,969 A | 11/1986 | Wilkinson |
| 4,634,533 A | 1/1987 | Somerville et al. |
| 4,670,234 A | 6/1987 | Holter et al. |
| 4,716,027 A | 12/1987 | Morrison |
| 4,738,695 A | 4/1988 | Carr et al. |
| 4,804,449 A | 2/1989 | Sweeney |
| 4,818,367 A | 4/1989 | Winkler |
| 4,838,941 A | 6/1989 | Hill |
| 4,852,344 A | 8/1989 | Warner |
| 4,880,447 A | 11/1989 | Bloch |
| 4,899,544 A | 2/1990 | Boyd |
| 4,915,877 A | 4/1990 | Shepherd |
| 4,915,914 A | 4/1990 | Morrison |
| 4,931,264 A | 6/1990 | Rochelle et al. |
| 5,037,286 A | 8/1991 | Roberts |
| 5,100,633 A | 3/1992 | Morrison |
| 5,127,765 A | 7/1992 | Millgard et al. |

(56) References Cited

U.S. PATENT DOCUMENTS

| | | |
|---|---|---|
| 5,141,620 A | 8/1992 | Molter |
| 5,230,734 A | 7/1993 | Kumasaka et al. |
| 5,244,304 A | 9/1993 | Weill et al. |
| 5,246,551 A | 9/1993 | Pletcher et al. |
| 5,262,006 A | 11/1993 | Andersson et al. |
| 5,275,794 A | 1/1994 | Luna |
| 5,282,935 A | 2/1994 | Cawlfield et al. |
| 5,288,784 A | 2/1994 | Minayoshi |
| 5,318,758 A | 6/1994 | Fujii et al. |
| 5,348,712 A | 9/1994 | Marquis et al. |
| 5,362,688 A | 11/1994 | Porta et al. |
| 5,364,611 A | 11/1994 | Iijima et al. |
| 5,366,513 A | 11/1994 | Goldmann et al. |
| 5,376,343 A | 12/1994 | Fouche |
| 5,378,279 A | 1/1995 | Conroy |
| 5,388,456 A | 2/1995 | Kettel |
| 5,427,608 A | 6/1995 | Auer et al. |
| 5,439,509 A | 8/1995 | Spink et al. |
| 5,455,013 A | 10/1995 | Shibata et al. |
| 5,470,671 A | 11/1995 | Fletcher et al. |
| 5,520,898 A | 5/1996 | Pinnavaia et al. |
| 5,531,821 A | 7/1996 | Wu |
| 5,531,865 A | 7/1996 | Cole |
| 5,536,310 A | 7/1996 | Brook et al. |
| 5,547,027 A | 8/1996 | Chan et al. |
| 5,569,558 A | 10/1996 | Takeuchi et al. |
| 5,584,923 A | 12/1996 | Wu |
| 5,584,926 A | 12/1996 | Borgholm et al. |
| 5,595,641 A | 1/1997 | Traini et al. |
| 5,614,078 A | 3/1997 | Lubin et al. |
| 5,618,392 A | 4/1997 | Furuya |
| 5,624,493 A | 4/1997 | Wagh et al. |
| 5,690,729 A | 11/1997 | Jones, Jr. |
| 5,702,585 A | 12/1997 | Hillrichs et al. |
| 5,749,930 A | 5/1998 | Wolf et al. |
| 5,766,338 A | 6/1998 | Weber |
| 5,766,339 A | 6/1998 | Babu et al. |
| 5,776,328 A | 7/1998 | Traini et al. |
| 5,785,868 A | 7/1998 | Li et al. |
| 5,792,440 A | 8/1998 | Huege |
| 5,803,894 A | 9/1998 | Kao et al. |
| 5,833,736 A | 11/1998 | Durham et al. |
| 5,846,669 A | 12/1998 | Smotkin et al. |
| 5,849,075 A | 12/1998 | Hopkins et al. |
| 5,853,686 A | 12/1998 | Doxsee |
| 5,855,666 A | 1/1999 | Kao et al. |
| 5,855,759 A | 1/1999 | Keating et al. |
| 5,879,948 A | 3/1999 | Van Pelt et al. |
| 5,885,478 A | 3/1999 | Montgomery et al. |
| 5,897,704 A | 4/1999 | Baglin |
| 5,925,255 A | 7/1999 | Mukhopadhyay |
| 5,958,353 A | 9/1999 | Eyal |
| 5,965,201 A | 10/1999 | Jones, Jr. |
| 5,994,838 A | 11/1999 | Klinedinst et al. |
| 6,024,848 A | 2/2000 | Dufner et al. |
| 6,059,974 A | 5/2000 | Scheurman, III |
| 6,071,336 A | 6/2000 | Fairchild et al. |
| 6,080,297 A | 6/2000 | Ayers |
| 6,080,320 A | 6/2000 | von Phul |
| 6,090,197 A | 7/2000 | Vivian et al. |
| 6,129,832 A | 10/2000 | Fuhr et al. |
| 6,132,696 A * | 10/2000 | Porter et al. ............... 423/414 |
| 6,139,605 A | 10/2000 | Carnell et al. |
| 6,174,507 B1 | 1/2001 | Wallace et al. |
| 6,180,012 B1 | 1/2001 | Rongved |
| 6,180,074 B1 | 1/2001 | Fourcot et al. |
| 6,186,426 B1 | 2/2001 | Killer |
| 6,190,428 B1 | 2/2001 | Rolison et al. |
| 6,200,381 B1 | 3/2001 | Rechichi |
| 6,200,543 B1 | 3/2001 | Allebach et al. |
| 6,217,728 B1 | 4/2001 | Lehmann et al. |
| 6,221,225 B1 | 4/2001 | Mani |
| 6,228,145 B1 | 5/2001 | Falk-Pedersen et al. |
| 6,235,186 B1 | 5/2001 | Tanaka et al. |
| 6,248,166 B1 | 6/2001 | Solsvik |
| 6,251,356 B1 | 6/2001 | Mathur |
| 6,264,736 B1 | 7/2001 | Knopf et al. |
| 6,264,740 B1 | 7/2001 | McNulty, Jr. |
| 6,280,505 B1 | 8/2001 | Torkildsen et al. |
| 6,284,208 B1 | 9/2001 | Thomassen |
| 6,293,731 B1 | 9/2001 | Studer |
| 6,309,570 B1 | 10/2001 | Fellabaum |
| 6,331,207 B1 | 12/2001 | Gebhardt |
| 6,352,576 B1 | 3/2002 | Spencer et al. |
| 6,375,825 B1 | 4/2002 | Mauldin et al. |
| 6,387,174 B2 | 5/2002 | Knopf et al. |
| 6,387,212 B1 | 5/2002 | Christian |
| 6,402,831 B1 | 6/2002 | Sawara et al. |
| 6,416,574 B1 | 7/2002 | Steelhammer et al. |
| 6,428,767 B1 | 8/2002 | Burch et al. |
| 6,444,107 B2 | 9/2002 | Hartel et al. |
| 6,447,437 B1 | 9/2002 | Lee et al. |
| 6,475,460 B1 | 11/2002 | Max |
| 6,495,013 B2 | 12/2002 | Mazur et al. |
| 6,517,631 B1 | 2/2003 | Bland |
| 6,518,217 B2 | 2/2003 | Xing et al. |
| 6,537,456 B2 | 3/2003 | Mukhopadhyay |
| 6,602,630 B1 | 8/2003 | Gopal |
| 6,613,141 B2 | 9/2003 | Key, Jr. |
| 6,620,856 B1 | 9/2003 | Mortimer et al. |
| 6,623,555 B1 | 9/2003 | Haverinen et al. |
| 6,638,413 B1 | 10/2003 | Weinberg et al. |
| 6,648,949 B1 | 11/2003 | Der et al. |
| 6,699,318 B1 | 3/2004 | Virtanen |
| 6,712,946 B2 | 3/2004 | Genders et al. |
| 6,755,905 B2 | 6/2004 | Oates et al. |
| 6,776,972 B2 | 8/2004 | Vohra et al. |
| 6,786,963 B2 | 9/2004 | Matherly et al. |
| 6,841,512 B1 | 1/2005 | Fetcenko et al. |
| 6,881,256 B2 | 4/2005 | Orange et al. |
| 6,890,419 B2 | 5/2005 | Reichman et al. |
| 6,890,497 B2 | 5/2005 | Rau et al. |
| 6,908,507 B2 | 6/2005 | Lalande et al. |
| 6,936,573 B2 | 8/2005 | Wertz et al. |
| 6,938,425 B2 | 9/2005 | Simpson et al. |
| 7,037,434 B2 | 5/2006 | Myers et al. |
| 7,040,400 B2 | 5/2006 | de Rouffignac et al. |
| 7,132,090 B2 | 11/2006 | Dziedzic et al. |
| 7,135,604 B2 | 11/2006 | Ding et al. |
| 7,147,692 B2 | 12/2006 | Fornai et al. |
| 7,182,851 B2 | 2/2007 | Gomez |
| 7,198,722 B2 | 4/2007 | Hussain |
| 7,255,842 B1 | 8/2007 | Yeh et al. |
| 7,261,912 B2 | 8/2007 | Zeigler |
| 7,282,189 B2 | 10/2007 | Zauderer |
| 7,285,166 B2 | 10/2007 | Luke et al. |
| 7,314,847 B1 | 1/2008 | Siriwardane |
| 7,347,896 B2 | 3/2008 | Harrison |
| 7,390,444 B2 | 6/2008 | Ramme et al. |
| 7,427,449 B2 | 9/2008 | Delaney et al. |
| 7,440,871 B2 | 10/2008 | McConnell et al. |
| 7,452,449 B2 | 11/2008 | Weinberg et al. |
| 7,455,854 B2 | 11/2008 | Gower et al. |
| 7,459,134 B2 | 12/2008 | Cadours et al. |
| 7,541,011 B2 | 6/2009 | Hu |
| 7,595,001 B2 | 9/2009 | Arakel et al. |
| 7,597,747 B1 | 10/2009 | Nagel |
| 7,628,847 B2 | 12/2009 | Pope et al. |
| 7,674,443 B1 | 3/2010 | Davis |
| 7,704,369 B2 | 4/2010 | Olah et al. |
| 7,704,370 B2 | 4/2010 | Coustry et al. |
| 7,727,374 B2 | 6/2010 | Jones |
| 7,735,274 B2 | 6/2010 | Constantz et al. |
| 7,736,430 B2 | 6/2010 | Barron et al. |
| 7,744,761 B2 | 6/2010 | Constantz et al. |
| 7,749,476 B2 | 7/2010 | Constantz et al. |
| 7,753,618 B2 | 7/2010 | Constantz et al. |
| 7,754,169 B2 | 7/2010 | Constantz et al. |
| 7,771,684 B2 | 8/2010 | Constantz et al. |
| 7,790,012 B2 | 9/2010 | Kirk et al. |
| 7,815,880 B2 | 10/2010 | Constantz et al. |
| 7,829,053 B2 | 11/2010 | Constantz et al. |
| 7,842,264 B2 | 11/2010 | Cooper et al. |
| 7,875,163 B2 | 1/2011 | Gilliam et al. |

(56) References Cited

U.S. PATENT DOCUMENTS

| | | |
|---|---|---|
| 7,887,694 B2 | 2/2011 | Constantz et al. |
| 7,906,028 B2 | 3/2011 | Constantz et al. |
| 7,914,685 B2 | 3/2011 | Constantz et al. |
| 7,922,809 B1 | 4/2011 | Constantz et al. |
| 7,931,809 B2 | 4/2011 | Constantz et al. |
| 7,939,336 B2 | 5/2011 | Constantz et al. |
| 7,966,250 B2 | 6/2011 | Constantz et al. |
| 7,993,500 B2 | 8/2011 | Gilliam et al. |
| 7,993,511 B2 | 8/2011 | Gilliam et al. |
| 8,006,446 B2 | 8/2011 | Constantz et al. |
| 8,062,418 B2 | 11/2011 | Constantz et al. |
| 8,114,214 B2 | 2/2012 | Constantz et al. |
| 8,137,444 B2 | 3/2012 | Farsad et al. |
| 8,137,455 B1 | 3/2012 | Constantz et al. |
| 2001/0022952 A1 | 9/2001 | Rau et al. |
| 2001/0023655 A1 | 9/2001 | Knopf et al. |
| 2001/0054253 A1 | 12/2001 | Takahashi et al. |
| 2002/0009410 A1 | 1/2002 | Mathur |
| 2002/0127474 A1 | 9/2002 | Fleischer et al. |
| 2002/0151017 A1 | 10/2002 | Stemmer et al. |
| 2002/0155103 A1 | 10/2002 | Crippen et al. |
| 2003/0017088 A1 | 1/2003 | Downs et al. |
| 2003/0027023 A1 | 2/2003 | Dutil et al. |
| 2003/0123930 A1 | 7/2003 | Jacobs et al. |
| 2003/0126899 A1 | 7/2003 | Wolken |
| 2003/0146163 A1 | 8/2003 | Sasowsky et al. |
| 2003/0170159 A1 | 9/2003 | Honjo et al. |
| 2003/0180208 A1 | 9/2003 | Yaniv |
| 2003/0188668 A1 | 10/2003 | Bland |
| 2003/0213937 A1 | 11/2003 | Yaniv |
| 2003/0229572 A1 | 12/2003 | Raines et al. |
| 2004/0014845 A1 | 1/2004 | Takamura et al. |
| 2004/0028963 A1 | 2/2004 | Kormann et al. |
| 2004/0040671 A1 | 3/2004 | Duesel, Jr. et al. |
| 2004/0040715 A1 | 3/2004 | Wellington et al. |
| 2004/0052865 A1 | 3/2004 | Gower et al. |
| 2004/0109927 A1 | 6/2004 | Ang et al. |
| 2004/0111968 A1 | 6/2004 | Day et al. |
| 2004/0126293 A1 | 7/2004 | Geerlings et al. |
| 2004/0139891 A1 | 7/2004 | Merkley et al. |
| 2004/0151957 A1 | 8/2004 | Brooks et al. |
| 2004/0213705 A1 | 10/2004 | Blencoe et al. |
| 2004/0219090 A1 | 11/2004 | Dziedzic et al. |
| 2004/0224214 A1 | 11/2004 | Vamos et al. |
| 2004/0228788 A1 | 11/2004 | Nagai et al. |
| 2004/0231568 A1 | 11/2004 | Morioka et al. |
| 2004/0234443 A1 | 11/2004 | Chen et al. |
| 2004/0259231 A1 | 12/2004 | Bhattacharya |
| 2004/0267077 A1 | 12/2004 | Ding et al. |
| 2005/0002847 A1 | 1/2005 | Maroto-Valer et al. |
| 2005/0011770 A1 | 1/2005 | Katsuyoshi et al. |
| 2005/0031515 A1 | 2/2005 | Charette |
| 2005/0031522 A1 | 2/2005 | Delaney et al. |
| 2005/0036932 A1 | 2/2005 | Takahashi et al. |
| 2005/0087496 A1 | 4/2005 | Borseth |
| 2005/0098499 A1 | 5/2005 | Hussain |
| 2005/0103234 A1 | 5/2005 | McNutty |
| 2005/0106110 A1 | 5/2005 | Liu |
| 2005/0112044 A1 | 5/2005 | Kuma et al. |
| 2005/0118081 A1 | 6/2005 | Harris et al. |
| 2005/0129606 A1 | 6/2005 | Mitsuhashi et al. |
| 2005/0136310 A1 | 6/2005 | Luo et al. |
| 2005/0154669 A1 | 7/2005 | Streetman |
| 2005/0180910 A1 | 8/2005 | Park et al. |
| 2005/0232855 A1 | 10/2005 | Stevens et al. |
| 2005/0232856 A1 | 10/2005 | Stevens et al. |
| 2005/0238563 A1 | 10/2005 | Eighmy et al. |
| 2005/0252215 A1 | 11/2005 | Beaumont |
| 2005/0255174 A1 | 11/2005 | Shelley et al. |
| 2006/0039853 A1 | 2/2006 | Fan et al. |
| 2006/0048517 A1 | 3/2006 | Fradette et al. |
| 2006/0051274 A1 | 3/2006 | Wright et al. |
| 2006/0057036 A1 | 3/2006 | Hermosillo |
| 2006/0060532 A1 | 3/2006 | Davis |
| 2006/0093540 A1 | 5/2006 | Fan et al. |
| 2006/0105082 A1 | 5/2006 | Zeigler |
| 2006/0165583 A1 | 7/2006 | Makino et al. |
| 2006/0169177 A1 | 8/2006 | Jardine et al. |
| 2006/0169593 A1 | 8/2006 | Xu et al. |
| 2006/0173169 A1 | 8/2006 | Cheryan |
| 2006/0184445 A1 | 8/2006 | Sandor et al. |
| 2006/0185516 A1 | 8/2006 | Moriyama et al. |
| 2006/0185560 A1 | 8/2006 | Ramme et al. |
| 2006/0185985 A1 | 8/2006 | Jones |
| 2006/0186562 A1 | 8/2006 | Wright et al. |
| 2006/0189837 A1 | 8/2006 | Forrester |
| 2006/0195002 A1 | 8/2006 | Grandjean et al. |
| 2006/0196836 A1 | 9/2006 | Arakel et al. |
| 2006/0245993 A1 | 11/2006 | Magumbe et al. |
| 2006/0249380 A1 | 11/2006 | Gestermann et al. |
| 2006/0286011 A1 | 12/2006 | Anttila et al. |
| 2006/0288912 A1 | 12/2006 | Sun et al. |
| 2007/0045125 A1 | 3/2007 | Hartvigsen et al. |
| 2007/0056487 A1 | 3/2007 | Anthony et al. |
| 2007/0084344 A1 | 4/2007 | Moriya et al. |
| 2007/0092427 A1 | 4/2007 | Anthony et al. |
| 2007/0099038 A1 | 5/2007 | Galloway |
| 2007/0113500 A1 | 5/2007 | Zhao |
| 2007/0148509 A1 | 6/2007 | Colbow et al. |
| 2007/0163443 A1 | 7/2007 | Moriyama et al. |
| 2007/0184394 A1 | 8/2007 | Comrie |
| 2007/0186820 A1 | 8/2007 | O'Hearn |
| 2007/0187247 A1 | 8/2007 | Lackner et al. |
| 2007/0202032 A1 | 8/2007 | Geerlings et al. |
| 2007/0212584 A1 | 9/2007 | Chuang |
| 2007/0217981 A1 | 9/2007 | Van Essendelft |
| 2007/0233616 A1 | 10/2007 | Richards et al. |
| 2007/0240570 A1 | 10/2007 | Jadhav et al. |
| 2007/0251393 A1 | 11/2007 | Pope et al. |
| 2007/0261947 A1 | 11/2007 | Geerlings et al. |
| 2007/0266632 A1 | 11/2007 | Tsangaris et al. |
| 2008/0031801 A1 | 2/2008 | Lackner et al. |
| 2008/0035036 A1 | 2/2008 | Bassani et al. |
| 2008/0059206 A1 | 3/2008 | Jenkins |
| 2008/0099122 A1 | 5/2008 | Andersen et al. |
| 2008/0104858 A1 | 5/2008 | Carin et al. |
| 2008/0112868 A1 | 5/2008 | Blencoe et al. |
| 2008/0134891 A1 | 6/2008 | Jarvenpaa |
| 2008/0138265 A1 | 6/2008 | Lackner et al. |
| 2008/0171158 A1 | 7/2008 | Maddan |
| 2008/0178739 A1 | 7/2008 | Lewnard et al. |
| 2008/0213146 A1 | 9/2008 | Zauderer |
| 2008/0223727 A1 | 9/2008 | Oloman et al. |
| 2008/0233029 A1 | 9/2008 | Fan et al. |
| 2008/0236143 A1 | 10/2008 | Lo |
| 2008/0241337 A1 | 10/2008 | Durand et al. |
| 2008/0245012 A1 | 10/2008 | Boisvert et al. |
| 2008/0245274 A1 | 10/2008 | Ramme |
| 2008/0245660 A1 | 10/2008 | Little et al. |
| 2008/0245672 A1 | 10/2008 | Little et al. |
| 2008/0248350 A1 | 10/2008 | Little et al. |
| 2008/0270272 A1 | 10/2008 | Branscomb |
| 2008/0275149 A1 | 11/2008 | Ladely et al. |
| 2008/0276553 A1 | 11/2008 | Ingjaldsdottir et al. |
| 2008/0276803 A1 | 11/2008 | Molaison et al. |
| 2008/0277319 A1 | 11/2008 | Wyrsta |
| 2008/0289495 A1 | 11/2008 | Eisenberger et al. |
| 2009/0001020 A1 | 1/2009 | Constantz et al. |
| 2009/0010827 A1 | 1/2009 | Geerlings et al. |
| 2009/0020044 A1 | 1/2009 | Constantz et al. |
| 2009/0043687 A1 | 2/2009 | van Soestbergen et al. |
| 2009/0078162 A1 | 3/2009 | Clausi et al. |
| 2009/0081092 A1 | 3/2009 | Yang et al. |
| 2009/0081093 A1 | 3/2009 | Comrie |
| 2009/0081096 A1 | 3/2009 | Pellegrin |
| 2009/0081112 A1 | 3/2009 | Virtanen |
| 2009/0090277 A1 | 4/2009 | Joshi et al. |
| 2009/0101008 A1 | 4/2009 | Lackner et al. |
| 2009/0107038 A1 | 4/2009 | Wan |
| 2009/0117019 A1 | 5/2009 | Comrie |
| 2009/0120288 A1 | 5/2009 | Lackner |
| 2009/0120644 A1 | 5/2009 | Roddy et al. |
| 2009/0143211 A1 | 6/2009 | Riman et al. |
| 2009/0148238 A1 | 6/2009 | Smith |

(56) References Cited

U.S. PATENT DOCUMENTS

| | | |
|---|---|---|
| 2009/0169452 A1 | 7/2009 | Constantz et al. |
| 2009/0186244 A1 | 7/2009 | Mayer |
| 2009/0202410 A1 | 8/2009 | Kawatra et al. |
| 2009/0214408 A1 | 8/2009 | Blake et al. |
| 2009/0232861 A1 | 9/2009 | Wright et al. |
| 2009/0263301 A1 | 10/2009 | Reddy et al. |
| 2009/0294366 A1 | 12/2009 | Wright et al. |
| 2009/0301352 A1 | 12/2009 | Constantz et al. |
| 2010/0000444 A1 | 1/2010 | Constantz et al. |
| 2010/0024686 A1 | 2/2010 | Constantz et al. |
| 2010/0037653 A1 | 2/2010 | Enis et al. |
| 2010/0051859 A1 | 3/2010 | House et al. |
| 2010/0063902 A1 | 3/2010 | Constantz et al. |
| 2010/0068109 A1 | 3/2010 | Comrie |
| 2010/0077691 A1 | 4/2010 | Constantz et al. |
| 2010/0077922 A1 | 4/2010 | Constantz et al. |
| 2010/0083880 A1 | 4/2010 | Constantz et al. |
| 2010/0084280 A1 | 4/2010 | Gilliam et al. |
| 2010/0089142 A1 | 4/2010 | Sukhija et al. |
| 2010/0111810 A1 | 5/2010 | Constantz et al. |
| 2010/0116683 A1 | 5/2010 | Gilliam et al. |
| 2010/0132556 A1 | 6/2010 | Constantz et al. |
| 2010/0132591 A1 | 6/2010 | Constantz et al. |
| 2010/0135865 A1 | 6/2010 | Constantz et al. |
| 2010/0135882 A1 | 6/2010 | Constantz et al. |
| 2010/0140103 A1 | 6/2010 | Gilliam et al. |
| 2010/0144521 A1 | 6/2010 | Constantz et al. |
| 2010/0150802 A1 | 6/2010 | Gilliam et al. |
| 2010/0154679 A1 | 6/2010 | Constantz et al. |
| 2010/0155258 A1 | 6/2010 | Kirk et al. |
| 2010/0158786 A1 | 6/2010 | Constantz et al. |
| 2010/0196104 A1 | 8/2010 | Constantz et al. |
| 2010/0200419 A1 | 8/2010 | Gilliam et al. |
| 2010/0219373 A1 | 9/2010 | Seeker et al. |
| 2010/0224503 A1 | 9/2010 | Kirk et al. |
| 2010/0229725 A1 | 9/2010 | Farsad et al. |
| 2010/0230293 A1 | 9/2010 | Gilliam et al. |
| 2010/0230830 A1 | 9/2010 | Farsad et al. |
| 2010/0236242 A1 | 9/2010 | Farsad et al. |
| 2010/0239467 A1 | 9/2010 | Constantz et al. |
| 2010/0239487 A1 | 9/2010 | Constantz et al. |
| 2010/0247410 A1 | 9/2010 | Constantz et al. |
| 2010/0258035 A1 | 10/2010 | Constantz et al. |
| 2010/0276299 A1 | 11/2010 | Kelly et al. |
| 2010/0290967 A1 | 11/2010 | Detournay et al. |
| 2010/0313793 A1 | 12/2010 | Constantz et al. |
| 2010/0313794 A1 | 12/2010 | Constantz et al. |
| 2010/0319586 A1 | 12/2010 | Blount et al. |
| 2010/0326328 A1 | 12/2010 | Constantz et al. |
| 2010/0330279 A1 | 12/2010 | Fogden et al. |
| 2011/0030586 A1 | 2/2011 | Constantz et al. |
| 2011/0030957 A1 | 2/2011 | Constantz et al. |
| 2011/0033239 A1 | 2/2011 | Constantz et al. |
| 2011/0035154 A1 | 2/2011 | Kendall et al. |
| 2011/0036728 A1 | 2/2011 | Farsad et al. |
| 2011/0042230 A1 | 2/2011 | Gilliam et al. |
| 2011/0054084 A1 | 3/2011 | Constantz et al. |
| 2011/0059000 A1 | 3/2011 | Constantz et al. |
| 2011/0067600 A1 | 3/2011 | Constantz et al. |
| 2011/0067603 A1 | 3/2011 | Constantz et al. |
| 2011/0067605 A1 | 3/2011 | Constantz et al. |
| 2011/0071309 A1 | 3/2011 | Constantz et al. |
| 2011/0079515 A1 | 4/2011 | Gilliam et al. |
| 2011/0083968 A1 | 4/2011 | Gilliam et al. |
| 2011/0091366 A1 | 4/2011 | Kendall et al. |
| 2011/0091955 A1 | 4/2011 | Constantz et al. |
| 2011/0132234 A1 | 6/2011 | Constantz et al. |
| 2011/0147227 A1 | 6/2011 | Gilliam et al. |
| 2011/0203489 A1 | 8/2011 | Constantz et al. |
| 2011/0226989 A9 | 9/2011 | Seeker et al. |
| 2011/0240916 A1 | 10/2011 | Constantz et al. |
| 2011/0247336 A9 | 10/2011 | Farsad et al. |
| 2011/0277474 A1 | 11/2011 | Constantz et al. |
| 2011/0277670 A1 | 11/2011 | Self et al. |
| 2012/0031303 A1 | 2/2012 | Constantz et al. |
| 2012/0211421 A1 | 8/2012 | Self et al. |
| 2013/0036948 A1* | 2/2013 | Fernandez et al. ............ 106/725 |

FOREIGN PATENT DOCUMENTS

| | | |
|---|---|---|
| AU | 2007201171 A1 | 10/2007 |
| AU | 2007101174 A4 | 1/2008 |
| AU | 2008256636 B2 | 12/2008 |
| AU | 2008101140 A4 | 1/2009 |
| CA | 1303822 C | 6/1988 |
| CA | 1335974 A1 | 6/1995 |
| CA | 2308224 C | 4/1999 |
| CA | 2255287 A1 | 6/2000 |
| CA | 2353830 A1 | 6/2000 |
| CA | 2440325 A1 | 1/2003 |
| CA | 2646462 A1 | 9/2007 |
| CA | 2617325 A1 | 11/2007 |
| CA | 2682952 A1 | 10/2008 |
| CA | 2659447 A1 | 12/2008 |
| CN | 1107098 A | 8/1995 |
| CN | 101068610 A | 11/2007 |
| CN | 101219330 A | 7/2008 |
| CN | 101289200 A | 10/2008 |
| DE | 2653649 A1 | 6/1978 |
| DE | 3146326 A1 | 6/1983 |
| DE | 3638317 A1 | 6/1987 |
| DE | 19512163 A1 | 10/1995 |
| DE | 19523324 A1 | 3/1996 |
| DE | 19631794 A1 | 8/1997 |
| EP | 0522382 A1 | 1/1993 |
| EP | 0487102 B1 | 8/1995 |
| EP | 0591350 B1 | 11/1996 |
| EP | 0628339 B1 | 9/1999 |
| EP | 0844905 B1 | 3/2000 |
| EP | 1379469 B1 | 3/2006 |
| EP | 1650162 A1 | 4/2006 |
| EP | 1716911 A1 | 11/2006 |
| EP | 1554031 B1 | 12/2006 |
| EP | 1571105 B1 | 12/2007 |
| EP | 2253600 A1 | 11/2010 |
| GB | 911386 A | 11/1962 |
| GB | 1392907 A | 5/1975 |
| GB | 2032441 A | 5/1980 |
| GB | 2050325 A | 1/1981 |
| GB | 2208163 A | 3/1989 |
| GB | 2210035 A | 6/1989 |
| GB | 2371810 A | 8/2002 |
| JP | 51102357 A1 | 9/1976 |
| JP | 59100280 | 6/1984 |
| JP | 63-312988 A2 | 12/1988 |
| JP | H 2302317 A | 12/1990 |
| JP | 03-020491 A2 | 1/1991 |
| JP | 03-170363 A | 7/1991 |
| JP | 04-190829 | 7/1992 |
| JP | 04-317721 A | 11/1992 |
| JP | 7061842 A | 3/1995 |
| JP | 10287461 A | 10/1998 |
| JP | 10305212 A | 11/1998 |
| JP | 2000226402 A | 8/2000 |
| JP | 03184892 B2 | 7/2001 |
| JP | 2002-273163 A | 9/2002 |
| JP | 2003041388 | 2/2003 |
| JP | 2004-174370 | 6/2004 |
| JP | 2005-052762 | 3/2005 |
| JP | 2006-076825 | 3/2006 |
| JP | 2009279530 A | 12/2009 |
| NL | 7607470 A | 1/1978 |
| SU | 1819854 A1 | 6/1993 |
| WO | WO 93/16216 A1 | 8/1993 |
| WO | WO 94/18119 A1 | 8/1994 |
| WO | WO 96/34997 A1 | 11/1996 |
| WO | WO 99/13967 A1 | 3/1999 |
| WO | WO 01/07365 A1 | 2/2001 |
| WO | WO 01/96243 A1 | 12/2001 |
| WO | WO 02/00551 A2 | 1/2002 |
| WO | WO 02/085788 A1 | 10/2002 |
| WO | WO 03/008071 A1 | 1/2003 |
| WO | WO 03/054508 A2 | 7/2003 |

(56) References Cited

FOREIGN PATENT DOCUMENTS

| | | |
|---|---|---|
| WO | WO 03/068685 A1 | 8/2003 |
| WO | WO 2004/041731 A1 | 5/2004 |
| WO | WO 2004/094043 A2 | 11/2004 |
| WO | WO 2004/098740 A2 | 11/2004 |
| WO | WO 2005/028379 A1 | 3/2005 |
| WO | WO 2005/078836 A2 | 8/2005 |
| WO | WO 2005/086843 A2 | 9/2005 |
| WO | WO 2005/108297 A2 | 11/2005 |
| WO | WO 2006/009600 A2 | 1/2006 |
| WO | WO 2006/032797 A1 | 3/2006 |
| WO | WO 2006/034339 A1 | 3/2006 |
| WO | WO 2006/036396 A2 | 4/2006 |
| WO | WO 2006/094968 A1 | 9/2006 |
| WO | WO 2006/099599 A2 | 9/2006 |
| WO | WO 2006/113997 A1 | 11/2006 |
| WO | WO 2006/134080 A1 | 12/2006 |
| WO | WO 2007/003013 A1 | 1/2007 |
| WO | WO 2007/016271 A2 | 2/2007 |
| WO | WO 2007/022595 A1 | 3/2007 |
| WO | WO 2007/060149 A1 | 5/2007 |
| WO | WO 2007/069902 A1 | 6/2007 |
| WO | WO 2007/071633 A1 | 6/2007 |
| WO | WO 2007/082505 A2 | 7/2007 |
| WO | WO 2007/094691 A1 | 8/2007 |
| WO | WO 2007/096671 A1 | 8/2007 |
| WO | WO 2007/106372 A2 | 9/2007 |
| WO | WO 2007/106883 A2 | 9/2007 |
| WO | WO 2007/123917 A2 | 11/2007 |
| WO | WO 2007/139392 A1 | 12/2007 |
| WO | WO 2007/140544 A1 | 12/2007 |
| WO | WO 2007/142945 A2 | 12/2007 |
| WO | WO 2008/018928 A2 | 2/2008 |
| WO | WO 2008/026201 A2 | 3/2008 |
| WO | WO 2008/031834 A1 | 3/2008 |
| WO | WO 2008/061305 A1 | 5/2008 |
| WO | WO 2008/068322 A1 | 6/2008 |
| WO | WO 2008/089523 A1 | 7/2008 |
| WO | WO 2008/095057 A2 | 8/2008 |
| WO | WO 2008/101293 A1 | 8/2008 |
| WO | WO 2008/108657 A1 | 9/2008 |
| WO | WO 2008/115662 A2 | 9/2008 |
| WO | WO 2008/124538 A1 | 10/2008 |
| WO | WO 2008/140821 A2 | 11/2008 |
| WO | WO 2008/142017 A2 | 11/2008 |
| WO | WO 2008/142025 A2 | 11/2008 |
| WO | WO 2008/148055 A1 | 12/2008 |
| WO | WO 2008/151060 A1 | 12/2008 |
| WO | WO 2009/006295 A2 | 1/2009 |
| WO | WO 2009/024826 A1 | 2/2009 |
| WO | WO 2009/032331 A1 | 3/2009 |
| WO | WO 2009/036087 A1 | 3/2009 |
| WO | WO 2009/039655 A1 | 4/2009 |
| WO | WO 2009/049085 A2 | 4/2009 |
| WO | WO 2009/065031 A1 | 5/2009 |
| WO | WO 2009/070273 A1 | 6/2009 |
| WO | WO 2009/086460 A1 | 7/2009 |
| WO | WO 2009/102816 A2 | 8/2009 |
| WO | WO 2009/102817 A2 | 8/2009 |
| WO | WO 2009/146436 A1 | 12/2009 |
| WO | WO 2009/155378 A1 | 12/2009 |
| WO | WO 2010/006242 A1 | 1/2010 |
| WO | WO 2010/008896 A1 | 1/2010 |
| WO | WO 2010/009273 A1 | 1/2010 |
| WO | WO 2010/030826 A1 | 3/2010 |
| WO | WO 2010/039903 A1 | 4/2010 |
| WO | WO 2010/039909 A1 | 4/2010 |
| WO | WO 2010/048457 A1 | 4/2010 |
| WO | WO 2010/051458 A1 | 5/2010 |
| WO | WO 2010/068924 A1 | 6/2010 |
| WO | WO 2010/074686 A1 | 7/2010 |
| WO | WO 2010/074687 A1 | 7/2010 |
| WO | WO 2010/087823 A1 | 8/2010 |
| WO | WO 2010/091029 A1 | 8/2010 |
| WO | WO 2010/093713 A1 | 8/2010 |
| WO | WO 2010/093716 A1 | 8/2010 |
| WO | WO 2010/101953 A1 | 9/2010 |
| WO | WO 2010/104989 A1 | 9/2010 |
| WO | WO 2010/132863 A1 | 11/2010 |
| WO | WO 2010/136744 A1 | 12/2010 |
| WO | WO 2011/008223 A1 | 1/2011 |
| WO | WO 2011/017609 A1 | 2/2011 |
| WO | WO 2011/038076 A1 | 3/2011 |
| WO | WO 2011/049996 A1 | 4/2011 |
| WO | WO 2011/066293 A1 | 6/2011 |
| WO | WO 2011/075680 A1 | 6/2011 |
| WO | WO 2011/081681 A1 | 7/2011 |
| WO | WO 2011/097468 A2 | 8/2011 |
| WO | WO 2011/102868 A1 | 8/2011 |

OTHER PUBLICATIONS

European search report and opinion dated Aug. 21, 2013 for EP Application No. 13150415.1.

European search report and opinion dated Dec. 14, 2010 for EP Application No. 09812480.4.

International search report and written opinion dated Jun. 5, 2013 for PCT/US2013/031770.

Ogino, et al. The formation and transformation mechanism of calcium carbonate in water. Geochimica et Cosmochimica Acta. Oct. 1987; 51(10):2757-2767.

Otvos. Vaterite (An Uncommon Polymorph of CaC03): Occurences in Boreholes Demonstrate Unexpected Longevity-Discussion. Journal of Sedimentary Researtch. Apr. 1994; A64(2):417.

Tsuno, et al. Effects of Trace Lanthanum Ion on the Stability of Vaterite and Transformation from Vaterite to Calcite in an Aquatic System. Bulletin of The Chemical Society of Japan. 2001; 74(3):479-486.

Wray, et al. Precipitation of Calcite and Aragonite. Journal of the American Chemical Society. May 1957; 79(9):2031-2034.

U.S. Appl. No. 60/921,598, filed Apr. 3, 2007, Little et al.

Aker, "Aker Clean Carbon, Carbon Capture Solutions Provider" Aker Clean Carbon Presentation for UN's IPCC; Jan. 24, 2008; 8pp.

Alexander, G. et al., "Evaluation of reaction variables in the dissolution of serpentine for mineral carbonation"; Elsevier; ScienceDirect Fuel 86 Jun. 2007 273-281.

Allen, L.M. 1992. Boron and Sulfur Isotopic Fractionation in the Coal Combustion System. A Thesis Submitted to the Faculty of the Department of Hydrology and Water Resources. The University of Arizona.

Amelingmeier. "ARAGONIT", Roempp, Fachgebiet: Chemie Unterthema: Mineralogie, Geochimie May 2005, Retrieved from the internet: URL: http://www.roempp.com/prod/ [retrieved on Jun. 19, 2012]—with machine English translation.

Amelingmeier. "Vaterit", Roempp, Fachgebiet: Chemie Unterthema: Mineralogie, Geochimie Nov. 2010, Retrieved from the internet: URL: http://www.roempp.com/prod/ [retrieved on Jun. 19, 2012]—with machine English translation.

Avery, G.B. et al. 2006. Carbon isotopic characterization of dissolved organic carbon in rainwater: Terrestrial and marine influences. Science Direct. 40(39): 7539-7545. Retrieved from the internet on May 20, 2010.

Back, M. et al.,"Reactivity of Alkaline Lignite Fly Ashes Towards CO in Water." Environmental Science & Technology. vol. 42, No. 12 May 2008 pp. 4520-4526.

Baer, D.S., et al. (2002). Sensitive absorption measurements in the near-infrared region using off-axis integrated-cavity-output spectroscopy. Appl. Phys. B. 5 pages.

Bagotsky, V.S. "Conductive Polymers: Polymers with Ionic Functions" Fundamentals of Electrochemistry. Dec. 2005 Second Edition. New Jersey: John Wiley & Sons. pp. 454-455.

Bauer, C.F., et al. Jul. 1981. Identification and Quantitation of Carbonate Compounds in Coal Fly Ash. American Chemical Society. 15(7): 783-788.

Berg et al., "A 3-Hydroxyproprionate/ 4-Hydroxybutyrate Autotrophic Carbon Dioxide Assimilation Pathway in Archea"; Science 14, Dec. 2007; vol. 318, No. 5857 DOI 10.1126/science 1149976; pp. 1782-1786.

(56) References Cited

OTHER PUBLICATIONS

Biello, D. Cement from CO2: A Concrete Cure for Global Warming? Scientific American Aug. 7, 2008., pp. 1-3 [online] [retrieved on Dec. 29, 2009] <URL: http://www.scientificamerican.com/article.cfm>.
Biennier, L., et al. (2004). Multiplex integrated cavity output spectroscopy of cold PAH cations. Chemical Physics Letters. 387: 287-294.
Biomass Burning: A Hot Issue in Global Change. National Aeronautics and Space Administration. Langley Research Center, Hampton, Virginia. Fact Sheet FS-2001-02-56-LaRC. Feb. 2001. 4 pages.
Bommaraju, T.V. et al. Nov. 2001 Brine Electrolysis. <http://electrochem.cwru.edu/encycl/art-b01-brine.htm>. Retrieved on Oct. 6, 2010. pp. 1-25.
Bond, G.M., et al. (2001). CO2 Capture from Coal-Fired Utility Generation Plant Exhausts, and Sequestration by a Biomimetic Route Based on Enzymatic Catalysis—Current Status (paper presented at the First National Conference on Carbon Sequestration, May 14-17, in Washington D.C., USA; Paper Sa.5.
Bond, G.M., et al. (2002). Brines as possible cation sources for biomimetic carbon dioxide sequestration. American Geophysical Union Abstract #U22A-07.
Bottomley, D.J. et al. 1999. The origin and evolution of Canadian Shield brines: evaporation or freezing of seawater? New lithium isotope and geochemical evidence from the Slave craton. Chemical Geology. 155: 295-320.
Bradfield, D.L. Jan. 1984. Conventional Uranium Processing: The Yeelirrie Uranium Project. Practical Hydromet '83—7th Annual Symposium on Uranium and Precious Metals. pp. 39-47. Lakewood, CO.
Cannell, M.G.R. Aug. 2003. "Carbon sequestration and biomass energy offset: theoretical, potential and achievable capacities globally, in Europe and the UK." Biomass and Bioenergy. 24: 97-116.
Carbon Sequestration. National Energy Technology Laboratory, Jul. 1, 2008 (online) [retrieved on Dec. 21, 2009] <URL: http://web.archive.org/web/20080701213124/http://www.netl.doe.gov/technologies/carbon_seq/index.html>.
Cerling, T.E. 1984. The stable isotopic composition of modern soil carbonate and its relationship to climate. Earth and Planetary Science Letters. 71: 229-240.
Christensen, L.E., et al. Measurement of Sulfur Isotope Compositions by Tunable Laser Spectroscopy of SO2. Analytical Chemistry, Nov. 17, 2007, vol. 79, No. 24, pp. 9261-9268 (abstract) [online] [retrieved on Dec. 30, 2009] <URL: http://pubs.acs.org/doi/abs/10.1021/ac071040p>.
CICCS "Aims and Research"; www.nottingham.ac.uk/carbonmanagement/ccs_aims.php 2pp Aug. 3, 2007.
Constantz, B. (2009) "The Risk of Implementing New Regulations on Game-Changing Technology: Sequestering CO2 in the Built Environment" AGU, 90(22), Jt. Assem, Suppl., Abstract.
Criss, R.E. 1995. Stable Isotope Distribution: Variations from Temperature, Organic and Water-Rock Interactions. Washington University, St. Louis, Department of Earch and Planetary Sciences. American Geophysical Union. pp. 292-307.
Dickens, A. et al. 2004. Reburial of fossil organic carbon in marine sediments. Nature. 427: 336-339. Retrieved from the internet on May 20, 2010.
Druckenmiller, M. et al., "Carbon sequestration using brine of adjusted pH to form mineral carbonates"; Elsevier; www.elsevier.com/locate/fuproc; Fuel Processing Technology 86 (2005) 1599-1614.
Ehleringer, J.R., et al. 2002. Stable Isotopes. vol. 2, The Earth System: biological and ecological dimensions of global environmental change. pp. 544-550. Edited by Professor Harold A. Mooney and Dr. Josep G. Canadell in Encyclopedia of Global Environmental Change. John Wiley & Sons, Ltd. Chichester.
Eldorado Beaverlodge Operation. Jun. 1960 Canadian Mining Journal. 81(6): 111-138.
Electrochemical cell. Wikipedia (2009), http:en.wikipedia.org/wiki/Electrochemical_Cell, Nov. 24, 2009, 5 pp.
Eloneva et al., "Fixation of CO2 by carbonating calcium derived from blast furnace slag" Energy May 2008 33, pp. 1461-1467.
Elswick, E.R., et al. 2007. Sulfur and carbon isotope geochemistry of coal and derived coal-combustion by-products: An example from an Eastern Kentucky mine and power plant. Applied Geochemistry. 22: 2065-2077.
Eurodia. Bipolar Membrane Electrodialysis. Available online as of 2001.; visited Oct. 6, 2010 at http://www.eurodia.com/html/eb.html.
Fallick, A.E., et al. 1991. A Stable Isotope Study of the Magnesite Deposits Associated with the Alpine-Type Ultramafic Rocks of Yugoslavia. Economic Geology. 86: 847-861.
Faure, et al. 1963. The Isotopic Composition of Strontium in Oceanic and Continental Basalts: Application to the Origin of Igneous Rocks. Journal of Petrology. 4(1): 31-50. (abstract only). Http://petrology.oxfordjournals.org/cgi/content/abstract/4/1/31 (retrieved on Jun. 1, 2010).
Faverjon, F. et al. Aug. 2006. Regeneration of hydrochloric acid and sodium hydroxide from purified sodium chloride by membrane electrolysis using a hydrogen diffusion anode-membrane assembly. Journal of Membrane Science 284 (1-2): 323-330.
Faverjon, F. et al. Jul. 2005. Electrochemical study of a hydrogen diffusion anode-membrane assembly for membrane electrolysis. Electrochimica Acta 51 (3): 386-394.
Filley, T.R. et al. 1997. Application of Isotope-Ratio-Monitoring Gas Chromatography/Mass Spectrometry to Study Carbonization Reactions of FCCU Slurry Oils. Department of Geosciences, Department of Materials Science and Engineering, The Pennsylvania State University, University Park, PA. Abstracts of Papers of the American Chemical Society. 214:65—FUEL Part 1. pp. 938-941.
Fouke, B.W., et al. 2000. Depositional Facies and Aqueous-Solid Geochemistry of Travertine-Depositing Hot Springs (Angel Terrace, Mammoth Hot Springs, Yellowstone National Park, U.S.A.). Journal of Sedimentary Research. 70(3): 565-585.
Gain, E. et al. May 2002 Ammonium nitrate wastewater treatment by coupled membrane electrolysis and electrodialysis. Journal of Applied Electrochemistry 32: 969-975.
Genders, D. 1995. Electrochemical Salt Splitting. http://www.electrosynthesis.com/news/mwatts.html (accessed Feb. 5, 2009).
Gillery et al. Bipolar membrane electrodialysis: the time has finally come! Presented 16th Intl. Forum on Appl. Electrochem; Cleaner Tech.—Challenges and Solutions. Nov. 10-14, 2002. Amelia Island Plantation, FL. 4 pages. Retrieved form the Internet on Aug. 14, 2009. http://www.ameridia.com/html/ebc.html.
Goldberg et al. Jun. 2009. "CO2 Mineral Sequestration Studies in US"; National Energy Technology Laboratory; goldberg@netl.doe.gov; 10pp.
Golden, D.C., et al. 2001. A Simple Inorganic Process for Formation of Carbonates, Magnetite, and Sulfides in Martian Meteorite ALH84001. American Mineralogist. 86: 370-375.
Graff "Just Catch—CO2 Capture Technology" Aker Kvaerner; Pareto Clean Energy Tech Seminar Oct. 11, 2007 25pp.
Green Car Congress "PKU Researchers Carry Out Aqueous Fischer-Tropsch Reaction for First Time"; www.greeencarcongress.com/2007/12/pku-researchers.html; Dec. 12, 2007; 2pp.
Green Car Congress "Researcher Proposes System for Capture of Mobile Source CO2 Emissions Directly from Atmosphere"; www.greeencarcongress.com/2007/10/researcher-prop.html#more; Oct. 8, 2007; 4pp.
Green Car Congress "Researchers Develop New Method for Ocean Sequestration of Carbon Dioxide Through Accelerated Weathering f Volcanic Rocks"; www.greeencarcongress.com/2007/11/researchers-dev.html#more; Nov. 7, 2007; 3pp.
Gregerson, J. Aug. 1999. Conquering Corrosion (in concrete). Building Design & Construction. 40(8): 50.
Groteklaes. "DOLOMIT", Roempp, Fachgebiet: Chemie Unterthema: Mineralogie, Geochimie Feb. 2005, Retrieved from the internet: URL: http://www.roempp.com/prod/ [retrieved on Jun. 19, 2012]—with machine English translation.
Hassan, A.M. et al. 1989. Corrosion Resistant Materials for Seawater RO Plants. Desalination. 74: 157-170.
Haywood et al., "Carbon dioxide sequestration as stable carbonate minerals—environmental barriers"; Environmental Geology Aug. 2001 41:11-16; Springer-Verlag 2001.

(56) References Cited

OTHER PUBLICATIONS

Hein, J.R. et al. Feb. 2006. Methanogen c calc te, $^{13}$C-depleted b valve shells, and gas hydrate from a mud volcano offshore southern Cal forn a. Geological Society of America. 34(2): 109-112.

Hill et al. Mar. 18, 2006. "Preliminary Investigation of Carbon Sequestration Potential in Brine from Pennsylvania's Oriskany Sandstone Formation in Indiana County, PA"; The Energy Institute and the Department of Energy & Geo-Environmental Engineering. College of Engineering Research Symposium, Session 3C. 16pp.

Holdgate, G.R., et al. 2009. Eocene-Miocene carbon-isotope and floral record from brown coal seams in the Gippsland Basin of southeast Australia. Global and Planetary Change. 65: 89-103.

Holze, S. et al. Jan. 1994. Hydrogen Consuming Anodes for Energy Saving in Sodium Sulphate Electrolysis. Chem. Eng. Technol. 17: 382-389.

Horii, Y. et al. 2008. Novel evidence for natural formation of dioxins in ball clay. Chemosphere. 70: 1280-1289.

Horkel, K., et al. 2009. Stable isotopic composition of cryptocrystalline magnesite from deposits in Turkey and Austria. Geophysical Research Abstracts. 11. (abstract only).

Horner, G. et al. 2004. Isotope selective analysis of CO2 with tunable diode laser (TDL) spectroscopy in the NIR. The Analyst. 129: 772-778.

Huijgen, W.J.J., et al. Dec. 2005. Carbon dioxide sequestration by mineral carbonation: Literature review update 2003-2004, ECN-C-05-022; Energy Research Centre of the Netherlands: Petten; pp. 1-37.

Huijgen, W.J.J., et al. Feb. 2003. Carbon dioxide sequestration by mineral carbonation. ECN-C-03-016; Energy Research Centre of the Netherlands: Petten; pp. 1-42.

Huijgen, W.J.J., et al. Nov. 2005. Mineral CO2 Sequestration by Steel Slag Carbonation. Environ. Sci. Technol. 39: 9676-9682.

Huijgen, W.J.J., et al. Nov. 2006. Energy Consumption and Net CO2 Sequestration of Aqueous Mineral Carbonation. Ind. Eng. Chem. Res. 45: 9184-9194.

Huntzinger, D.N. Carbon Dioxide Sequestration in Cement Kiln Dust Through Mineral Carbonation. Michigan Technological University, Jul. 2006 [online], [retrieved on Dec. 29, 2009]. <URL: http://www.geo.mtu.edu/~dnhuntzi/DNHuntzingerETD.pdf>.

Huntzinger, D.N. et al. Apr. 2009. A life-cycle assessment of Portland cement manufacturing: comparing the traditional process with alternative technologies. Journal of Cleaner Production. 17: 668-675.

Huntzinger, D.N. et al.,"Carbon Dioxide Sequestration in Cement Kiln Dust through Mineral Carbonation"; Environmental Science & Technology, vol. 43, No. 6 (2009) pp. 1986-1992.

International Search Report dated Jan. 4, 2010 of PCT/US2009/062795.

International Search Report dated Jan. 4, 2011 of EP 09818485.6.

International Search Report dated Jan. 13, 2010 of PCT/US2009/059135.

International Search Report dated Jan. 20, 2009 of PCT/US2007/010032.

International Search Report dated Feb. 2, 2010 of PCT/US2009/059141.

International Search Report dated Feb. 19, 2009 of PCT/US2008/088242.

International Search Report dated Feb. 24, 2010 of PCT/US2009/067764.

International Search Report dated Mar. 3, 2010 of EP 08867440.3.
International Search Report dated Mar. 4, 2011 of EP 10737736.8.
International Search Report dated Mar. 10, 2010 of PCT/US2010/022935.

International Search Report dated Mar. 11, 2009 of PCT/US2008/088246.

International Search Report dated Mar. 11, 2009 of PCT/US2008/088318.

International Search Report dated Mar. 21, 2011 of EP 10739828.1.
International Search Report dated Mar. 25, 2011 of EP 10737735.0.
International Search Report dated Mar. 25, 2011 of EP 10737829.9.
International Search Report dated Apr. 6, 2011 of EP 10192919.8.

International Search Report dated Apr. 13, 2011 of PCT/US2010/057821.

International Search Report dated Apr. 19, 2011 of PCT/US2010/059835.

International Search Report dated May 6, 2010 of EP 09716193.9.
International Search Report dated May 18, 2011 of EP 09812407.6.
International Search Report dated May 21, 2010 of PCT/US2009/064117.

International Search Report dated Jun. 22, 2010 of EP 08772151.0.
International Search Report dated Jul. 7, 2010 of PCT/US2010/026880.

International Search Report dated Jul. 9, 2010 of PCT/US2010/025970.

International Search Report dated Jul. 29, 2010 of EP 08873036.1.
International Search Report dated Aug. 5, 2009 of PCT/US2009/048511.

International Search Report dated Sep. 8, 2009 of PCT/US2009/045722.

International Search Report dated Sep. 13, 2010 of PCT/US2010/035041.

International Search Report dated Sep. 17, 2008 of PCT/US2008/068564.

International Search Report dated Sep. 17, 2009 of PCT/US2009/050756.

International Search Report dated Sep. 22, 2009 of PCT/US2009/047711.

International Search Report dated Oct. 19, 2009 of PCT/US2009/050223.

International Search Report dated Oct. 30, 2009 of PCT/US2009/056573.

International Search Report dated Dec. 14, 2009 of PCT/U20S09/061748.

International Search Report dated Dec. 14, 2010 of EP 09812408.4.

Isotopic Signature Wikipedia (2010), http://en.wikipedia.org/wiki/Isotopic_signature, Apr. 14, 2009, 3 pp.

Jensen, P. et al. Jul. 1992. 'Bubbling reefs' in the Kattegat: submarine landscapes of carbonate-cemented rocks support a diverse ecosystem at methane seeps. Marine Ecology Progress Series. 83: 103-112.

Jones. 1996. Principles and Prevention of Corrosion. Second Edition. Lebanon, Indiana: Prentice Hall. pp. 50-52.

Justnes, H. et al. "Pozzolanic, Amorphous Silica Produced from the Mineral Olivine." Proceedings of the Seventh CANMET/ACI International Conference on Fly Ash, Silica Fume, Slag and Natural Pozzolans in Concrete, 2001. SP-199-44. pp. 769-781.

Kohlmann et al., "Carbon Dioxide Emission Control by Mineral Carbonation: The Option for Finland"; INFUB 6th European Conference on Industrial Furnaces and Boilers Estoril Lisbon Portugal, Apr. 2-5, 2002 10pp.

Kostowskyj et al. 2008. Silver nanowire catalysts for alkaline fuel cells. International Journal of Hydrogen Energy. 33: 5773-5778.

Lackner, K. "Carbonate Chemistry for Sequestering Fossil Carbon"; Annual Review Energy Environ. Feb. 2002 27:193-232.

Lackner, K.S. et al. "Carbon Dioxide Disposal in Carbonate Minerals." Energy. Mar. 1995. 20(11): 1153-1170.

Levy, D. "Burnt biomass causes short-term global cooling, long-term warming." http://news-service.stanford.edu/news/2004/august4/biomass-84.html. 3 pages.

Li, et al., "Using Electrolytic Method to Promote CO2 Sequestration in Serpentine by Mineral Carbonation," Journal of China University of Mining and Technology, 36(6), pp. 817-821 Nov. 2007 (In Chinese, with English translation).

Lin, C. et al. Use of Cement Kiln Dust, Fly Ash, and Recycling Technique in Low-Volume Road Rehabilitation. Transportation Research Record, Dec. 1992, No. 1345, pp. 19-27 (abstract) [online], [retrieved on Dec. 31, 2009] <URL: http://pubsindex.trb.org/view.aspx?id=370714>.

Lopez-Capel, E. et al. Aug. 2005. Application of simultaneous thermal analysis mass spectrometry and stable carbon isotope analysis in a carbon sequestration study. Rapid Communications in Mass Spectrometry. 19: 3192-3198.

Mazrou, S., et al. Sep. 1997. Sodium hydroxide and hydrochloric acid generation from sodium chloride and rock salt by electro-electrodialysis. Journal of Applied Electrochemistry 27: 558-567.

(56) References Cited

OTHER PUBLICATIONS

McCrea, J.M. 1950. On the Isotopic Chemistry of Carbonates and a Paleotemperature Scale. The Journal of Chemical Physics. 18(6): 849-857.
Melezhik, V.A., et al. 2001. Palaeproterozoic magnesite: lithological and isotopic evidence for playa/sabkha environments. Sedimentology. 48: 379-397.
Merritt, R.C. 1971. Carbonate Leaching. The Extractive Metallurgy of Uranium: pp. 82-97. Colorado School of Mines Research Institute. Prepared Under Contract with the United States Atomic Energy Commission.
Metz. 2005. IPCC Special Report on Carbon Dioxide Capture and Storage. Cambridge University. p. 324 <http://books.google.com/books?id=HWgRvPUgyvQC&dq=serpentine+olivine+close+by+cement+plant&source=gbs_navlinks_s> viewed Jul. 15, 2011.
Mihalcea, R.M., et al. 1998. Diode-laser absorption measurements of $CO_2$ near 2.0 µm at elevated temperatures. Applied Optics. 37(36): 8341-8347.
Miljevic, N., et al. 2007. Potential Use of Environmental Isotopes in Pollutant Migration Studies. Environmental Isotopes in Pollutant Studies. 58: 251-262.
Montes-Hernandez, G. et al.,"Mineral sequestration of $CO_2$ by aqueous carbonation of coal combustion fly-ash." Journal of Hazardous Materials vol. 161 May 2009. pp. 1347-1354.
Mook, W.G., et al. 1968. Isotopic Equilibrium between Shells and Their Environment. Science. 159(3817): 874-875.
Mook, W.G., et al. 1974. Carbon Isotope Fractionation Between Dissolved Bicarbonate and Gaseous Carbon Dioxide. 22:169-176.
Mottana, A. et al. 1979. Der grosse Mineralienfuhrer, BLV Verlagsgesellschaft mbH, Munchen, XP002577921, p. 194. (In German with English Translation).
Nayak, V.S. "Nonelectrolytic Production of Caustic Soda and Hydrochloric Acid from Sodium Chloride"; Ind. Eng. Chem. Res. Aug. 1996. 35: 3808-3811.
Noda, H., et al. 1990. Electrochemical Reduction of Carbon Dioxide at Various Metal Electrodes in Aqueous Potassium Hydrogen Carbonate Solution. The Chemical Society of Japan. 63: 2459-2462.
O'Connor et al., "Carbon Dioxide Sequestration by Direct Mineral Carbonation: Results From Recent Studies and Current Status"; Albany Research Center, Albany Oregon; Office of Fossil Energy, US Dept. of Energy; 1st Annual DOE Carbon Sequestration Conference, Washington DC, May 2001 12pp.
O'Connor, W.K. et al. "Carbon dioxide sequestration: Aqueous mineral carbonation studies using olivine and serpentine." Aug. 2001. Albany Research Center, National Energy Technology Laboratory: Mineral Carbonation Workshop, Pittsburgh, PA.
O'Neil, J.R., et al. 1971. C13 and O18 compositions in some freshwater carbonates associated with ultramafic rocks and serpentines: western United States. Geochimica et Cosmochimica Acta. 35: 687-697.
Park, A., et al. Mar. 2004. $CO_2$ mineral sequestration: physically activated dissolution of serpentine and pH swing process. Chemical Engineering Science 59 (22-23): 5241-5247.
Perkins, S. Jul. 2004. Sea Change: Carbon Dioxide Imperils Marine Ecosystems. Science News. 166(3): 35.
Philp, R.P. 2007. The emergence of stable isotopes in environmental and forensic geochemistry studies: a review. Environ Chem Lett. 5:57-66.
Portier et al. 2005. Modeling $CO_2$ solubility in pure water and NaCl-type waters from 0 to 300° C. and from 1 to 300 bar Application to the Utsira Formation at Sleipner. Chemical Geology. 217: 187-199.
Power, I.M., et al. 2007. Biologically induced mineralization of dypingite by cyanobacteria from an alkaline wetland near Atlin, British Columbia, Canada. Geochemical Transactions. 8: 16 pages.
Quay, P.D., et al. 1992. Oceanic Uptake of Fossil Fuel $CO_2$: Carbon-13 Evidence. Science. 256 (5053): 74-79.

Rahardianto et al., "High recovery membrane desalting of low-salinity brackish water: Integration of accelerated precipitation softening with membrane RO"; Science Direct; Journal of Membrane Science 289 Nov. 2007 123-137.
Rakib, M. et al. Jan. 1999. Behaviour of Nafion® 350 membrane in sodium sulfate electrochemical splitting: continuous process modelling and pilot scale tests. Journal of Applied Electrochemistry. 29: 1439-1448.
Rau, G. Oct. 2004. Possible use of Fe/CO2 fuel cells for CO2 mitigation plus H2 and electricity production. Energy Conversion and Management. 45: 2143-2152.
Raz et al., "Formation of High-Magnesium Calcites via an Amorphous Precursor Phase: Possible Biological Implications"; Advanced Materials; Adv. Mater. Sep. 2000 vol. 12, No. 1; 5pp.
Rosenthal, E., "Cement Industry is at Center of Climate Change Debate" New York Times; www.nytimes.com/2007/10/26/business/worldbusiness/26cement.html"ref=todayspaper; 4pp.
Saad, N. et al. 2009. Measurement of Isotopic $CO_2$ in Dissolved Inorganic Carbons of Water Samples from Various Origins Using Wavelength-Scanned Cavity Ring-Down Spectrophotometer. Geophysical Research Abstracts. 11. (abstract only).
Sadhwani et al., Nov. 2005. "Case Studies on environmental impact of seawater desalination" Science Direct; http://www.sciencedirect.com/science?_ob=ArticleURL&_udi=B6TFX-4HMX97J-3&_u . . . 3pp.
Sakata, M. 1987. Movement and Neutralization of Alkaline Leachate at Coal Ash Disposal Sites. Environ. Sci. Technol. 21(8): 771-777.
Sample, J.C. et al. Mar. 1995. Isotope Geochemistry of Syntectonic Carbonate Cements and Veins from the Oregon Margin: Implications for the Hydrogelogic Evolution of the Accretionary Wedge. Proceedings of the Ocean Drilling Program, Scientific Results. 146: 137-148.
Sasakawa, M., et al. Carbonic Isotopic Characterization for the Origin of Excess Methane in Subsurface Seawater. Journal of Geophysical Research, vol. 113 (abstract) [online], Mar. 11, 2008 [retrieved on Jan. 1, 2010] <URL: http://www.agu.org/pubs/crossref/2008/2007JC004217.shtml>.
Schouten, S., et al. 2004. Stable Carbon Isotopic Fractionations Associated with Inorganic Carbon Fixation by Anaerobic Ammonium-Oxidizing Bacteria. Applied and Environmental Microbiology. 70(6): 3785-3788.
Schroll, E. 2002. Genesis of magnesite deposits in the view of isotope geochemistry. Boletim Paranaense de Geociencias. 50: 59-68.
Schwab, E. 2004. Calciumhydroxid, XP-002577920. Retrieved from the Internet: <URL:http://www.roempp.com/prod/index1.html> (In German with English Translation).
Serizawa et al., "Cell-compatible properties of calcium carbonates and hydroxyapatite deposited on ultrathin poly (vinyl alcohol)-coated polyethylene films"; J. Biomater. Sci. Polymer Edn., vol. 14, No. 7 Apr. 2003 pp. 653-663.
Sethi, S. et al. 2006. Existing & Emerging Concentrate Minimization & Disposal Practices for Membrane Systems. Florida Water Resources Journal. pp. 38, 40, 42, 44, 46, 48.
Shaffer, R. Aug. 2008 A Devlish Green Angel. Fast Company. N127: 92-97.
Shell Global Solutions, 2003. "ADIP-X and Sulfinol-X—new regenerable acid-gas removal processes"; Shell Global Solutions International; OG 130210370903-En(A); www.shellglobalsoultions.com 2 pp (presented at the 12th International Oil, Gas, and Petrochemicals Congress, Tehran, Iran Feb. 24-26, 2003).
Sheppard, S.M.F., et al. 1970. Fractionation of Carbon and Oxygen Isotopes and Magnesium between Coexisting Metamorphic Calcite and Dolomite. Contr. Mineral. and Petrol. 26. 161-198.
Sial, A.N., et al. 2000. Carbon isotope fluctuations in Precambrian carbonate sequences of several localities in Brazil. An. Acad. Bras. Ci. 72(4): 539-558.
Skrzypek, G. et al. Jul. 2006. $\delta^{13}C$ analyses of calcium carbonate: comparison between the GasBench and elemental analyzer techniques. Rapid Communications in Mass Spectrometry. 20: 2915-2920.
Socolow, R. Sep. 1997 Fuels Decarbonization and Carbon Sequestration: Report of a Workshop. Center for Energy and Environmental Studies School of Engineering and Applied Science. Princeton University, Princeton, NJ.

(56) References Cited

OTHER PUBLICATIONS

Soong, Y. et al. 2004. Experimental and simulation studies on mineral trapping of CO2 with brine. Energy Conversion and Management. 45: 1845-1859.

Stanley, S.M., et al. Sep. 2002. Low-magnesium calcite produced by coralline algae in seawater of Late Cretaceous composition. PNAS. 99(24): 15323-15326.

Tececo Pty Ltd, "Eco-Cement"; www.tececo.com/simple.eco-cement.php; Dec. 29, 2008; 6pp.

Technology for Commercialization of Slag. Feb. 1995. New Technology Japan. ISSN: 0385-6542. p. 35.

Turner, J.A. Jul. 1999. "A Realizable Renewable Energy Future." Science. 285(5428): 687-689.

Uibu, M. et al. "CO2 mineral sequestration in oil-shale wastes from Estonian power production." Journal of Environmental Management vol. 90 Sep. 2009. pp. 1253-1260.

Uibu, M. et al.,"Mineral trapping of CO2 via oil shale ash aqueous carbonation: controlling mechanism of process rate and development of continuous-flow reactor system." Oil Shale. vol. 26, No. 1 (2009) pp. 40-58.

Uliasz-Bochenczyk, A. et al. "Utilization of Carbon Dioxide in Fly Ash and Water Mixtures." Chemical Engineering Research and Design. Apr. 2006. 84(A9): 843-846.

Vagin, S.P., et al. Jul. 1979. Measurement of the Temperature of Gas Media Containing Carbon Dioxide by the Laser-Probing Method. Plenum.

Various authors. 2001. "Calcium Carbonate: From the Cretaceous Period Into the 21st Century." Birkhauser Verlag, pp. 1-54. <http://books.google.com/books?id=pbkKGal9k5QC&Ipg=PA15&ots=gjUUiWmGIR&dq=vaterite%20limestone&pg=PA54#v=twopage&q&f=true> viewed Jul. 14, 2011.

Wang, W., et al. Jan. 2005. Effects of biodegradation on the carbon isotopic composition of natural gas—A case study in the bamianhe oil field of the Jiyang Depression, Eastern China. Geochemical Journal. 39(4): 301-309. (abstract) [online] [retrieved on Dec. 29, 2009] <URL: http://www/jstage.jst.go.jp/article/geochemj/39/4/39_301/_article> ab.

Webber, M.E., et al. Feb. 2001. In situ combustion measurements of CO2 by use of a distributed-feedback diode-laser sensor near 2.0 μm. Applied Optics. 40(6): 821-828.

Wilson, S.A., et al. Dec. 2009. Carbon Dioxide Fixation within Mine Wastes of Ultramafic-Hosted Ore Deposits: Examples from the Clinton Creek and Cassiar Chrysotile Deposits, Canada. Society of Economic Geologists, Inc. 104: 95-112.

Winschel, R.A., et al. Stable Carbon Isotope Analysis of Coal/Petroleum Coprocessing Products. Preprints of Papers, American Chemical Society, Division of Fuel Chemistry, Jan. 1, 1988, vol. 33, No. 1, pp. 114-121 [online], [retrieved on Dec. 29, 2009] <URL: http://www.anl.gov/PCS/acsfuel/preprint%20archive/Files/33_1_TORONTO_06-88_0114.PDF>.

Wright, L.L., et al. Mar. 1993. "U.S. Carbon Offset Potential Using Biomass Energy Systems." Water, Air, and Soil Pollution. 70: 483-497.

Zedef, V., et al. Aug. 2000. Genesis of Vein Stockwork and Sedimentary Magnesite and Hydromagnesite Deposits in the Ultramafic Terranes of Southwestern Turkey: A Stable Isotope Study. 95: 429-446.

Zhang, C.L. et al. 2001. Temperature-dependent oxygen and carbon isotope fractionations of biogenic siderite. Geochimica et Cosmochimica Acta. 65(14): 2257-2271.

Kralj, et al. Effect of Inorganic Anions on the Morphology and Structure of Magnesium Calcite. Chemistry—A European Journal. 2004; 10(7):1647-1656.

* cited by examiner

NON-CEMENTITIOUS COMPOSITIONS COMPRISING VATERITE AND METHODS THEREOF

CROSS-REFERENCE TO RELATED APPLICATIONS

This application claims priority to U.S. Provisional Application No. 61/642,281, filed May 3, 2012 and U.S. Provisional Application No. 61/649,725, filed May 21, 2012 and is a continuation-in-part of U.S. patent application Ser. No. 13/153,815, filed Jun. 6, 2011, which is a continuation of U.S. patent application Ser. No. 12/790,317, filed May 28, 2010, which is a divisional of U.S. patent application Ser. No. 12/609,491, issued as U.S. Pat. No. 7,829,053, issued Nov. 9, 2010, which claims the benefit of: U.S. Provisional Application No. 61/110,495, filed 31 Oct. 2008; U.S. Provisional Application No. 61/149,949, filed 4 Feb. 2009; and U.S. Provisional Application No. 61/181,250, filed 26 May 2009, all which applications are incorporated herein by reference in their entireties.

GOVERNMENT SUPPORT

Work described herein was made in whole or in part with Government support under Award Number: DE-FE0002472 awarded by the Department of Energy. The Government has certain rights in this invention.

BACKGROUND

Carbon dioxide ($CO_2$) emissions have been identified as a major contributor to the phenomenon of global warming and ocean acidification. $CO_2$ is a by-product of combustion and it creates operational, economic, and environmental problems. It is expected that elevated atmospheric concentrations of $CO_2$ and other greenhouse gases will facilitate greater storage of heat within the atmosphere leading to enhanced surface temperatures and rapid climate change. $CO_2$ has also been interacting with the oceans driving down the pH toward 8.0. $CO_2$ monitoring has shown atmospheric $CO_2$ has risen from approximately 280 ppm in the 1950s to approximately 380 pmm, and is expected to exceed 400 ppm in the next decade. Reducing potential risks of climate change would require sequestration of atmospheric $CO_2$. There exists a need for making environmentally safe products that sequester $CO_2$.

SUMMARY

In one aspect, there is provided a non-cementitious composition, comprising: a carbonate additive, wherein the carbonate additive comprises reactive vaterite and a non-cementitious additive. In some embodiments of the foregoing aspect, the carbonate additive has a carbon isotopic fractionation value ($\delta^{13}C$) of less than −12‰. In some embodiments of the foregoing aspect and embodiments, the carbonate additive comprises between 50-99% w/w reactive vaterite. In some embodiments of the foregoing aspect and embodiments, the non-cementitious additive is more than 20% w/w cellulosic or polymeric fiber. In some embodiments of the foregoing aspect and embodiments, the composition comprises between 5-50% w/w carbonate additive. In some embodiments of the foregoing aspect and embodiments, the carbonate additive has an average particle size of between 0.5-25 microns. In some embodiments of the foregoing aspect and embodiments, the composition further comprises one or more activation additives wherein the one or more additives are ions selected from beryllium, magnesium, strontium, barium, and combinations thereof. In some embodiments of the foregoing aspect and embodiments, the one or more activation additives are between 0.5-30% w/w in the composition. In some embodiments of the foregoing aspect and embodiments, the composition is for a paper product; polymeric product; lubricant; adhesive; rubber; chalk; asphalt product; paint; abrasive for paint removal; personal care product; cosmetic; cleaning product; personal hygiene product; ingestible product; agricultural product; environmental remediation product; or combinations thereof.

In another aspect, there is provided a paper product, comprising: between 5-50% w/w carbonate additive, wherein the carbonate additive comprises aragonite. In some embodiments, there is provided a paper product, comprising: between 5-50% w/w carbonate additive, wherein the carbonate additive comprises at least 50% w/w aragonite. In some embodiments, there is provided a paper product, comprising: between 5-50% w/w carbonate additive, wherein the carbonate additive comprises aragonite, wherein the carbonate additive has a carbon isotopic fractionation value ($\delta^{13}C$) of less than −12‰. In some embodiments, there is provided a paper product, comprising: between 5-50% w/w carbonate additive, wherein the carbonate additive comprises at least 50% w/w aragonite, wherein the carbonate additive has a carbon isotopic fractionation value ($\delta^{13}C$) of less than −12‰. In some embodiments of the foregoing aspect and embodiments, the paper product is selected from, but not limited to, bond paper, newspaper, printing paper, writing paper, construction paper, cover paper, envelope paper, form bond, free sheet, mechanical paper, insulating board, wrapping paper, offset paper, packaging paper, recycled paper, label, card stock, paperboard, corrugated fiberboard, containerboard, wallboard, box, bag, paper products to make cigarette paper, binder for cigar, cigarette packaging, paper product for wiping fluid, paper product in medical use, paper products in household use, and combinations thereof. In some embodiments of the foregoing aspect and embodiments, the carbonate additive further comprises strontianite. In some embodiments of the foregoing aspect and embodiments, the carbonate additive further comprises between 0.1-99% w/w strontianite. In some embodiments of the foregoing aspect and embodiments, the paper product comprises more than 20% w/w cellulosic or polymeric fiber or pulp. In some embodiments of the foregoing aspect and embodiments, the carbonate additive comprises between 50-99% w/w aragonite. In some embodiments of the foregoing aspect and embodiments, the carbonate additive has an average particle size of between 0.5-25 microns. In some embodiments of the foregoing aspect and embodiments, the composition further comprises one or more activation additives wherein the one or more additives are ions selected from beryllium, magnesium, strontium, barium, and combinations thereof. In some embodiments of the foregoing aspect and embodiments, the one or more activation additives are between 0.5-30% w/w in the composition. In some embodiments of the foregoing aspect and embodiments, the paper product comprises a microstructure network of aragonite. In some embodiments of the foregoing aspect and embodiments, the paper product comprises the aragonite bound with the fiber or the pulp. In some embodiments of the foregoing aspect and embodiments, the aragonite in the paper product results in one or more of properties including, but not limited to, better linkage or bonding, higher tensile strength, higher burst strength, higher tear strength, higher impact fracture toughness, and combinations thereof of the non-cementitious product as compared to the non-cementitious product comprising stable vaterite.

In another aspect, there is provided a method for producing a non-cementitious product, the method comprising a) producing a carbonate additive, wherein the carbonate additive comprises reactive vaterite; b) mixing the carbonate additive with a non-cementitious additive; and c) producing a non-cementitious product. In some embodiments of the foregoing aspect, the carbonate additive comprises contacting $CO_2$ with a proton removing agent to form a solution; and contacting the solution with water comprising alkaline earth-metal ions under one or more precipitation conditions to make the carbonate additive comprising reactive vaterite. In some embodiments of the foregoing aspect and embodiment, the step a) and step b) are conducted at the same time and the carbonate additive comprising reactive vaterite is formed in situ. In some embodiments of the foregoing aspect and embodiments, the non-cementitious additive is pulp and the carbonate additive comprising reactive vaterite is transformed to aragonite in situ to form paper product. In some embodiments, there is provided a method for producing a paper product, the method comprising a) contacting $CO_2$ with a solution comprising proton removing agent, alkaline earth-metal ions, and pulp under one or more precipitation conditions to make the carbonate additive comprising reactive vaterite in situ; b) transforming the reactive vaterite to aragonite in situ, and c) forming a paper product. In some embodiments, there is provided a method for producing a non-cementitious product comprising a) producing a carbonate additive comprising calcining limestone to form calcium oxide, forming hydrated lime from the calcium oxide, and treating the hydrated lime with $CO_2$ to form the carbonate additive comprising reactive vaterite, and b) mixing the carbonate additive with a non-cementitious additive to form the non-cementitious product. In some embodiments, the foregoing method of producing the carbonate additive is a traditional PCC manufacturing process except that the carbonate additive formed comprises reactive vaterite. In some embodiments of the foregoing aspect and embodiments, the method further comprises contacting a stabilizer with the water comprising alkaline earth-metal ions wherein the stabilizer stabilizes the reactive vaterite. In some embodiments of the foregoing aspect and embodiments, the alkaline earth-metal ions comprise calcium ions, magnesium ions, or combination thereof. In some embodiments of the foregoing aspect and embodiments, the $CO_2$ is contacted with carbide lime solution wherein the carbide lime solution provides both the proton removing agent and the calcium ions. In some embodiments of the foregoing aspect and embodiments, the one or more precipitation conditions are selected from temperature, pH, pressure, ion ratio, precipitation rate, presence of additive, presence of ionic species, concentration of additive and ionic species, stirring, residence time, mixing rate, forms of agitation, presence of seed crystal, catalyst, membrane, or substrate, dewatering, drying, ball milling, and combinations thereof. In some embodiments of the foregoing aspect and embodiments, the method further comprises activating the reactive vaterite to facilitate transformation of the reactive vaterite to aragonite during, or after step b) by nuclei activation, thermal activation, mechanical activation, chemical activation, or combinations thereof. In some embodiments of the foregoing aspect and embodiments, the activation comprises adding one or more of aragonite seed, inorganic additive or organic additive. In some embodiments of the foregoing aspect and embodiments, the method further comprises activating the reactive vaterite to facilitate transformation of the reactive vaterite to aragonite during and/or after step b). In some embodiments of the foregoing aspect and embodiments, the method comprises adding one or more of the inorganic additives selected from beryllium, magnesium, strontium, barium, and combinations thereof, to the carbonate additive before, during, and/or after step b) to facilitate transformation of the reactive vaterite to the aragonite. In some embodiments of the foregoing aspect and embodiments, the formation of the aragonite results in one or more of properties selected from, but not limited to, better linkage or bonding, higher tensile strength, higher burst strength, higher tear strength, higher impact fracture toughness, and combinations thereof of the non-cementitious product as compared to the non-cementitious product comprising stable vaterite. In some embodiments of the foregoing aspect and embodiments, the amount of the one or more inorganic additives in the added solution is between 0.05-0.5M. In some embodiments of the foregoing aspect and embodiments, the non-cementitious additive is a cellulosic fiber or polymeric fiber to make a paper product. In some embodiments of the foregoing aspect and embodiments, the non-cementitious product is a paper product; polymeric product; lubricant; adhesive; rubber; chalk; asphalt product; paint; abrasive for paint removal; personal care product; cosmetic; cleaning product; personal hygiene product; ingestible product; agricultural product; environmental remediation product; or combinations thereof. In some embodiments, the method further includes adding a cellulosic fiber or polymeric fiber to the non-cementitious composition to make a paper product. In some embodiments of the foregoing aspect and embodiments, the method comprises making the non-cementitious product comprising at least 50% w/w aragonitic carbonate additive.

In another aspect, there is provided a product formed by the foregoing methods.

In another aspect, there is provided a system for making a non-cementitious product, comprising (a) an input for an alkaline earth-metal containing water; (b) an input for a $CO_2$ source; (c) optionally an input for a stabilizer source; (d) a reactor operably connected to the inputs of (a), (b), and (c) that is configured to make a carbonate additive comprising reactive vaterite; and (e) a processor operably connected to the reactor and configured to mix a non-cementitous additive with the carbonate additive comprising reactive vaterite to form the non-cementitious product. In some embodiments of the foregoing aspect, the input for the alkaline earth-metal containing water is an input for carbide lime.

In some embodiments, the invention provides a non-cementitious composition in which the carbonate compound composition includes a precipitate from an alkaline-earth-metal-containing water. In some embodiments, the invention provides a non-cementitious composition in which the alkaline-earth-metal-containing water from which the carbonate compound composition precipitate forms includes $CO_2$ derived from an industrial waste stream. In some embodiments, the invention provides a non-cementitious composition in which the non-cementitious composition is for a paper product. In some embodiments, the invention provides a non-cementitious composition in which the non-cementitious composition is for a polymeric product. In some embodiments, the invention provides a non-cementitious composition in which the non-cementitious composition is for a lubricant, an adhesive, rubber, chalk, asphalt product, paint, abrasive for paint removal, personal care product, ingestible product, agricultural product, and/or environmental remediation product.

INCORPORATION BY REFERENCE

All publications, patents, and patent applications mentioned in this specification are herein incorporated by refer-

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
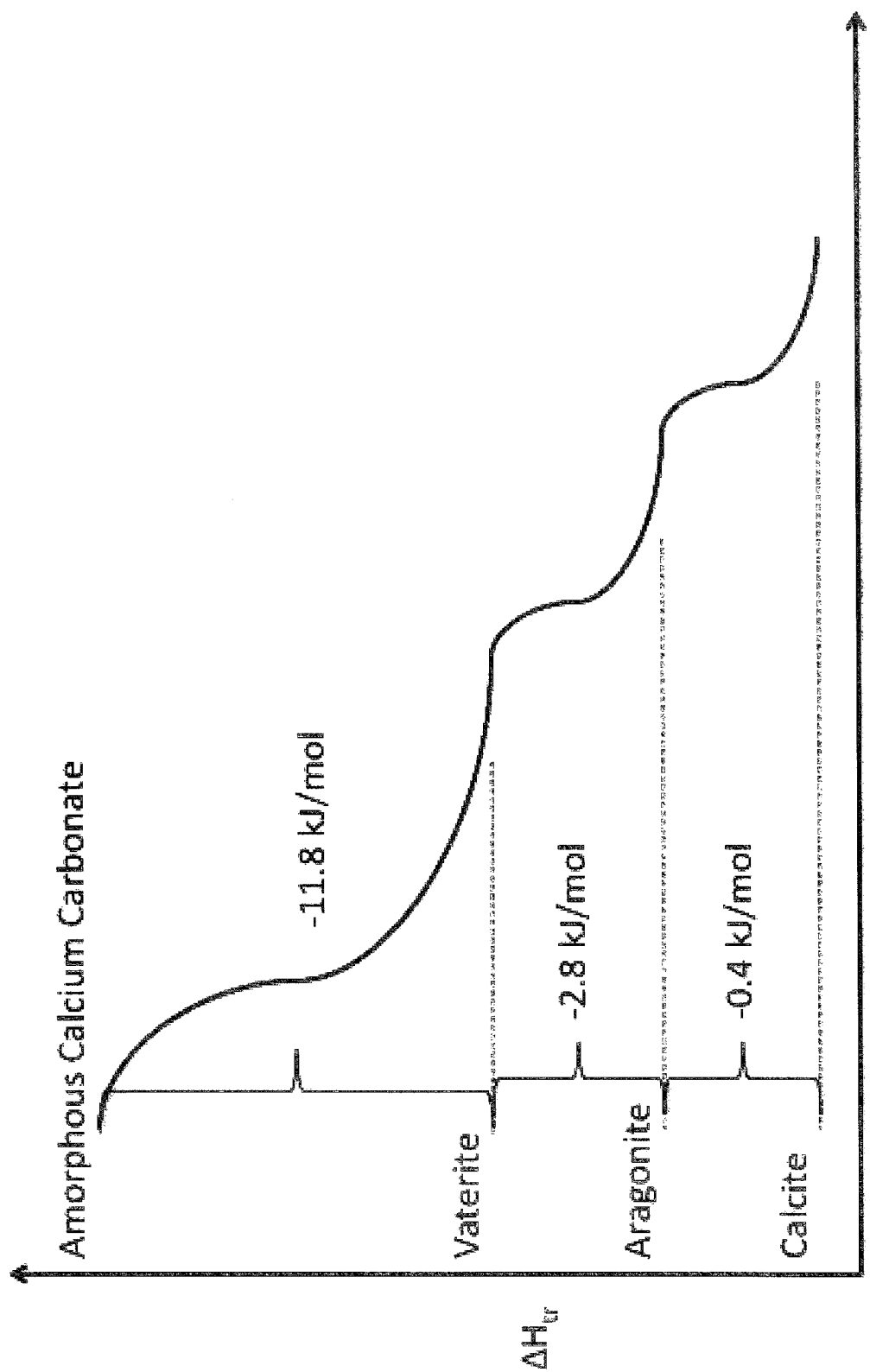
FIG. 1 illustrates a Gibbs free energy diagram of the transition from vaterite to aragonite.

Provided herein are non-cementitious carbonate compositions, products, methods, and systems. In some embodiments, the compositions of the invention include a carbonate additive that comprises vaterite such as a reactive vaterite. In some embodiments, the compositions of the invention include a $CO_2$ sequestering additive that comprises a reactive vaterite. Additional aspects of the invention include methods of making and using the non-cementitious carbonate compositions.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a," "an," and "the" include plural references unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

I. Compositions And Products

Provided herein are non-cementitious compositions comprising carbonate additive and a non-cementitious additive. In some embodiments, the carbonate additive comprises a reactive vaterite. The process of forming non-cementitious compositions includes combining the composition containing reactive vaterite and the non-cementitious additive optionally in water.

The "non-cementitious" as used herein, includes the compositions that are not cementitious compositions, e.g., hydraulic cements, supplementary cementitious materials, aggregate, mortar, etc. Some examples of the non-cementitious compositions or the products made therefrom are presented herein including, but not limited to, paper product, polymer product, lubricant, adhesive, rubber product, chalk, asphalt product, paint, abrasive for paint removal, personal care product, cosmetic, cleaning product, personal hygiene product, ingestible product, agricultural product, soil amendment product, pesticide, environmental remediation product, and combination thereof. Such non-cementitious compositions have been described herein.

The "carbonate additive" or "carbonate composition" or "$CO_2$ sequestering additive" as used interchangeably herein, includes a carbonate that contains vaterite. In some embodiments, the vaterite in the carbonate additive is a reactive vaterite. In some embodiments, the carbonate additive may be formed by sequestering $CO_2$ and such compositions include $CO_2$ sequestering additive or $CO_2$ sequestering composition, as described herein. In some embodiments, the carbonate additive may be formed from traditional precipitated calcium carbonate (PCC) method, as described herein.

The "reactive vaterite" or "activated vaterite" or its grammatical equivalent as used herein, includes vaterite that results in aragonite formation during and/or after dissolution-re-precipitation process. The formation of such reactive vaterite may be by a method that sequesters $CO_2$, or by a method that uses traditional PCC. Such methods have been described herein further below. The "activation" of the reactive vaterite, as used herein includes any conditions and/or additives that facilitate reactive vaterite transformation to aragonite.

The "non-cementitious additive" as used herein, includes any additive that may be added to the carbonate additive to form a non-cementitious composition and/or product. Some examples of the non-cementitious additives have been described herein further below.

Applicants unexpectedly and surprisingly found that in some embodiments, the non-cementitious compositions of the invention benefit by the activated or reactive vaterite in the composition. For example, the transformation of the reactive vaterite to the aragonite in the cellulosic fiber pulp may result in linkage and bonding between the vaterite and the fiber such that a paper product can be formed with less fiber. The use of less cellulosic fiber is beneficial to the environment as the cellulosic fiber is made from wood. In some embodiments, the transformation of the vaterite to the aragonite may result in better tensile strength, burst strength, and/or tear strength of the non-cementitious product, such as, but not limited to, paper, enhancing the properties of the paper. Further, the non-cementitious compositions or the non-cementitious products of the invention are greener as they result in less environment damaging non-cementitious additives such as cellulosic fiber made from wood pulp. In some embodiments, where the carbonate additive is formed by sequestering $CO_2$, the non-cementitious compositions or the non-cementitious products of the invention are greener as they also contain carbon dioxide sequestered from the environment.

Typically, upon precipitation of the calcium carbonate, amorphous calcium carbonate (ACC) may initially precipitate and transform into one or more of its three more stable phases (vaterite, aragonite, or calcite). A thermodynamic driving force may exist for the transformation from unstable phases to more stable phases, as described by Ostwald in his Step Rule (Ostwald, W. *Zeitschrift fur Physikalische Chemie* 289 (1897)). For this reason, calcium carbonate phases transform in the order: ACC to vaterite, aragonite, and calcite where intermediate phases may or may not be present. During this transformation, excesses of energy are released, as exhibited by FIG. 1. This intrinsic energy may be harnessed to create a strong aggregation tendency and surface interactions that may lead to agglomeration and setting or cementing. It is to be understood that the values reported in FIG. 1 are well known in the art and may vary.

Applicants have been able to produce or isolate the carbonate additive in the vaterite form. The carbonate additive may be in a wet form or a dry powder form. This carbonate additive may have a stable vaterite form that does not transform readily to any other polymorph or may have a reactive vaterite form that transforms to aragonite form. The aragonite form does not convert further to more stable calcite form. The product containing the aragonite form of the carbonate additive shows one or more unexpected properties, including but not limited to, high tensile strength, high burst strength, high tear strength, neutral pH, microstructure network, etc.

The carbonate additive comprising vaterite such as reactive vaterite may further include precipitated crystalline and/or amorphous carbonate compounds. In addition to vaterite, other carbonate minerals may be present in the carbonate additive and include, but are not limited to: calcium carbonate minerals, magnesium carbonate minerals and calcium magnesium carbonate minerals. Calcium carbonate minerals in addition to vaterite include, but are not limited to: calcite, aragonite, ikaite, amorphous calcium carbonate, a precursor phase of vaterite, a precursor phase of aragonite, an intermediary phase that is less stable than calcite, polymorphic forms in between these polymorphs, and combination thereof. Magnesium carbonate minerals include, but are not limited to: magnesite ($MgCO_3$), barringtonite ($MgCO_3 \cdot 2H_2O$), nesquehonite ($MgCO_3 \cdot 3H_2O$), lanfordite ($MgCO_3 \cdot 5H_2O$) and amorphous magnesium calcium carbonate ($MgCO_3 \cdot nH_2O$). Calcium magnesium carbonate minerals include, but are not limited to dolomite ($CaMgCO_3$), huntite ($CaMg_3(CO_3)_4$) and sergeevite ($Ca_2Mg_{11}(CO_3)_{13} \cdot H_2O$). In certain embodiments, non-carbonate compounds like brucite ($Mg(OH)_2$) may also form in combination with the minerals listed above.

Vaterite or reactive vaterite may be present in monodisperse or agglomerated form, and may be in spherical, ellipsoidal, plate like shape, or hexagonal system. Vaterite typically has a hexagonal crystal structure and forms polycrystalline spherical particles upon growth. The precursor form of vaterite may comprise nanoclusters of vaterite and the precursor form of aragonite may comprise sub-micron to nanoclusters of aragonite needles. Aragonite, if present in the composition, may be needle shaped, columnar, or crystals of the rhombic system. Calcite, if present, may be cubic, spindle, or crystals of hexagonal system. An intermediary phase that is less stable than calcite may be a phase that is between vaterite and calcite, a phase between precursor of vaterite and calcite, a phase between aragonite and calcite, and/or a phase between precursor of aragonite and calcite.

In some embodiments, the carbonate additive or the $CO_2$ sequestering additives provided herein are synthetic compositions and are not naturally occurring. In some embodiments, the carbonate additive or the $CO_2$ sequestering additives provided herein are non-medical or are not for medical procedures. In some embodiments, the carbonate additive or the $CO_2$ sequestering additives is in a powder form. In some embodiments, the carbonate additive or the $CO_2$ sequestering additives is in a dry powder form. In some embodiments, the carbonate additive or the $CO_2$ sequestering additives is disordered or is not in an ordered array or is in the powdered form. In still some embodiments, the carbonate additive or the $CO_2$ sequestering additives is in a partially or wholly hydrated form.

In some embodiments of the aspects and embodiments provided herein, the non-cementitious composition or the carbonate additive or the $CO_2$ sequestering additive includes at least 10% w/w vaterite; or at least 20% w/w vaterite; or at least 30% w/w vaterite; or at least 40% w/w vaterite; or at least 50% w/w vaterite; or at least 60% w/w vaterite; or at least 70% w/w vaterite; or at least 80% w/w vaterite; or at least 90% w/w vaterite; or at least 95% w/w vaterite; or at least 99% w/w vaterite; or from 10% w/w to 99% w/w vaterite; or from 10% w/w to 90% w/w vaterite; or from 10% w/w to 80% w/w vaterite; or from 10% w/w to 70% w/w vaterite; or from 10% w/w to 60% w/w vaterite; or from 10% w/w to 50% w/w vaterite; or from 10% w/w to 40% w/w vaterite; or from 10% w/w to 30% w/w vaterite; or from 10% w/w to 20% w/w vaterite; or from 20% w/w to 99% w/w vaterite; or from 20% w/w to 95% w/w vaterite; or from 20% w/w to 90% w/w vaterite; or from 20% w/w to 75% w/w vaterite; or from 20% w/w to 50% w/w vaterite; or from 30% w/w to 99% w/w vaterite; or from 30% w/w to 95% w/w vaterite; or from 30% w/w to 90% w/w vaterite; or from 30% w/w to 75% w/w vaterite; or from 30% w/w to 50% w/w vaterite; or from 40% w/w to 99% w/w vaterite; or from 40% w/w to 95% w/w vaterite; or from 40% w/w to 90% w/w vaterite; or from 40% w/w to 75% w/w vaterite; or from 50% w/w to 99% w/w vaterite; or from 50% w/w to 95% w/w vaterite; or from 50% w/w to 90% w/w vaterite; or from 50% w/w to 75% w/w vaterite; or from 60% w/w to 99% w/w vaterite; or from 60% w/w to 95% w/w vaterite; or from 60% w/w to 90% w/w vaterite; or from 70% w/w to 99% w/w vaterite; or from 70% w/w to 95% w/w vaterite; or from 70% w/w to 90% w/w vaterite; or from 80% w/w to 99% w/w vaterite; or from 80% w/w to 95% w/w vaterite; or from 80% w/w to 90% w/w vaterite; or from 90% w/w to 99% w/w vaterite; or 10% w/w vaterite; or 20% w/w vaterite; or 30% w/w vaterite; or 40% w/w vaterite; or 50% w/w vaterite; or 60% w/w vaterite; or 70% w/w vaterite; or 75% w/w vaterite; or 80% w/w vaterite; or 85% w/w vaterite; or 90% w/w vaterite; or 95% w/w vaterite; or 99% w/w vaterite. In some embodiments, the non-cementitious composition or the carbonate additive or the $CO_2$ sequestering additive includes 100% w/w vaterite. The vaterite may be stable vaterite or reactive vaterite. In some embodiments, the non-cementitious composition or the carbonate additive or the $CO_2$ sequestering additive contains at least 50% by weight reactive vaterite or between 50-100% by weight reactive vaterite or between 50-99% by weight reactive vaterite. In some embodiments, the above recited percentages are for the reactive vaterite in the carbonate additive or the compositions of the invention. In some embodiments, there is provided a non-cementitious composition, comprising a carbonate additive, wherein the carbonate additive comprises at least 50% w/w reactive vaterite or 50-99% w/w reactive vaterite and a non-cementitious additive.

The carbonate additive or the carbonate compositions of the invention include compositions that contain carbonates (including reactive vaterite) and optionally bicarbonates, which may be in combination with a divalent cation such as calcium and/or magnesium, or with a monovalent cation such as sodium. The carbonates and optionally bicarbonates may be in solution, in solid form, or a combination of solution and solid form, e.g., a slurry.

As the carbonate additives or compositions are precipitated from water, they may include one or more additives that are present in the water from which they are derived. For example, where the water is salt water, the carbonate products may include one or more compounds found in the salt water source. These compounds may be used to identify the solid precipitations of the compositions that come from the salt water source, where these identifying components and the amounts thereof are collectively referred to herein as a salt-water source identifier. For example, if the saltwater source is sea water, identifying compounds that may be present in the precipitated solids of the compositions include, but are not limited to: chloride, sodium, sulfur, potassium, bromide, silicon, strontium and the like. Any such source-identifying or "marker" elements would generally be present in small amounts, e.g., in amounts of 20,000 ppm or less, such as amounts of 2000 ppm or less. The salt water source identifier of the compositions may vary depending on the particular salt water source employed to produce the salt water-derived carbonate composition. Also of interest are isotopic markers that identify the water source.

In some embodiments, the marker compound is an ion that was present in the water used in the process of formation of the carbonate additive, for example only, strontium, which may be present in the precipitate incorporated into the aragonite lattice or may be present as strontianite ($SrCO_3$), and make up 10,000 ppm or less, ranging in certain embodiments from 3 to 10,000 ppm, such as from 5 to 5000 ppm, including 5 to 1000 ppm, e.g., 5 to 500 ppm, including 5 to 100 ppm. Another "marker" compound of interest is magnesium, which may be present in amounts of up to 20% mole substitution for calcium in carbonate compounds.

Depending on the particular non-cementitious material or product, the amount of the carbonate additive or the $CO_2$ sequestering additive in the non-cementitious composition may vary. In some embodiments, the amount of the carbonate additive or the $CO_2$ sequestering additive in the non-cementitious composition ranges from 5 to 95% w/w, or 5 to 90% w/w, or 5 to 80% w/w, or 5 to 70% w/w, or 5 to 50% w/w, or 5 to 25% w/w, or 5 to 10% w/w, or 10 to 95% w/w, or 10 to 90% w/w, or 10 to 80% w/w, or 10 to 70% w/w, or 10 to 50% w/w, or 10 to 25% w/w, or 15 to 50% w/w, or 15 to 40% w/w, or 15 to 25% w/w, or 15 to 20% w/w, 25 to 95% w/w, or 25 to 90% w/w, or 25 to 80% w/w, or 25 to 70% w/w, or 25 to 50% w/w, or 50 to 95% w/w, or 50 to 90% w/w, or 50 to 75% w/w, or 50 to 60% w/w, or 60 to 95% w/w, or 75 to 95% w/w, or 85 to 95% w/w. In some embodiments, the remaining is the non-cementitious additive optionally containing water. In some embodiments, the remaining is the non-cementitious additive and the additives added during the formation of the composition. In some embodiments, there is provided a non-cementitious composition, comprising between 5-50% w/w carbonate additive, wherein the carbonate additive comprises reactive vaterite and a non-cementitious additive. In some embodiments, there is provided a non-cementitious composition, comprising between 5-50% w/w carbonate additive, wherein the carbonate additive comprises 50-99% w/w reactive vaterite, and a non-cementitious additive. In some embodiments, in the foregoing embodiments, the carbonate additive further comprises strontium. In some embodiments, there is provided a non-cementitious composition, comprising between 5-50% w/w carbonate additive, wherein the carbonate additive comprises 50-99% w/w reactive vaterite, strontium, and a non-cementitious additive In some embodiments, the carbonate additive is a $CO_2$ sequestering additive. Accordingly, there is provided a non-cementitious composition, comprising a $CO_2$ sequestering additive, wherein the $CO_2$ sequestering additive comprises vaterite. In some embodiments, there is provided a non-cementitious composition, comprising a $CO_2$ sequestering additive, wherein the $CO_2$ sequestering additive comprises reactive vaterite. In some embodiments, the $CO_2$ sequestering composition or $CO_2$ sequestering additive contains carbon derived from a fuel used by humans. For example, carbon having a fossil fuel origin. For example, $CO_2$ sequestering compositions according to aspects of the present invention contain carbon that was released in the form of $CO_2$ from the combustion of fuel. In certain embodiments, the carbon sequestered in a $CO_2$ sequestering composition, e.g. in the reactive vaterite, is in the form of a carbonate compound. Therefore, in certain embodiments, $CO_2$ sequestering compositions according to aspects provided herein contain carbonate compounds where at least part of the carbon in the carbonate compounds is derived from a fuel used by humans, e.g., a fossil fuel. As such, production of compositions provided herein results in the placement of $CO_2$ into a storage stable form, e.g., a stable component of a non-cementitious composition and/or product. Production of the $CO_2$ sequestering compositions provided herein thus results in the prevention of $CO_2$ gas from entering the atmosphere. The compositions provided herein provide for storage of $CO_2$ in a manner such that $CO_2$ sequestered (i.e., fixed) in the composition does not become part of the atmosphere. Compositions provided herein keep the sequestered $CO_2$ fixed for substantially the life of the composition, without significant, if any, release of the $CO_2$ from the composition. As such, where the compositions are consumable compositions, the $CO_2$ fixed therein may remain fixed for the life of the consumable, if not longer.

The $CO_2$ sequestering additives are components that store $CO_2$ in a storage stable format, such that $CO_2$ gas is not readily produced from the product and released into the atmosphere. In certain embodiments, the $CO_2$ sequestering additives can store 50 tons or more of $CO_2$, such as 100 tons or more of $CO_2$, including 250 tons or more of $CO_2$, for instance 500 tons or more of $CO_2$, such as 750 tons or more of $CO_2$, including 900 tons or more of $CO_2$ for every 1000 tons of composition of the invention. In certain embodiments, the $CO_2$ sequestering additives of the compositions of the invention comprise about 5% or more of $CO_2$, such as about 10% or more of $CO_2$, including about 25% or more of $CO_2$, for instance about 50% or more of $CO_2$, such as about 75% or more of $CO_2$, including about 90% or more of $CO_2$, e.g., present as one or more carbonate compounds such as reactive vaterite.

The compositions provided herein may be viewed as low-carbon footprint compositions. Low-carbon footprint compositions have a reduced carbon footprint as compared to corresponding compositions that lack the $CO_2$ sequestering additive (where "corresponding" herein means the identical composition but for the presence of the $CO_2$ sequestering additive of the invention). Using any convenient carbon footprint calculator, the magnitude of carbon footprint reduction of the compositions provided herein as compared to corresponding compositions that lack the $CO_2$ sequestering additive may be 5% or more, such as 10% or more, including 25%, 50%, 75% or even 100% or more. In certain embodiments, the low-carbon footprint compositions provided herein are carbon neutral, in that they have substantially no, if any, calculated carbon footprint, e.g., as determined using any convenient carbon footprint calculator that is relevant for a particular composition of interest. Carbon neutral compositions provided herein include those compositions that exhibit a carbon footprint of 50 lbs $CO_2$/cu yd material or less, such as 10 lbs $CO_2$/cu yd material or less, including 5 lbs $CO_2$/cu yd material or less, where in certain embodiments the carbon neutral compositions have 0 or negative lbs $CO_2$/cu yd material, such as negative 1 or more, e.g., negative 3 or more lbs $CO_2$/cu yd material. In some instances, the low carbon footprint compositions have a significantly negative carbon footprint, e.g., -100 or more lbs $CO_2$/cu yd or less.

The carbonates (including vaterite such as reactive vaterite) and/or bicarbonates in the $CO_2$ sequestering compositions or the $CO_2$ sequestering additives may contain carbon dioxide from a source of carbon dioxide; in some embodiments the carbon dioxide originates from the burning of fossil fuel, and thus some (e.g., at least 10, 50, 60, 70, 80, 90, 95%) or substantially all (e.g., at least 99, 99.5, or 99.9%) of the carbon in the carbonates and/or bicarbonates is of fossil fuel origin, i.e., of plant origin. As is known, carbon of plant origin has a different ratio of stable isotopes ($^{13}C$ and $^{12}C$) than carbon of inorganic origin, and thus the carbon in the carbonates and/or bicarbonates, in some embodiments, has a $\delta^{13}C$ of less than, e.g., -10‰, or less than -15‰, or less than -20‰, or less than -35‰, or less than -30‰, or less than -35‰ as described in further detail herein below.

In certain embodiments compositions provided herein contain carbon from fossil fuel; because of its fossil fuel origin, the carbon isotopic fractionation ($\delta^{13}C$) value of such compositions may be different from that of compositions containing inorganic carbon, e.g., limestone. Typically, the plants from which fossil fuels are derived may preferentially utilize $^{12}C$ over $^{13}C$, thus fractionating the carbon isotopes so that the value of their ratio differs from that in the atmosphere in general; this value, when compared to a standard value (PeeDee Belemnite, or PDB, standard), is termed the carbon isotopic fractionation ($\delta^{13}C$) value. $\delta^{13}C$ values for coal are generally in the range -30 to -20‰ and $\delta^{13}C$ values for methane may be as low as -20‰ to -40‰ or even -40‰ to -80‰. $\delta^{13}C$ values for atmospheric $CO_2$ are -10‰ to -7‰, for limestone +3‰ to -3‰, and for marine bicarbonate, 0‰.

Precipitation material or the carbonate additive, which comprises one or more synthetic carbonates derived from industrial $CO_2$, reflects the relative carbon isotope composition ($\delta^{13}C$) of the fossil fuel (e.g., coal, oil, natural gas, or flue gas) from which the industrial $CO_2$ (from combustion of the fossil fuel) was derived. The relative carbon isotope composition ($\delta^{13}C$) value with units of ‰ (per mil) is a measure of the ratio of the concentration of two stable isotopes of carbon, namely $^{12}C$ and $^{13}C$, relative to a standard of fossilized belemnite (the PDB standard).

$$\delta^{13}C\ \text{‰} = [(^{13}C/^{12}C_{sample} - ^{13}C/^{12}C_{PDB\ standard})/(^{13}C/^{12}C_{PDB\ standard})] \times 1000$$

$^{13}C$ is preferentially taken up by plants during photosynthesis and in other biological processes that use inorganic carbon because of its lower mass. The lower mass of $^{12}C$ allows for kinetically limited reactions to proceed more efficiently than with $^{13}C$. Thus, materials that are derived from plant material, e.g., fossil fuels, have relative carbon isotope composition values that are less than those derived from inorganic sources. The carbon dioxide in flue gas produced from burning fossil fuels reflects the relative carbon isotope composition values of the organic material that was fossilized. Verification that the material produced by a carbon dioxide sequestering process is composed of carbon from burning fossil fuels can include measuring the $\delta^{13}C$ value of the resultant material and confirming that it is not similar to the values for atmospheric carbon dioxide, nor marine sources of carbon.

As such, the $\delta^{13}C$ value of the $CO_2$ sequestering additive or the carbonate additive made by capturing $CO_2$ may serve as a fingerprint for a $CO_2$ gas source. The $\delta^{13}C$ value may vary from source to source (i.e., fossil fuel source), but the $\delta^{13}C$ value for composition provided herein may range between -9‰ to -35‰. In some embodiments, the $\delta^{13}C$ value for the $CO_2$ sequestering additive is between -1‰ and -50‰, between -5‰ and -40‰, between -5‰ and -35‰, between -7‰ and -40‰, between -7‰ and -35‰, between -9‰ and -40‰, or between -9‰ and -35‰. In some embodiments, the $\delta^{13}C$ value for the $CO_2$ sequestering additive is less than (i.e., more negative than) -3‰, -5‰, -6‰, -7‰, -8‰, -9‰, -10‰, -11‰, -12‰, -13‰, -14‰, -15‰, -16‰, -17‰, -18‰, -19‰, -20‰, -21‰, -22‰, -23‰, -24‰, -25‰, -26‰, -27‰, -28‰, -29‰, -30‰, -31‰, -32‰, -33‰, -34‰, -35‰, -36‰, -37‰, -38‰, -39‰, -40‰, -41‰, -42‰, -43‰, -44‰, or -45‰, wherein the more negative the $\delta^{13}C$ value, the more rich the synthetic carbonate-containing composition is in $^{12}C$. Any suitable method may be used for measuring the $\delta^{13}C$ value, methods including, but not limited to, mass spectrometry or off-axis integrated-cavity output spectroscopy (off-axis ICOS).

In some embodiments, the non-cementitious composition or product provided herein includes a $CO_2$-sequestering additive or the carbonate additive comprising reactive vaterite having a carbon isotopic fractionation ($\delta^{13}C$) value less than -5.00‰ or less than -10.00‰ or less than -12.00‰ or less than −15.00‰ or less than −20.00‰ or less than −25.00‰ or between −15.00‰ to −40.00‰ or between −15.00‰ to −25.00‰ or between −25.00‰ to −40.00‰, or less than −12‰, ‰14‰, ‰16‰, ‰18‰, ‰20‰, ‰22‰, ‰24‰, ‰26‰, ‰28‰, or less than −30‰ or between −12‰ to −50‰ or between −12‰ to −40‰ or between −12‰ to −30‰, or between −12‰ to −25‰. Such non-cementitious compositions or products may be carbonate-containing materials or products, as described herein, that contains at least 10, 20, 30, 40, 50, 60, 70, 80, or 90% carbonate, e.g., at least 50% carbonate or reactive vaterite w/w. In some embodiments, there is provided a non-cementitious composition, comprising carbonate additive, wherein the carbonate additive comprises reactive vaterite, wherein the carbonate additive has a carbon isotopic fractionation value ($\delta^{13}C$) of less than −12‰, and a non-cementitious additive. In some embodiments, there is provided a non-cementitious composition, comprising between 5-50% w/w carbonate additive, wherein the carbonate additive comprises reactive vaterite, wherein the carbonate additive has a carbon isotopic fractionation value ($\delta^{13}C$) of less than −12‰, and a non-cementitious additive. In some embodiments, there is provided a non-cementitious composition, comprising carbonate additive, wherein the carbonate additive comprises 50-99% w/w reactive vaterite, wherein the carbonate additive has a carbon isotopic fractionation value ($\delta^{13}C$) of less than −12‰, and a non-cementitious additive. In some embodiments, there is provided a non-cementitious composition, comprising between 5-50% w/w carbonate additive, wherein the carbonate additive comprises 50-99% w/w reactive vaterite, wherein the carbonate additive has a carbon isotopic fractionation value ($\delta^{13}C$) of less than −12‰, and a non-cementitious additive.

In some embodiments the invention provides a method of characterizing a composition comprising measuring its relative carbon isotope composition ($\delta^{13}C$) value. In some embodiments the composition is a composition that contains carbonates, e.g., vaterite. Any suitable method may be used for measuring the $\delta^{13}C$ value, such as mass spectrometry or off-axis integrated-cavity output spectroscopy (off-axis ICOS). One difference between the carbon isotopes is in their mass. Any mass-discerning technique sensitive enough to measure the amounts of carbon, can be used to find ratios of the $^{13}C$ to $^{12}C$ isotope concentrations. Mass spectrometry is commonly used to find $\delta^{13}C$ values. Commercially available are bench-top off-axis integrated-cavity output spectroscopy (off-axis ICOS) instruments that are able to determine $\delta^{13}C$ values as well. These values are obtained by the differences in the energies in the carbon-oxygen double bonds made by the $^{12}C$ and $^{13}C$ isotopes in carbon dioxide. The $\delta^{13}C$ value of a carbonate precipitate from a carbon sequestration process serves as a fingerprint for a $C_{O2}$ gas source, as the value may vary from source to source. In some embodiments the methods further include the measurement of the amount of carbon in the composition. Any suitable technique for the measurement of carbon may be used, such as coulometry.

In some embodiments of all of the aspects and embodiments provided herein, the carbonate additive or the non-cementitious composition further includes ions from one or more activation additives. In some embodiments, the one or more activation additives are added to the non-cementitious composition for the activation of the reactive vaterite so that vaterite transforms to aragonite. In some embodiments, the one or more activation additives may be present as salts of the ions selected from beryllium, magnesium, strontium, barium, and combinations thereof.

In some embodiments, there is provided a non-cementitious composition, comprising a carbonate additive, wherein the carbonate additive comprises reactive vaterite and one or more activation additives and a non-cementitious additive. In some embodiments, there is provided a non-cementitious composition, comprising a carbonate additive, wherein the carbonate additive comprises reactive vaterite and one or more activation additives selected from beryllium, magnesium, strontium, barium, and combinations thereof and a non-cementitious additive. In some embodiments, there is provided a non-cementitious composition, comprising a carbonate additive, wherein the carbonate additive comprises reactive vaterite and strontium and a non-cementitious additive. In some embodiments, the carbonate additive or the non-cementitious composition comprises magnesium (Mg). In some embodiments, there is provided a non-cementitious composition, comprising a carbonate additive, wherein the carbonate additive comprises reactive vaterite and one or more activation additives selected from magnesium, strontium, and combinations thereof and a non-cementitious additive.

The one or more activation additives in the non-cementitious composition after the transformation of the reactive vaterite to aragonite, may be present in the non-cementitious product in the form of a carbonate such as, but not limited to, strontium carbonate or strontianite and/or magnesium carbonate.

In some embodiments, the amount of the one or more activation additives present in the carbonate additive or the non-cementitious composition include, but not limited to, less than 35% w/w; or less than 25% w/w; or less than 20% w/w; or less than 10% w/w; less than 5% w/w; or less than 2% w/w; or less than 1.5% w/w; or less than 1% w/w; or less than 0.5% w/w; or less than 0.1% w/w; or between 0.1% w/w to 35% w/w; or between 0.1% w/w to 25% w/w; or between 0.1% w/w to 20% w/w; or between 0.1% w/w to 15% w/w; or between 0.1% w/w to 10% w/w; or between 0.1% w/w to 5% w/w; or between 0.1% w/w to 2% w/w; or between 0.1% w/w to 1.5% w/w; or between 0.1% w/w to 1% w/w; or between 0.1% w/w to 0.5% w/w; or between 0.5% w/w to 30% w/w; or between 0.5% w/w to 20% w/w; or between 0.5% w/w to 10% w/w; or between 0.5% w/w to 5% w/w; or between 0.5% w/w to 2% w/w; or between 0.5% w/w to 1.5% w/w; or between 0.5% w/w to 1% w/w; or 0.5% w/w; or 1% w/w; or 5% w/w; or 10% w/w; or 20% w/w.

In some embodiments, there is provided a non-cementitious composition, comprising a carbonate additive, wherein the carbonate additive comprises reactive vaterite and between 0.5-5% w/w one or more activation additives and a non-cementitious additive. In some embodiments, there is provided a non-cementitious composition, comprising a carbonate additive, wherein the carbonate additive comprises reactive vaterite and between 0.5-30% w/w one or more activation additives selected from beryllium, magnesium, strontium, barium, and combinations thereof and a non-cementitious additive.

In some embodiments, there is provided a non-cementitious composition, comprising between 5-50% w/w carbonate additive, wherein the carbonate additive comprises reactive vaterite, and between 0.5-30% w/w one or more activation additives, and a non-cementitious additive. In some embodiments, there is provided a non-cementitious composition, comprising between 5-50% w/w carbonate additive, wherein the carbonate additive comprises reactive vaterite, and between 0.5-30% w/w one or more activation additives selected from beryllium, magnesium, strontium, barium, and combinations thereof, and a non-cementitious additive.

In some embodiments, there is provided a non-cementitious composition, comprising carbonate additive, wherein the carbonate additive comprises between 50-90% w/w reactive vaterite, and between 0.5-30% w/w one or more activation additives, and a non-cementitious additive. In some embodiments, there is provided a non-cementitious composition, comprising carbonate additive, wherein the carbonate additive comprises between 50-90% w/w reactive vaterite, and between 0.5-30% w/w one or more activation additives selected from beryllium, magnesium, strontium, barium, and combinations thereof, and a non-cementitious additive.

In some embodiments, there is provided a non-cementitious composition, comprising between 5-50% w/w carbonate additive, wherein the carbonate additive comprises between 50-90% w/w reactive vaterite, and between 0.5-30% w/w one or more activation additives, and a non-cementitious additive. In some embodiments, there is provided a non-cementitious composition, comprising between 5-50% w/w carbonate additive, wherein the carbonate additive comprises between 50-90% w/w reactive vaterite, and between 0.5-30% w/w one or more activation additives selected from beryllium, magnesium, strontium, barium, and combinations thereof, and a non-cementitious additive.

In some embodiments of the above recited embodiments, the carbonate additive has a carbon isotopic fractionation value ($\delta^{13}C$) of less than −12‰ or between −12‰ to −30‰.

In some embodiments, the compositions provided herein further include sodium. In such compositions the sodium is present in an amount less than 100,000 ppm; or less than 80,000 ppm; or less than 50,000 ppm; or less than 20,000 ppm; or less than 15,000 ppm; or less than 10,000 ppm; or less than 5,000 ppm; or less than 1,000 ppm; or less than 500 ppm; or less than 400 ppm; or less than 300 ppm; or less than 200 ppm; or less than 100 ppm; or between 100 ppm to 100,000 ppm; or between 100 ppm to 50,000 ppm; or between 100 ppm to 30,000 ppm; or between 100 ppm to 20,000 ppm; or between 100 ppm to 15,000 ppm; or between 100 ppm to 10,000 ppm; or between 100 ppm to 5,000 ppm; or between 100 ppm to 1,000 ppm; or between 100 ppm to 500 ppm; or between 100 ppm to 400 ppm; or between 100 ppm to 300 ppm; or between 100 ppm to 200 ppm; or between 500 ppm to 100,000 ppm; or between 500 ppm to 50,000 ppm; or between 500 ppm to 30,000 ppm; or between 500 ppm to 20,000 ppm; or between 500 ppm to 15,000 ppm; or between 500 ppm to 10,000 ppm; or between 500 ppm to 5,000 ppm; or between 500 ppm to 1,000 ppm; or between 1000 ppm to 100,000 ppm; or between 1000 ppm to 50,000 ppm; or between 1000 ppm to 30,000 ppm; or between 1000 ppm to 20,000 ppm; or between 1000 ppm to 15,000 ppm; or between 1000 ppm to 10,000 ppm; or between 1000 ppm to 5,000 ppm; or between 5000 ppm to 100,000 ppm; or between 5000 ppm to 50,000 ppm; or between 10,000 ppm to 100,000 ppm; or between 10,000 ppm to 50,000 ppm; or between 50,000 ppm to 100,000 ppm; or 20,000 ppm; or 15,000 ppm; or 10,000 ppm; or 5,000 ppm; or 1,000 ppm; or 500 ppm; or 400 ppm; or 300 ppm; or 200 ppm; or 100 ppm.

In some embodiments, the carbonate additive or carbonate composition provided herein is a particulate composition with an average particle size of 0.1-100 microns. The average particle size may be determined using any conventional particle size determination method, such as, but is not limited to, multi-detector laser scattering or sieving (i.e. <38 microns). In certain embodiments, unimodel or multimodal, e.g., bimodal or other, distributions are present. Bimodal distributions allow the surface area to be minimized, thus allowing a lower liquids/solids mass ratio for the non-cementitious compositions yet providing smaller reactive particles for early reaction. In such instances, the average particle size of the larger size class can be upwards of 1000 microns (1 mm). In some embodiments, the composition provided herein is a particulate composition with an average particle size of between 0.1-1000 microns; or 0.1-500 microns; or 0.1-100 microns; or 0.1-50 microns; or 0.1-20 microns; or 0.1-10 microns; or 0.1-5 microns; or 0.5-100 microns; or 0.5-50 microns; or 0.5-20 microns; or 0.5-10 microns; or 1-50 microns; or 1-25 microns; or 1-20 microns; or 1-10 microns; or 1-5 microns; or 5-70 microns; or 5-50 microns; or 5-20 microns; or 5-10 microns; or 10-100 microns; or 10-50 microns; or 10-20 microns; or 10-15 microns; or 15-50-microns; or 15-30 microns; or 15-20 microns; or 20-50 microns; or 20-30 microns; or 30-50 microns; or 40-50 microns; or 50-100 microns; or 50-60 microns; or 60-100 microns; or 60-70 microns; or 70-100 microns; or 70-80 microns; or 80-100 microns; or 80-90 microns; or 0.1 microns; or 0.5 microns; or 1 microns; or 2 microns; or 3 microns; or 4 microns; or 5 microns; or 8 microns; or 10 microns; or 15 microns; or 20 microns; or 30 microns; or 40 microns; or 50 microns; or 60 microns; or 70 microns; or 80 microns; or 100 microns. For example, in some embodiments, the composition provided herein is a particulate composition with an average particle size of 0.1-25 micron; or 0.1-20 micron; or 0.1-15 micron; or 0.1-10 micron; or 0.1-8 micron; or 0.5-5 microns; or 0.1-5 micron; or 1-25 micron; or 1-20 micron; or 1-15 micron; or 1-10 micron; or 1-5 micron; or 5-20 micron; or 5-10 micron.

In some embodiments, the carbonate additive or carbonate composition includes one or more different sizes of the particles in the composition. In some embodiments, the composition includes two or more, or three or more, or four or more, or five or more, or ten or more, or 20 or more, or 3-20, or 4-10 different sizes of the particles in the composition. For example, the composition may include two or more, or three or more, or between 3-20 particles ranging from 0.1-10 micron, 10-50 micron, 50-100 micron, 100-200 micron, 200-500 micron, 500-1000 micron, and/or sub-micron sizes of the particles.

In some embodiments, the composition of the invention may include different morphologies of the particles, such as, but not limited to, fine or disperse and large or agglomerated.

In some embodiments, there is provided a non-cementitious composition, comprising carbonate additive, wherein the carbonate additive comprises reactive vaterite, wherein the carbonate additive has an average particle size of between 0.5-25 microns, and a non-cementitious additive. In some embodiments, there is provided a non-cementitious composition, comprising carbonate additive, wherein the carbonate additive comprises reactive vaterite, wherein the carbonate additive has an average particle size of between 0.5-25 microns, wherein the carbonate additive has a carbon isotopic fractionation value ($\delta^{13}C$) of less than −12‰, and a non-cementitious additive. In some embodiments, there is provided a non-cementitious composition, comprising between 5-50% w/w carbonate additive, wherein the carbonate additive comprises reactive vaterite, wherein the carbonate additive has a carbon isotopic fractionation value ($\delta^{13}C$) of less than −12‰, wherein the carbonate additive has an average particle size of between 0.5-25 microns, and a non-cementitious additive. In some embodiments, there is provided a non-cementitious composition, comprising carbonate additive, wherein the carbonate additive comprises 50-99% w/w reactive vaterite, wherein the carbonate additive has a carbon isotopic fractionation value ($\delta^{13}C$) of less than −12‰, wherein the carbonate additive has an average particle size of between 0.5-25 microns, and a non-cementitious additive. In some embodiments, there is provided a non-cementitious composition, comprising between 5-50% w/w carbonate additive, wherein the carbonate additive comprises 50-99% w/w reactive vaterite, wherein the carbonate additive has a carbon isotopic fractionation value ($\delta^{13}C$) of less than −12‰, wherein the carbonate additive has an average particle size of between 0.5-25 microns, and a non-cementitious additive. In some embodiments, in the foregoing embodiments, the carbonate additive further comprises one or more activation additives. In some embodiments, in the foregoing embodiments, the carbonate additive further comprises between 0.5-30% w/w one or more activation additives. In some embodiments, in the foregoing embodiments, the carbonate additive further comprises one or more activation additives selected from beryllium, magnesium, strontium, barium, and combinations thereof.

The bulk density of the carbonate additive or carbonate composition in the powder form or after combination with the non-cementitious additive to form the non-cementitious composition may vary. In some embodiments, the carbonate additive or carbonate composition provided herein has a bulk density of between 75 lb/ft$^3$-170 lb/ft$^3$; or between 75 lb/ft$^3$-160 lb/ft$^3$; or between 75 lb/ft$^3$-150 lb/ft$^3$; or between 75 lb/ft$^3$-140 lb/ft$^3$; or between 75 lb/ft$^3$-130 lb/ft$^3$; or between 75 lb/ft$^3$-125 lb/ft$^3$; or between 75 lb/ft$^3$-120 lb/ft$^3$; or between 75 lb/ft$^3$-110 lb/ft$^3$; or between 75 lb/ft$^3$-100 lb/ft$^3$; or between 75 lb/ft$^3$-90 lb/ft$^3$; or between 75 lb/ft$^3$-80 lb/ft$^3$; or between 80 lb/ft$^3$-170 lb/ft$^3$; or between 80 lb/ft$^3$-160 lb/ft$^3$; or between 80 lb/ft$^3$-150 lb/ft$^3$; or between 80 lb/ft$^3$-140 lb/ft$^3$; or between 80 lb/ft$^3$-130 lb/ft$^3$; or between 80 lb/ft$^3$-125 lb/ft$^3$; or between 80 lb/ft$^3$-120 lb/ft$^3$; or between 80 lb/ft$^3$-110 lb/ft$^3$; or between 80 lb/ft$^3$-100 lb/ft$^3$; or between 80 lb/ft$^3$-90 lb/ft$^3$; or between 90 lb/ft$^3$-170 lb/ft$^3$; or between 90 lb/ft$^3$-160 lb/ft$^3$; or between 90 lb/ft$^3$-150 lb/ft$^3$; or between 90 lb/ft$^3$-140 lb/ft$^3$; or between 90 lb/ft$^3$-130 lb/ft$^3$; or between 90 lb/ft$^3$-125 lb/ft$^3$; or between 90 lb/ft$^3$-120 lb/ft$^3$; or between 90 lb/ft$^3$-110 lb/ft$^3$; or between 90 lb/ft$^3$-100 lb/ft$^3$; or between 90 lb/ft$^3$-90 lb/ft$^3$; or between 100 lb/ft$^3$-170 lb/ft$^3$; or between 100 lb/ft$^3$-160 lb/ft$^3$; or between 100 lb/ft$^3$-150 lb/ft$^3$; or between 100 lb/ft$^3$-140 lb/ft$^3$; or between 100 lb/ft$^3$-130 lb/ft$^3$; or between 100 lb/ft$^3$-125 lb/ft$^3$; or between 100 lb/ft$^3$-120 lb/ft$^3$; or between 100 lb/ft$^3$-110 lb/ft$^3$; or between 110 lb/ft$^3$-170 lb/ft$^3$; or between 110 lb/ft$^3$-160 lb/ft$^3$; or between 110 lb/ft$^3$-150 lb/ft$^3$; or between 110 lb/ft$^3$-140 lb/ft$^3$; or between 110 lb/ft$^3$-130 lb/ft$^3$; or between 110 lb/ft$^3$-125 lb/ft$^3$; or between 110 lb/ft$^3$-120 lb/ft$^3$; or between 120 lb/ft$^3$-170 lb/ft$^3$; or between 120 lb/ft$^3$-160 lb/ft$^3$; or between 120 lb/ft$^3$-150 lb/ft$^3$; or between 120 lb/ft$^3$-140 lb/ft$^3$; or between 120 lb/ft$^3$-130 lb/ft$^3$; or between 120 lb/ft$^3$-125 lb/ft$^3$; or between 130 lb/ft$^3$-170 lb/ft$^3$; or between 130 lb/ft$^3$-160 lb/ft$^3$; or between 130 lb/ft$^3$-150 lb/ft$^3$; or between 130 lb/ft$^3$-140 lb/ft$^3$; or between 140 lb/ft$^3$-170 lb/ft$^3$; or between 140 lb/ft$^3$-160 lb/ft$^3$; or between 140 lb/ft$^3$-150 lb/ft$^3$; or between 150 lb/ft$^3$-170 lb/ft$^3$; or between 150 lb/ft$^3$-160 lb/ft$^3$; or between 160 lb/ft$^3$-170 lb/ft$^3$; or 75 lb/ft$^3$; or 80 lb/ft$^3$; or 85 lb/ft$^3$; or 90 lb/ft$^3$; or 95 lb/ft$^3$; or 100 lb/ft$^3$; or 110 lb/ft$^3$; or 120 lb/ft$^3$; or 130 lb/ft$^3$; or 140 lb/ft$^3$; or 150 lb/ft$^3$; or 160 lb/ft$^3$; or 170 lb/ft$^3$.

In some embodiments, the carbonate additive or carbonate composition of the invention has an average surface area sufficient to provide for a liquid to solids ratio (as described herein) upon combination with a liquid and/or a non-cementitious additive to produce a non-cementitious composition and/or product. In some embodiments, an average surface area ranges from 0.5 m$^2$/gm-50 m$^2$/gm. The surface area may be determined using the surface area determination protocol described in Breunner, Emmit and Teller (BET) surface area analysis. In some embodiments, the carbonate additive or carbonate composition provided herein has an average surface area of from 0.5 m$^2$/gm-50 m$^2$/gm; or from 0.5 m$^2$/gm-45 m$^2$/gm; or from 0.5 m$^2$/gm-40 m$^2$/gm; or from 0.5 m$^2$/gm-35 m$^2$/gm; or from 0.5 m$^2$/gm-30 m$^2$/gm; or from 0.5 m$^2$/gm-25 m$^2$/gm; or from 0.5 m$^2$/gm-20 m$^2$/gm; or from 0.5 m$^2$/gm-15 m$^2$/gm; or from 0.5 m$^2$/gm-10 m$^2$/gm; or from 0.5 m$^2$/gm-5 m$^2$/gm; or from 0.5 m$^2$/gm-4 m$^2$/gm; or from 0.5 m$^2$/gm-2 m$^2$/gm; or from 0.5 m$^2$/gm-1 m$^2$/gm; or from 1 m$^2$/gm-50 m$^2$/gm; or from 1 m$^2$/gm-45 m$^2$/gm; or from 1 m$^2$/gm-40 m$^2$/gm; or from 1 m$^2$/gm-35 m$^2$/gm; or from 1 m$^2$/gm-30 m$^2$/gm; or from 1 m$^2$/gm-25 m$^2$/gm; or from 1 m$^2$/gm-20 m$^2$/gm; or from 1 m$^2$/gm-15 m$^2$/gm; or from 1 m$^2$/gm-10 m$^2$/gm; or from 1 m$^2$/gm-5 m$^2$/gm; or from 1 m$^2$/gm-4 m$^2$/gm; or from 1 m$^2$/gm-2 m$^2$/gm; or from 2 m$^2$/gm-50 m$^2$/gm; or from 2 m$^2$/gm-45 m$^2$/gm; or from 2 m$^2$/gm-40 m$^2$/gm; or from 2 m$^2$/gm-35 m$^2$/gm; or from 2 m$^2$/gm-30 m$^2$/gm; or from 2 m$^2$/gm-25 m$^2$/gm; or from 2 m$^2$/gm-20 m$^2$/gm; or from 2 m$^2$/gm-15 m$^2$/gm; or from 2 m$^2$/gm-10 m$^2$/gm; or from 2 m$^2$/gm-5 m$^2$/gm; or from 2 m$^2$/gm-4 m$^2$/gm; or from 5 m$^2$/gm-50 m$^2$/gm; or from 5 m$^2$/gm-45 m$^2$/gm; or from 5 m$^2$/gm-40 m$^2$/gm; or from 5 m$^2$/gm-35 m$^2$/gm; or from 5 m$^2$/gm-30 m$^2$/gm; or from 5 m$^2$/gm-25 m$^2$/gm; or from 5 m$^2$/gm-20 m$^2$/gm; or from 5 m$^2$/gm-15 m$^2$/gm; or from 5 m$^2$/gm-10 m$^2$/gm; or from 8 m$^2$/gm-50 m$^2$/gm; or from 8 m$^2$/gm-45 m$^2$/gm; or from 8 m$^2$/gm-40 m$^2$/gm; or from 8 m$^2$/gm-35 m$^2$/gm; or from 8 m$^2$/gm-30 m$^2$/gm; or from 8 m$^2$/gm-25 m$^2$/gm; or from 8 m$^2$/gm-20 m$^2$/gm; or from 8 m$^2$/gm-15 m$^2$/gm; or from 8 m$^2$/gm-10 m$^2$/gm; or from 10 m$^2$/gm-50 m$^2$/gm; or from 10 m$^2$/gm-45 m$^2$/gm; or from 10 m$^2$/gm-40 m$^2$/gm; or from 10 m$^2$/gm-35 m$^2$/gm; or from 10 m$^2$/gm-30 m$^2$/gm; or from 10 m$^2$/gm-25 m$^2$/gm; or from 10 m$^2$/gm-20 m$^2$/gm; or from 10 m$^2$/gm-15 m$^2$/gm; or from 15 m$^2$/gm-50 m$^2$/gm; or from 15 m$^2$/gm-45 m$^2$/gm; or from 15 m$^2$/gm-40 m$^2$/gm; or from 15 m$^2$/gm-35 m$^2$/gm; or from 15 m$^2$/gm-30 m$^2$/gm; or from 15 m$^2$/gm-25 m$^2$/gm; or from 15 m$^2$/gm-20 m$^2$/gm; or from 20 m$^2$/gm-50 m$^2$/gm; or from 20 m$^2$/gm-45 m$^2$/gm; or from 20 m$^2$/gm-40 m$^2$/gm; or from 20 m$^2$/gm-35 m$^2$/gm; or from 20 m$^2$/gm-30 m$^2$/gm; or from 20 m$^2$/gm-25 m$^2$/gm; or from 30 m$^2$/gm-50 m$^2$/gm; or from 30 m$^2$/gm-45 m$^2$/gm; or from 30 m$^2$/gm-40 m$^2$/gm; or from 30 m$^2$/gm-35 m$^2$/gm; or from 40 m$^2$/gm-50 m$^2$/gm; or from 40 m$^2$/gm-45 m$^2$/gm; or 0.5 m$^2$/gm; or 1 m$^2$/gm; or 2 m$^2$/gm; or 5 m$^2$/gm; or 10 m$^2$/gm; or 15 m$^2$/gm; or 20 m$^2$/gm; or 30 m$^2$/gm; or 40 m$^2$/gm; or 50 m$^2$/gm. In some embodiments, the carbonate additive or carbonate composition of the invention includes a mix of particles, such as, but not limited to, two or more, three or more, or four or more, or 5-10, or 10-20, or 1-20, or 1-50 particles with different surface area.

In some embodiments, the ratio of the calcium to carbonate ions may be varied to form carbonate additive or carbonate composition with desired surface charge. In some embodiments, the ratio of calcium or calcium ion with the carbonate or the carbonate ion in the carbonate additive or carbonate composition (calcium:carbonate) is greater than 1:1; or greater than 1.5:1; or greater than 2:1; or greater than 2.5:1; or greater than 3:1; or greater than 3.5:1; or greater than 4:1; or greater than 4.5:1; or greater than 5:1; or is in a range of 1:1 to 5:1; or is in a range of 1.5:1 to 5:1; or is in a range of 2:1 to 5:1; or is in a range of 3:1 to 5:1; or is in a range of 4:1 to 5:1; or is in a range of 1:1 to 4:1; or is in a range of 1.5:1 to 4:1; or is in a range of 2:1 to 4:1; or is in a range of 3:1 to 4:1; or is in a range of 1:1 to 3:1; or is in a range of 1.5:1 to 3:1; or is in a range of 2:1 to 3:1; or is in a range of 1:1 to 2:1; or is in a range of 1.5:1 to 2:1; or is in a range of 1.5:1 to 1:1; or is in a range of 1.2:1 to 1.8:1; or is 1:1; or is 1.5:1; or is 2:1; or is 2.5:1; or is 3:1; or is 3.5:1; or is 4:1; or is 4.5:1; or is 5:1. In some embodiments, the ratio of calcium:carbonate in the carbonate additive or carbonate composition is 1.5:1, or 1:1, or 2:1.

In some embodiments, the ratio of carbonate or the carbonate ion with the calcium or calcium ion in the carbonate additive or carbonate composition (carbonate:calcium) is greater than 1:1; or greater than 1.5:1; or greater than 2:1; or greater than 2.5:1; or greater than 3:1; or greater than 3.5:1; or greater than 4:1; or greater than 4.5:1; or greater than 5:1; or is in a range of 1:1 to 5:1; or is in a range of 1.5:1 to 5:1; or is in a range of 2:1 to 5:1; or is in a range of 3:1 to 5:1; or is in a range of 4:1 to 5:1; or is in a range of 1:1 to 4:1; or is in a range of 1.5:1 to 4:1; or is in a range of 2:1 to 4:1; or is in a range of 3:1 to 4:1; or is in a range of 1:1 to 3:1; or is in a range of 1.5:1 to 3:1; or is in a range of 2:1 to 3:1; or is in a range of 1:1 to 2:1; or is in a range of 1.5:1 to 2:1; or is in a range of 1.5:1 to 1:1; or is 1:1; or is 1.5:1; or is 2:1; or is 2.5:1; or is 3:1; or is 3.5:1; or is 4:1; or is 4.5:1; or is 5:1. In some embodiments, the ratio of carbonate to calcium (carbonate:calcium) in the composition is 1.5:1, or 1:1, or 2:1.

In some embodiments, where the carbonate additive is a $CO_2$-sequestering additive, the carbonate additive or carbonate composition provided herein may further include nitrogen oxide, sulfur oxide, mercury, metal, derivative of any of nitrogen oxide, sulfur oxide, mercury, and/or metal, or combination thereof. The derivatives of nitrogen oxide and sulfur oxide include, but not limited to, nitrates, nitrites, sulfates, and sulfites, etc. The mercury and/or the metal may be present in their derivatized form, such as, oxides and/or hydroxides, or the mercury and/or the metal may be encapsulated or present in the carbonate additive or carbonate composition of the invention in un-derivatized form.

The compositions provided herein may vary greatly. The compositions may be dried composition or wet compositions that, when combined with a setting fluid, such as water, undergoes transformation of the reactive vaterite to aragonite which sets to produce a solid product. The carbonate additives or $CO_2$ sequestering additives may be mixed with non-cementitious additives to form non-cementitious compositions and/or non-cementitious products. Examples of non-cementitious products include, but not limited to, paper product; polymeric product; lubricant; adhesive; rubber; chalk; asphalt product; paint; abrasive for paint removal; personal care product; cosmetic; cleaning product; personal hygiene product; ingestible product; agricultural product; environmental remediation product; or combinations thereof.

Such non-cementitious additives, compositions and products are described further herein below. However, the below review of the compositions is not limiting, and is provided solely to further describe exemplary embodiments of the invention.

Paper Products

In one aspect, there are provided non-cementitious compositions, comprising a carbonate additive, wherein the carbonate additive comprises vaterite, wherein the non-cementitious composition is for a paper product. In one aspect, there are provided non-cementitious compositions, comprising a carbonate additive, wherein the carbonate additive comprises reactive vaterite, wherein the non-cementitious composition is for a paper product. In one aspect, there are provided non-cementitious compositions, comprising a carbonate additive, wherein the carbonate additive comprises reactive vaterite wherein the carbonate additive has a $\delta^{13}C$ of less than −12‰, and wherein the non-cementitious composition is for a paper product.

The foregoing non-cementitious compositions may be dried composition or may be wet compositions that, when combined with a setting fluid, such as water, and/or the non-cementitious additive, such as, pulp, undergoes transformation of the reactive vaterite to aragonite which sets to produce a solid paper product.

In one aspect, there is provided a paper product comprising between 5-50% w/w or between 5-20% w/w carbonate additive, wherein the carbonate additive comprises aragonite. In one aspect, there is provided a paper product comprising between 5-50% w/w or between 5-20% w/w carbonate additive, wherein the carbonate additive comprises at least 50% w/w or between 50-99% w/w aragonite. In one aspect, there is provided a paper product comprising between 5-50% w/w or between 5-20% w/w carbonate additive, wherein the carbonate additive comprises aragonite wherein the carbonate additive has a carbon isotopic fractionation value ($\delta^{13}C$) of less than −12‰ or between −12‰ to −40‰ or between −12‰ to −30‰. In one aspect, there is provided a paper product comprising between 5-50% w/w or between 5-20% w/w carbonate additive, wherein the carbonate additive comprises at least 50% w/w or between 50-99% w/w aragonite wherein the carbonate additive has a carbon isotopic fractionation value ($\delta^{13}C$) of less than −12‰ or between −12‰ to −40‰ or between −12‰ to −30‰.

In some embodiments, in the foregoing aspects, the carbonate additive comprises between 1-100% w/w or between 50-100% w/w or between 50-99% w/w aragonite. In some embodiments, the paper product comprises one or more activation additives that were added during and/or after the formation of the carbonate additive to facilitate transformation of the reactive vaterite to aragonite. Such activation additives may be present as salts or as carbonates. Such activation additives have been described herein and include ions, but not limited to, beryllium, magnesium, strontium, barium, and combinations thereof. In some embodiments, in the foregoing aspect and embodiments, the paper product and/or the carbonate additive comprises magnesium carbonate, strontianite, or combinations thereof. In some embodiments, in the foregoing aspect and embodiments, the carbonate additive comprises between 0.1-99% w/w magnesium carbonate, strontianite, or combinations thereof. In embodiments, where strontianite is present it is contemplated that strontium displaces the calcium ions from aragonite and/or vaterite and forms strontianite. Therefore, in the paper product, there may be presence of only aragonite, only strontianite or combination of both depending on the concentration of the strontium added to the non-cementitious composition to make paper product. Accordingly, in some embodiments, there is provided a paper product comprising between 5-50% w/w or between 5-20% w/w carbonate additive, wherein the carbonate additive comprises between 1-100% w/w or between 50-100% w/w or between 50-99% w/w aragonite and between 0.1-99% w/w or between 1-50% w/w or between 1-25% w/w or between 0.1-5% w/w magnesium carbonate, strontianite, or combinations thereof. In some embodiments, the carbonate additive has a carbon isotopic fractionation value ($\delta^{13}C$) of less than −12‰ or between −12‰ to −40‰ or between −12‰ to −30‰.

The "paper products" as used herein, includes any material that is suitable for use in one or more of writing upon, printing upon or packaging including but not limited to, bond paper, newspaper, printing paper, writing paper, construction paper, cover paper, envelope paper, form bond, free sheet, mechanical paper, insulating board, wrapping paper, offset paper, packaging paper, recycled paper, labels, card stock, paperboard, corrugated fiberboard, containerboard, wallboard, boxes, bags, paper products to make cigarette paper, binders for cigars, and cigarette packaging, paper products for wiping fluids such as tissue, paper products in medical uses, and paper products in household uses such as, but not limited to, toilet paper, paper towel, facial tissue, paper napkin, etc. Card stock is a type of paper that is thicker and more durable than paper but more flexible than paperboard (e.g., cardboard).

In some embodiments, paper products of the invention may be produced by pressing together non-cementitious additives, such as, moist fibers (e.g., cellulose, polymeric) with the carbonate additive or carbonate composition provided herein in the form of a pulp composition and then drying the pressed fibers to form sheets of varying thickness. During the mixing of the carbonate additive with the paper pulp, the reactive vaterite may be activated such that it transforms to aragonite and sets and hardens. Such activation of the reactive vaterite to the aragonite is described herein.

In some embodiments, paper products of the invention may be produced by coating the paper with the carbonate additive of the invention. Such products may be useful in coating and printing industry.

In some embodiments, the carbonate additive is formed in situ in the solution containing pulp such that the reactive vaterite transforms to aragonite in situ, and sets and hardens to form paper product. In some embodiments, the carbonate additive may be formed in situ by contacting the carbide lime with $CO_2$ resulting in the formation of calcium carbonate where the excess water may be removed from the product. This method may result in the added advantage of the absence of sodium chloride salt or other chloride salt in the paper which may be detrimental to the properties of the paper.

In some embodiments, the carbonate additive may be formed by sequestering $CO_2$. In some embodiments, the carbonate additive comprising reactive vaterite is formed by the traditional PCC process. In some embodiments, the carbonate additive may be formed by sequestering $CO_2$ obtained from industrial processes. Such processes for forming the carbonate additive containing the reactive vaterite, have been described herein.

Paper products of the invention may be produced in accordance with traditional manufacturing protocols with the exception that an amount of the carbonate additive or carbonate composition is employed. In some embodiments, in producing paper products of the invention with the stable vaterite (vaterite that does not transform to aragonite), the vaterite in the carbonate composition act as a filler that replaces a certain amount of the cellulosic fiber or pulp in the paper product thereby producing a less expensive and an environmentally friendly product. Fillers are added to the pulp such that the filler does not react or bind with the fibers. In some embodiments, in producing paper products of the invention with the reactive vaterite, the reactive vaterite in the carbonate composition does not act as a filler but instead transforms to aragonite upon contact with fiber or pulp and water which aragonite may bind to the fiber or pulp resulting in bonding and/or linkage. Such transformation of vaterite to aragonite may be beneficial in improving the properties of the paper product. In addition to the transformation of the reactive vaterite to aragonite, the reactive vaterite may be mixed with other carbonate forms that may act as a filler and/or the reactive vaterite may also act as an absorbent or colorant to the pulp composition. By "colorant" is meant a compound that is able to impart a color to a product. In some embodiments, the carbonate precipitate of the invention is white in color and is able to improve the white color of already white paper products, and lighten the color of paper products that are not white.

The pulp may be an example of the non-cementitious additive to make paper product. The pulp may be a mechanical or groundwood pulp manufactured by a mechanical process or a woodfree or freesheet pulp where the wood chips are cooked with chemicals that dissolve lignin from wood. Examples of pulp include, but not limited to, chemical pulp, brown pulp, dissolving pulp/special alpha, fluff pulp, Kraft pulp, market pulp, mechanical pulp, sulfite pulp, unbleached pulp, eucalyptus pulp, banana tree bark, banana stem-fibers, cotton fibers, vulcanized polymers, cellulose fibers, animal skin (e.g., calfskin, sheepskin, goatskin), papyrus, high density polyethylene fibers, hemp, bamboo, grass, rags or pulp derived from the wood of any suitable tree. The moisture content of the pulp composition may vary, ranging from 5% to 10%, or 6%, or 7%, or 10% or 20% or 1-20%. In some instances, the carbonate composition comprising vaterite such as reactive vaterite may be added to the pulp composition as an absorbent in order to decrease the moisture content in the paper.

The density of the paper products provided herein may vary. The density of "paper" may range from 100 $kg/m^3$ to 1500 $kg/m^3$, such as 250 $kg/m^3$ to 1250 $kg/m^3$, including 500 $kg/m^3$ to 800 $kg/m^3$. The density of "papercard" or "card stock" may range from 1500 $kg/m^3$ to 3000 $kg/m^3$, such as 1700 $kg/m^3$ to 2500 $kg/m^3$, and including 2000 $kg/m^3$ to 2250 $kg/m^3$. The density of "paperboard" can be 3000 $kg/m^3$ and denser, such as 3500 $kg/m^3$ and denser, including 5000 $kg/m^3$ and denser. The thickness of paper products the invention may also vary. The thickness of "paper" may range between 0.05 mm to 0.18 mm, such as 0.07 mm to 0.18 mm and including 0.1 mm to 0.15 mm. The thickness of "papercard" may range between 0.18 mm to 0.25 mm, such as 0.18 mm to 0.2 mm and including 0.19 mm. The thickness of "paperboard" may be 0.25 mm and thicker, such as 0.3 mm and thicker, and including 1 mm and thicker. The weight of the paper products provided herein may vary. By "weight" is meant the mass of paper product per unit area, usually measured in $g/m^2$. The weight of "paper" may range between 20 $g/m^2$ to 160 $g/m^2$, such as 60 $g/m^2$ to 150 $g/m^2$ and including 80 $g/m^2$ to 120 $g/m^2$. The weight of "papercard" may range between 160 $g/m^2$ to 500 $g/m^2$, such as 175 $g/m^2$ to 400 $g/m^2$ and including 200 to $g/m^2$ to 300 $g/m^2$. The weight of "paperboard" may range from 500 $g/m^2$ and heavier, such as 750 $g/m^2$ and heavier and including 2000 $g/m^2$ and heavier.

In manufacturing paper products of the invention, the pulp composition precursors of the paper products or the non-cementitious additives may include one or more additional components, such as sizing agents, additional fillers (e.g., clay, china) and pigments. The amount of carbonate additive in the finished paper product may vary, and may be more than 1% by weight, or more than 3% by weight, or more than 5% by weight, or more than 10% by weight, or more than 25% by weight, or more than 50% by weight, or more than 60% by weight, or more than 70% by weight, or more than 80% by weight, or more than 90% by weight, or between 5-95% by weight, or between 5-85% by weight, or between 5-75% by weight, or between 5-65% by weight, or between 5-50% by weight, or between 5-55% by weight, or between 5-45% by weight, or between 5-35% by weight, or between 5-25% by weight, or between 5-15% by weight, or between 10-95% by weight, or between 10-85% by weight, or between 10-75% by weight, or between 10-65% by weight, or between 10-55% by weight, or between 10-45% by weight, or between 10-35% by weight, or between 10-25% by weight, or between 10-15% by weight, or between 5-25% by weight, or between 5-20% by weight, or between 5-15% by weight, or between 5-10% by weight, or between 10-20% by weight, or between 10-15% by weight, or between 25-95% by weight, or between 25-85% by weight, or between 25-75% by weight, or between 25-60% by weight, or between 25-50% by weight, or between 50-100% by weight, or between 50-99% by weight, or between 50-95% by weight, or between 50-85% by weight, or between 50-75% by weight, or between 50-60% by weight, or between 60-95% by weight, or between 60-85% by weight, or between 60-75% by weight, or between 70-95% by weight, or between 70-85% by weight, or between 80-95% by weight, with the remaining % by weight of the non-cementitious additive, one or more activation additives, optionally other agents, and water.

The amount of aragonite in the carbonate additive or the $CO_2$ sequestering additive in the paper product may be between 1-100% w/w; or between 50-100% w/w; or between 50-99% w/w; or between 50-95% w/w; or between 50-90% w/w; or between 50-80% w/w; or between 50-75% w/w; or between 50-60% w/w; or between 75-99% w/w; or between 80-99% w/w. In some embodiments, the transformation of the reactive vaterite to the aragonite and subsequent formation of the paper product may result in one or more of properties selected from, but not limited to, better linkage or bonding, higher tensile strength, higher burst strength, higher tear strength, higher impact fracture toughness, and combinations thereof, in the paper product. Without being limited by any theory, it is contemplated that the aragonite may be able to bond with the fiber resulting in better linkage properties. In some embodiments, the aragonite may be able to penetrate or distribute within the cell wall of the fibers resulting in higher opacity, brightness, strength, and a high retained filler level in the paper.

The amount of non-cementitious additives, such as, moist fibers (e.g., cellulose, polymeric) in the paper product may vary, and may be more than 1% by weight, or more than 3% by weight, or more than 5% by weight, or more than 10% by weight, or more than 20% by weight, or more than 25% by weight, or more than 50% by weight, or more than 60% by weight, or more than 70% by weight, or more than 80% by weight, or more than 90% by weight, or between 10-95% by weight, or between 10-85% by weight, or between 10-75% by weight, or between 10-65% by weight, or between 10-55% by weight, or between 10-45% by weight, or between 10-35% by weight, or between 10-25% by weight, or between 10-15% by weight, or between 25-95% by weight, or between 25-85% by weight, or between 25-75% by weight, or between 25-60% by weight, or between 25-50% by weight, or between 50-85% by weight, or between 50-75% by weight, or between 50-60% by weight.

During manufacture, following production of the pulp with the carbonate additive, the pulp may be pressed, dried and cut as desired to produce a product of desired dimensions. The paper may also be modified (e.g., bleached, treated with a sizing agent or surface coating) after the finished paper product has been produced.

In some embodiments, the paper product provided herein is used to make a drywall product. The "drywall" as used herein, includes board that is used for construction of interior, and/or exterior floors, walls and ceilings. Traditionally, drywall is made from gypsum (called paper-faced board). In some embodiments of the invention, the drywall is made partially or wholly from the carbonate additive where the reactive vaterite has transformed to aragonite, thereby replacing gypsum from the drywall product. The drywall made from the carbonate additive has been described in application with Attorney Docket No. CLRA-081, filed on even date herewith, which is incorporated herein by reference in its entirety. In some embodiments, the drywall is panel made of a paper liner wrapped around an inner core. For example, in some embodiments, during the process of making the drywall product from the carbonate additive, the slurry of the carbonate additive comprising vaterite is poured over a sheet of paper. The paper is also made from the carbonate additive of the invention, as described above. Another sheet of paper, made in accordance with the invention, is then put on top of the carbonate additive such that the carbonate additive is flanked by the paper on both sides (the resultant composition sandwiched between two sheets of outer material, e.g., paper). The vaterite in the carbonate additive is then transformed to aragonite (using additives and/or heat) which then sets and hardens. When the core sets and is dried in a large drying chamber, the sandwich becomes rigid and strong enough for use as a building material. The drywall sheets are then cut and separated. Without being limited by any theory, it is contemplated that the aragonitic microstructure of the paper made from the carbonate additive, may provide aragonite seeding to the poured carbonate additive and may lead to greater bonding and adhesion of the paper with the inner core of the cement as well as may cause facilitation of the transformation of the vaterite to aragonite.

Accordingly, in one aspect there is provided a drywall product comprising a paper product comprising between 5-50% w/w or between 5-20% w/w carbonate additive, wherein the carbonate additive comprises aragonite wherein the carbonate additive has a carbon isotopic fractionation value ($\delta^{13}C$) of less than −12‰ or between −12‰ to −40‰ or between −12‰ to −30‰. In some embodiments, in the foregoing aspect, the carbonate additive comprises between 1-100% w/w or between 50-100% w/w or between 50-99% w/w aragonite. In some embodiments, the paper product comprises one or more activation additives that were added during the formation of the carbonate additive. Such additives have been described herein and include but not limited to, beryllium, magnesium, strontium, barium, and combinations thereof. In some embodiments, in the foregoing aspect and embodiments, the paper product or the carbonate additive in the paper product further comprises between 0.1-99% w/w or between 1-50% w/w or between 1-25% w/w or between 0.1-5% w/w magnesium carbonate, strontianite, or combinations thereof.

Polymeric Products

In one aspect, there are provided non-cementitious compositions, comprising a carbonate additive, wherein the carbonate additive comprises vaterite, wherein the non-cementitious composition is for polymeric products. In one aspect, there are provided non-cementitious compositions, comprising a carbonate additive, wherein the carbonate additive comprises reactive vaterite, wherein the non-cementitious composition is for polymeric products. In one aspect, there are provided non-cementitious compositions, comprising a carbonate additive, wherein the carbonate additive comprises reactive vaterite wherein the carbonate additive has a $\delta^{13}C$ of less than −12‰, and wherein the non-cementitious composition is for a polymeric product.

Polymeric products of the invention may be produced in accordance with traditional manufacturing protocols with the exception that an amount of the carbonate additive or carbonate composition is employed. In some embodiments, in producing polymeric products of the invention with the vaterite, the vaterite in the carbonate composition act as a filler that replaces a certain amount of the non-cementitious additive in the polymeric product thereby producing a less expensive and an environmentally friendly product. Traditionally, fillers are added such that the filler does not react or bind with the non-cementitious additive. In some embodiments, in producing polymeric products of the invention with the reactive vaterite, the reactive vaterite in the carbonate composition does not act as a filler but instead transforms to aragonite upon contact with non-cementitious additive and water which aragonite may bind to the non-cementitious additive resulting in bonding and/or linkage. In addition to the transformation of the reactive vaterite to aragonite, the reactive vaterite may be mixed with other carbonate forms that may act as a filler and/or the reactive vaterite may also act as an absorbent or colorant to the polymeric composition.

The carbonate additive may be present in the polymeric product in various amounts, as desired. As such, the amount of carbonate additive in the polymeric composition may vary, and may be 1% by weight or more, such as 3% by weight or more, including 5% by weight or more. The amount of carbonate additive in the finished polymeric product may vary, and may be more than 1% by weight, or more than 3% by weight, or more than 5% by weight, or more than 10% by weight, or more than 25% by weight, or more than 50% by weight, or more than 60% by weight, or more than 70% by weight, or more than 80% by weight, or more than 90% by weight, or between 5-50% by weight, or between 10-85% by weight, or between 10-75% by weight, or between 10-65% by weight, or between 10-55% by weight, or between 10-45% by weight, or between 10-35% by weight, or between 10-25% by weight, or between 10-15% by weight, or between 25-85% by weight, or between 25-75% by weight, or between 25-60% by weight, or between 25-50% by weight, or between 50-75% by weight, or between 50-60% by weight.

The amount of aragonite in the carbonate additive or the $CO_2$ sequestering additive in the polymeric product may be between 1-100% w/w; between 50-100% w/w; or between 50-99% w/w; or between 50-95% w/w; or between 50-90% w/w; or between 50-80% w/w; or between 50-75% w/w; or between 50-60% w/w; or between 75-99% w/w; or between 80-99% w/w.

In certain embodiments, the polymeric products are plastics. The plastic is used in its common sense to refer to a wide range of synthetic or semi-synthetic organic solid materials suitable for the manufacture of industrial products (e.g., films, fibers, plates, tubes, bottles, boxes). Plastics contain non-cementitious additives such as polymers of high molecular weight, and may contain other substances to improve performance which may include but are not limited to acid scavengers, antimicrobial agents, antioxidants, antistatic agents, antifungal agents, clarifying agents, flame retardants, amine light stabilizers, UV absorbers, optical brighteners, photoselective additives, processing stabilizers, and the like. Plastics of the invention may be acrylics, polyesters, silicones, polyurethanes or halogenated plastics. The non-cementitious additives such as plastics to make polymeric product of the invention, include, but are not limited to: polypropylenes (e.g., as employed in food containers, appliances, car bumpers), polystyrenes (e.g., as employed in packaging foam, food containers, disposable cups, plates, cutlery, CD and cassette boxes), high impact polystyrenes (e.g., as employed in fridge liners, food packaging, vending cups), acrylonitrile butadiene styrene (e.g., as employed in electronic equipment cases such as computer monitors, printers, keyboards), polyethylene terephthalates (e.g., as employed in carbonated drinks bottles, jars, plastic film, microwavable packaging), polyesters (e.g., as employed in fibers, textiles), polyamides (e.g., as employed in fibers, toothbrush bristles, fishing line, under-the-hood car engine mouldings), poly(vinyl chloride) (e.g., as employed in plumbing pipes and guttering, shower curtains, window frames, flooring), polyurethanes (e.g., as employed in cushioning foams, thermal insulation foams, surface coatings, printing rollers), polycarbonates (e.g., as employed in compact discs, eyeglasses, riot shields, security windows, traffic lights, lenses), polyvinylidene chloride (e.g., as employed in food packaging, saran), polyethylene (e.g., as employed in supermarket bags, plastic bottles) and polycarbonate/acrylonitrile butadiene styrene (e.g., as employed in car interior and exterior parts). Polymeric products, such as plastics, of the invention may be prepared in accordance with traditional manufacturing protocols for such compositions, with the exception that an amount of carbonate additive or the $CO_2$ sequestering additive of the invention is employed. As such, an amount of the carbonate additive may be combined with other non-cementitious additives of the plastic precursor composition or feed, and then molded, cast, extruded into the final desired plastic product.

The amount of non-cementitious additives in the polymeric product may vary, and may be more than 1% by weight, or more than 3% by weight, or more than 5% by weight, or more than 10% by weight, or more than 25% by weight, or more than 50% by weight, or more than 60% by weight, or more than 70% by weight, or more than 80% by weight, or more than 90% by weight, or between 10-95% by weight, or between 10-85% by weight, or between 10-75% by weight, or between 10-65% by weight, or between 10-55% by weight, or between 10-45% by weight, or between 10-35% by weight, or between 10-25% by weight, or between 10-15% by weight, or between 25-95% by weight, or between 25-85% by weight, or between 25-75% by weight, or between 25-60% by weight, or between 25-50% by weight, or between 50-85% by weight, or between 50-75% by weight, or between 50-60% by weight.

Lubricants

In one aspect, there are provided non-cementitious compositions, comprising a carbonate additive, wherein the carbonate additive comprises vaterite, wherein the non-cementitious composition is for lubricants. In one aspect, there are provided non-cementitious compositions, comprising a carbonate additive, wherein the carbonate additive comprises reactive vaterite, wherein the non-cementitious composition is for lubricants. In some embodiments, the carbonate additive is a $CO_2$ sequestering additive. In one aspect, there are provided non-cementitious compositions, comprising a $CO_2$ sequestering additive, wherein the $CO_2$ sequestering additive comprises vaterite, wherein the non-cementitious composition is for a lubricant. In one aspect, there are provided non-cementitious compositions, comprising a $CO_2$ sequestering additive, wherein the $CO_2$ sequestering additive comprises reactive vaterite, wherein the non-cementitious composition is for a lubricant. In one aspect, there are provided non-cementitious compositions, comprising a $CO_2$ sequestering additive, wherein the $CO_2$ sequestering additive comprises vaterite wherein the $CO_2$ sequestering additive has a $\delta^{13}C$ of less than −12‰, and wherein the non-cementitious composition is for a lubricant. In one aspect, there are provided non-cementitious compositions, comprising a $CO_2$ sequestering additive, wherein the $CO_2$ sequestering additive comprises reactive vaterite wherein the $CO_2$ sequestering additive has a $\delta^{13}C$ of less than −12‰, and wherein the non-cementitious composition is for a lubricant.

Lubricant products of the invention may be produced in accordance with traditional manufacturing protocols with the exception that an amount of the carbonate additive or carbonate composition is employed. In some embodiments, in producing lubricant products of the invention with the vaterite, the vaterite in the carbonate composition act as a filler thereby producing a less expensive and an environmentally friendly product. In some embodiments, in producing lubricant products of the invention with the reactive vaterite, the reactive vaterite in the carbonate composition does not act as a filler but instead transforms to aragonite upon contact with non-cementitious additive and water which aragonite may bind to the non-cementitious additive resulting in bonding and/or linkage. In addition to the transformation of the reactive vaterite to aragonite, the reactive vaterite may be mixed with other carbonate forms that may act as a filler and/or the reactive vaterite may also act as an absorbent or colorant to the lubricant composition.

The amount of the carbonate additive in the lubricant may vary, and may be 1% by weight or more, such as 3% by weight or more, including 5% by weight or more. The amount of carbonate additive in the finished lubricant product may vary, and may be more than 1% by weight, or more than 3% by weight, or more than 5% by weight, or more than 10% by weight, or more than 25% by weight, or more than 50% by weight, or more than 60% by weight, or more than 70% by weight, or more than 80% by weight, or more than 90% by weight, or between 10-85% by weight, or between 10-75% by weight, or between 10-65% by weight, or between 10-55% by weight, or between 10-45% by weight, or between 10-35% by weight, or between 10-25% by weight, or between 10-15% by weight, or between 25-85% by weight, or between 25-75% by weight, or between 25-60% by weight, or between 25-50% by weight, or between 50-75% by weight, or between 50-60% by weight.

The amount of aragonite in the carbonate additive or the $CO_2$ sequestering additive in the lubricant product may be between 50-100% w/w; or between 50-99% w/w; or between 50-95% w/w; or between 50-90% w/w; or between 50-80% w/w; or between 50-75% w/w; or between 50-60% w/w; or between 75-99% w/w; or between 80-99% w/w.

The lubricating oil composition may be formulated for commercial purposes for use in internal combustion engines, such as gasoline and diesel engines, crankcase lubrication and the like. The lubricant product of the invention may be formed by mixing the carbonate additive and a non-cementitious additive such as oil. The oil (sometimes referred to as base oil) may be an oil of lubricating viscosity and may be the liquid constituent of a lubricant, into which additives and possibly other oils may be blended to produce the final lubricant (herein lubricating composition or product). A base oil may be selected from natural (vegetable, animal or mineral) and synthetic lubricating oils and mixtures thereof. It may range in viscosity from light distillate mineral oils to heavy lubricating oils such as gas engine oil, mineral lubricating oil, motor vehicle oil, and heavy duty diesel oil. In some instances, the viscosity of the oil ranges from 2 to 30 mm$^2$ s$^{-1}$, such as 5 to 20mm$^2$ s$^{-1}$ at 100° C.

Other examples of non-cementitious additive to make lubricant product of the invention include, but not limited to, natural oils including animal oils and vegetable oils, liquid petroleum oils and hydrorefined, solvent-treated or acid-treated mineral lubricating oils of the paraffinic, naphthenic and mixed paraffinic-naphthenic types. Oils of lubricating viscosity derived from coal or shale are also useful base oils. Synthetic lubricating oils include hydrocarbon oils and halo-substituted hydrocarbon oils such as polymerized and inter-polymerized olefins (e.g., polybutylenes, polypropylenes, propylene-isobutylene copolymers, chlorinated polybutylenes, poly(1-hexenes), poly(1-octenes), poly(1-decenes)); alkylbenzenes (e.g., dodecylbenzenes, tetradecylbenzenes, dinonylbenzenes, di(2-ethylhexyl)benzenes); polyphenyls (e.g., biphenyls, terphenyls, alkylated polyphenols); and alkylated diphenyl ethers and alkylated diphenyl sulfides and the derivatives; analogs and homologs thereof. Alkylene oxide polymers and interpolymers and derivatives thereof where the terminal hydroxyl groups have been modified, for example by esterification or etherification, constitute another class of known synthetic lubricating oils. Another suitable class of synthetic lubricating oils comprises the esters of dicarboxylic acids. Esters useful as synthetic oils also include those made from $C_5$ to $C_{12}$ monocarboxylic acids and polyols, and polyol ethers such as neopentyl glycol, trimethylolpropane, pentaerythritol, dipentaerythritol and tripentaerythritol. Silicon-based oils such as the polyalkyl-, polyaryl-, polyakoxy-, or polyaryloxysiloxane oils and silicate oils comprise another useful class of synthetic lubricants.

Unrefined, refined and re-refined oils can be used as non-cementitious additive in the lubricants provided herein. Unrefined oils are those obtained directly from a natural or synthetic source without further purification treatment. For example, a shale oil obtained directly from retorting operations, a petroleum oil obtained directly from distillation or ester oil obtained directly from an esterification process and used without further treatment would be an unrefined oil. Refined oils are similar to the unrefined oils except they have been further treated in one or more purification steps to improve one or more properties. Many such purification techniques, such as distillation, solvent extraction, acid or base extraction, filtration and percolation are known to those skilled in the art. Re-refined oils are obtained by processes similar to those used to obtain refined oils applied to refined oils which have been already used in service. Such re-refined oils are also known as reclaimed or reprocessed oils and often are additionally processed by techniques for removal of spent additives and oil breakdown products. Also present may be one or more co-additives. Known additives may be incorporated into the lubricant composition together with the additives of the invention. They may, for example, include dispersants; other detergents, e.g. single or mixed detergent systems; rust inhibitors; anti-wear agents; anti-oxidants; corrosion inhibitors; friction modifiers or friction reducing agents; pour point depressants; anti-foaming agents; viscosity modifiers; and surfactants. They can be combined in proportions known in the art. Some additives can provide a multiplicity of effects; thus, for example, a single additive may act as a dispersant and as an oxidation inhibitor.

In certain instances, the non-cementitious additive is a dispersant. A dispersant is an additive for a lubricant whose function is to hold solid and liquid contaminants in suspension, thereby passivating them and reducing engine deposits at the same time as reducing sludge depositions. Thus, for example, a dispersant maintains in suspension oil-insoluble substances that result from oxidation during use of the lubricant, thus preventing sludge flocculation and precipitation or deposition on metal parts of the engine. Dispersants are usually ashless, being non-metallic organic materials that form substantially no ash on combustion, in contrast to metal-containing, and hence ash-forming, materials. They comprise a long chain hydrocarbon with a polar head, the polarity being derived from inclusion of, e.g. an O, P or N atom. The hydrocarbon is an oleophilic group that confers oil-solubility, having for example 40 to 500 carbon atoms. Thus, ashless dispersants may comprise an oil-soluble polymeric hydrocarbon backbone having functional groups that are capable of associating with particles to be dispersed. Typically, the dispersants comprise amine, alcohol, amide, or ester polar moieties attached to the polymer backbone often via a bridging group. The ashless dispersant may be, for example, selected from oil-soluble salts, esters, amino-esters, amides, imides, and oxazolines of long chain hydrocarbon-substituted mono- and dicarboxylic acids or their anhydrides; thiocarboxylate derivatives of long chain hydrocarbons; long chain aliphatic hydrocarbons having a polyamine attached directly thereto, and Mannich condensation products formed by condensing a long chain substituted phenol with formaldehyde and polyalkylene polyamine, such as described in U.S. Pat. No. 3,442,808. Dispersants include, for example, derivatives of long chain hydrocarbon-substituted carboxylic acids, examples being derivatives of high molecular weight hydrocarbyl-substituted succinic acid.

A noteworthy group of dispersants are hydrocarbon-substituted succinimides, made, for example, by reacting the above acids (or derivatives) with a nitrogen-containing compound, advantageously a polyalkylene polyamine, such as a polyethylene polyamine. Particularly preferred are the reaction products of polyalkylene polyamines with alkenyl succinic anhydrides, such as described in U.S. Pat. Nos. 3,202,678; 3,154,560; 3,172,892; 3,024,195, 3,024,237; 3,219,666; and 3,216,936; and BE-A-66,875 that may be post-treated to improve their properties, such as borated (as described in U.S. Pat. Nos. 3,087,936 and 3,254,025) fluorinated and oxylated. For example, boration may be accomplished by treating an acyl nitrogen-containing dispersant with a boron compound selected from boron oxide, boron halides, boron acids and esters of boron acids. Also of interest are Anti-Wear and Anti-Oxidant Agents. Dihydrocarbyl dithiophosphate metal salts are frequently used in lubricants as anti-wear and anti-oxidant agents. The metal may be an alkali or alkaline earth metal, or aluminum, lead, tin, zinc, molybdenum, manganese, nickel or copper. The zinc salts are most commonly used in lubricating oil in amounts of 0.1 to 10, preferably 0.2 to 2, mass %, based upon the total weight of the lubricant. They may be prepared in accordance with known techniques by first forming a dihydrocarbyl dithiophosphoric acid (DDPA), usually by reaction of one or more alcohols or a phenol with $P_2S_5$ and then neutralising the formed DDPA with a zinc compound. The zinc dihydrocarbyl dithiophosphates can be made from mixed DDPA which in turn may be made from mixed alcohols. Alternatively, multiple zinc dihydrocarbyl dithiophosphates can be made and subsequently mixed. Lubricants of the invention may be prepared in accordance with traditional manufacturing protocols for such compositions, with the exception that an amount of carbonate additive of the invention is employed. As such, an amount of the carbonate additive may be combined with other components of the lubricant and combined into the final desired lubricant product.

The amount of non-cementitious additives in the lubricant product may vary, and may be more than 1% by weight, or more than 3% by weight, or more than 5% by weight, or more than 10% by weight, or more than 25% by weight, or more than 50% by weight, or more than 60% by weight, or more than 70% by weight, or more than 80% by weight, or more than 90% by weight, or between 10-95% by weight, or between 10-85% by weight, or between 10-75% by weight, or between 10-65% by weight, or between 10-55% by weight, or between 10-45% by weight, or between 10-35% by weight, or between 10-25% by weight, or between 10-15% by weight, or between 25-95% by weight, or between 25-85% by weight, or between 25-75% by weight, or between 25-60% by weight, or between 25-50% by weight, or between 50-85% by weight, or between 50-75% by weight, or between 50-60% by weight.

Adhesives

In one aspect, there are provided non-cementitious compositions, comprising a carbonate additive, wherein the carbonate additive comprises vaterite, wherein the non-cementitious composition is adhesives. In one aspect, there are provided non-cementitious compositions, comprising a carbonate additive, wherein the carbonate additive comprises reactive vaterite, wherein the non-cementitious composition is adhesives. As used herein, "adhesive" includes compounds that adhere to a substrate or bond two substrates together. In some embodiments, the carbonate additive is a $CO_2$ sequestering additive. In one aspect, there are provided non-cementitious compositions, comprising a $CO_2$ sequestering additive, wherein the $CO_2$ sequestering additive comprises vaterite, wherein the non-cementitious composition is an adhesive. In one aspect, there are provided non-cementitious compositions, comprising a $CO_2$ sequestering additive, wherein the $CO_2$ sequestering additive comprises reactive vaterite, wherein the non-cementitious composition is an adhesive. In one aspect, there are provided non-cementitious compositions, comprising a $CO_2$ sequestering additive, wherein the $CO_2$ sequestering additive comprises vaterite wherein the $CO_2$ sequestering additive has a $\delta^{13}C$ of less than −12‰, and wherein the non-cementitious composition is an adhesive. In one aspect, there are provided non-cementitious compositions, comprising a $CO_2$ sequestering additive, wherein the $CO_2$ sequestering additive comprises reactive vaterite wherein the $CO_2$ sequestering additive has a $\delta^{13}C$ of less than −12‰, and wherein the non-cementitious composition is an adhesive.

Adhesives of the invention may be produced in accordance with traditional manufacturing protocols with the exception that an amount of the carbonate composition is employed. In producing adhesives of the invention, an amount of the carbonate composition comprising vaterite such as reactive vaterite may be employed as colorants and to improve rheology and increase tensile strength. In some embodiments, in producing adhesive products of the invention with the vaterite, the vaterite in the carbonate composition act as a filler that replaces a certain amount of the non-cementitious additive in the adhesive product thereby producing a less expensive and an environmentally friendly product. Traditionally, fillers are added such that the filler does not react or bind with the non-cementitious additive. In some embodiments, in producing adhesive products of the invention with the reactive vaterite, the reactive vaterite in the carbonate composition does not act as a filler but instead transforms to aragonite upon contact with non-cementitious additive and water which aragonite may bind to the non-cementitious additive resulting in bonding and/or linkage.

The physical properties of adhesives of the invention may vary greatly depending upon the type of chemical system employed and the amount of the carbonate composition added. The viscosity may range from 1.0 cP to 750000 cP, such as 100 cP to 10000 cP, including 500 cP to 5000 cP, and including 1500 cP to 3000 cP. The effective temperature of the adhesive may range between −75° C. to 500° C., such as 0° C. to 200° C. and including 50° C. to 150° C. The effective temperature includes the temperature range in which the adhesive shows no significant changes in its physical properties or utility (i.e., insignificant change in substrate bonding). The tensile strength of the adhesive after the addition of the carbonate composition may range from 0.1 MPa to 75 MPa, such as 10 MPa to 50 MPa and including 15 to 35 MPa. The elongation capacity of the adhesives may range from 1.0% to 150%, such as 40% to 100% and including 50% to 75%.

When added, the carbonate composition comprising vaterite such as reactive vaterite may increase the viscosity, the storage and loss moduli of the adhesive, and in some instances, impart pseudoplasticity and thixotropy. The amount of carbonate composition in adhesives of the invention may vary, ranging from 5 to 40% by weight, such as 5 to 25% by weight and including 10 to 15% by weight. The amount of carbonate additive in the adhesive product may vary, and may be more than 1% by weight, or more than 3% by weight, or more than 5% by weight, or more than 10% by weight, or more than 25% by weight, or more than 50% by weight, or more than 60% by weight, or more than 70% by weight, or more than 80% by weight, or more than 90% by weight, or between 10-85% by weight, or between 10-75% by weight, or between 10-65% by weight, or between 10-55% by weight, or between 10-45% by weight, or between 10-35% by weight, or between 10-25% by weight, or between 10-15% by weight, or between 25-85% by weight, or between 25-75% by weight, or between 25-60% by weight, or between 25-50% by weight, or between 50-75% by weight, or between 50-60% by weight.

The amount of aragonite in the carbonate additive or the $CO_2$ sequestering additive in the adhesive product may be between 50-100% w/w; or between 50-99% w/w; or between 50-95% w/w; or between 50-90% w/w; or between 50-80% w/w; or between 50-75% w/w; or between 50-60% w/w; or between 75-99% w/w; or between 80-99% w/w.

Adhesive compositions of the invention include non-cementitious additives which may be natural or synthetic. Natural adhesives may be made from inorganic mineral sources or biological sources such as vegetable matter, dextrin or other natural resins. Synthetic adhesives may comprise a chemical system (e.g., polymeric material), binders (e.g., polyester, polyurethane, acrylic resin), an aqueous or organic solvent and one or more additives. Exemplary chemical systems may include polyoxymethylene, acrylic, polyacrylate, bismaleimide, butyl, cyanoacrylate, epoxy, ethylene copolymer, fluoropolymer, polyisoprene, polyamide, polyphenylene sulfide, polysulfide, polypropylene, polybutadiene, polyolefinic, polyester, polyurethane, polyphenolic, silicone, starch, polystyrene, styrene copolymer, vinyl, polyvinylcarbonate, rubber, elastomer, and compatible mixtures thereof.

The amount of non-cementitious additives in the adhesive product may vary, and may be more than 1% by weight, or more than 3% by weight, or more than 5% by weight, or more than 10% by weight, or more than 25% by weight, or more than 50% by weight, or more than 60% by weight, or more than 70% by weight, or more than 80% by weight, or more than 90% by weight, or between 10-95% by weight, or between 10-85% by weight, or between 10-75% by weight, or between 10-65% by weight, or between 10-55% by weight, or between 10-45% by weight, or between 10-35% by weight, or between 10-25% by weight, or between 10-15% by weight, or between 25-95% by weight, or between 25-85% by weight, or between 25-75% by weight, or between 25-60% by weight, or between 25-50% by weight, or between 50-85% by weight, or between 50-75% by weight, or between 50-60% by weight.

In some embodiments, adhesives of the invention may be liquid compositions which employ a solvent. Exemplary solvents may include, but are not limited to xylene, methanol, toluene, mineral spirits, acetone, butyl acetate, brominated solvents, mixtures thereof, among others. The amount of solvent comprises about 10% to 90% of the liquid composition, such as 50% to 75%, including 60% to 70%. The liquid composition may be applied by brushing, spraying, rolling, immersing the substrate into the composition, or any other convenient method for applying a coating to a surface. In some instances, depending on the amount of solvent, the liquid adhesive composition may be employed as a caulk or sealant. In other instances, the liquid adhesive composition may be dispensed using an aerosol sprayer by formulating the adhesive with a suitable propellant. Exemplary propellants include, but are not limited to fluorinated propellants such as HFCs, hydrocarbons such as propane, butane, isobutane, pentane, nitrogen, carbon dioxide and any compatible mixtures thereof. The amount of propellant may vary, ranging from 10% to 30%, such as 15% to 25%, including 15% to 20%. The composition, including the sprayable propellant may be packaged into an aerosol by any convenient protocol.

In other embodiments, adhesives of the invention may be viscous liquids, gels, soft solids or powders. In producing the viscous liquid, soft solid, solid and gel adhesives, the components may be blended and mixed using any convenient protocol. Exemplary methods for blending the components include but are not limited to banbury mixers, sigman blade mixers, double arm mixers, vortexing mixers, mixers that employ sonication, mixers that employ heavy agitation, among others. Solid, soft solid and gel adhesives of the invention may then be further shaped by extruding, rotary pressing, stamping, cutting, laminating or molding to produce the final adhesive product. In manufacturing adhesives of the invention, the above mentioned constituents may also include one or more additional components, such as anti-foaming agents, wetting agents, thickeners, plasticizers, antioxidants and metal chelating agents. Tackifiers which increase the adhesion of the compositions in general or for specific surfaces may also be added. Exemplary tackifiers include polyterpene resins, gum rosin, rosin esters and other rosin derivatives, oil-soluble phenolic resins, coumaroneindene resins and petroleum hydrocarbon resins.

Methods of setting (i.e., curing) the adhesive product may include air drying, anaerobic drying, thermoplastic setting, thermoset, two-component setting, UV or radiation cured, pressure induced setting, single component setting, moisture cured and vulcanization.

Adhesives of the invention may be compatible with use on a number of different types of substrates including but not limited to ceramic, glass, concrete, masonry, composite materials, metal, paper or paperboard, plastic, porous surfaces, rubber, elastomer, textiles, fabrics or wood.

Rubber

In one aspect, there are provided non-cementitious compositions, comprising a carbonate additive, wherein the carbonate additive comprises vaterite, wherein the non-cementitious composition is for rubber. In one aspect, there are provided non-cementitious compositions, comprising a carbonate additive, wherein the carbonate additive comprises reactive vaterite, wherein the non-cementitious composition is for rubber. As used herein, "rubber" is used in its conventional sense to include an elastic material of varying chemical composition which comprise long thread-like molecules and possess a flexibility in its molecular chain to allow for overall material flexing and coiling. In some embodiments, the carbonate additive is a $CO_2$ sequestering additive. In one aspect, there are provided non-cementitious compositions, comprising a $CO_2$ sequestering additive, wherein the $CO_2$ sequestering additive comprises vaterite, wherein the non-cementitious composition is for rubber. In one aspect, there are provided non-cementitious compositions, comprising a $CO_2$ sequestering additive, wherein the $CO_2$ sequestering additive comprises reactive vaterite, wherein the non-cementitious composition is for rubber. In one aspect, there are provided non-cementitious compositions, comprising a $CO_2$ sequestering additive, wherein the $CO_2$ sequestering additive comprises vaterite wherein the $CO_2$ sequestering additive has a $\delta^{13}C$ of less than −12‰, and wherein the non-cementitious composition is for rubber. In one aspect, there are provided non-cementitious compositions, comprising a $CO_2$ sequestering additive, wherein the $CO_2$ sequestering additive comprises reactive vaterite wherein the $CO_2$ sequestering additive has a $\delta^{13}C$ of less than −12‰, and wherein the non-cementitious composition is for rubber.

Rubber of the invention may be produced in accordance with traditional manufacturing protocols with the exception that an amount of the carbonate composition is employed. In producing rubber of the invention, an amount of the carbonate composition may be employed as colorants and to improve workability of the raw rubber product. In some embodiments, in producing rubber products of the invention with the vaterite, the vaterite in the carbonate composition act as a filler that replaces a certain amount of the non-cementitious additive in the rubber product thereby producing a less expensive and an environmentally friendly product. Traditionally, fillers are added such that the filler does not react or bind with the non-cementitious additive.

In some embodiments, in producing rubber products of the invention with the reactive vaterite, the reactive vaterite in the carbonate composition does not act as a filler but instead transforms to aragonite upon contact with non-cementitious additive and water which aragonite may bind to the non-cementitious additive resulting in bonding and/or linkage. The amount of the carbonate additive in the rubber product may vary, and may be more than 1% by weight, or more than 3% by weight, or more than 5% by weight, or more than 10% by weight, or more than 25% by weight, or more than 50% by weight, or more than 60% by weight, or more than 70% by weight, or more than 80% by weight, or more than 90% by weight, or between 10-85% by weight, or between 10-75% by weight, or between 10-65% by weight, or between 10-55% by weight, or between 10-45% by weight, or between 10-35% by weight, or between 10-25% by weight, or between 10-15% by weight, or between 25-85% by weight, or between 25-75% by weight, or between 25-60% by weight, or between 25-50% by weight, or between 50-75% by weight, or between 50-60% by weight.

The amount of aragonite in the carbonate additive or the $CO_2$ sequestering additive in the rubber product may be between 50-100% w/w; or between 50-99% w/w; or between 50-95% w/w; or between 50-90% w/w; or between 50-80% w/w; or between 50-75% w/w; or between 50-60% w/w; or between 75-99% w/w; or between 80-99% w/w.

Rubber compositions of the invention include non-cementitious additives which may be natural or synthetic. Natural includes rubber in the form of a hydrocarbon polymer of isoprene units derived from the milky colloidal suspension from the sap of a rubber tree or other such plants. Synthetic rubber may be derived from a number of different synthetic polymers including, but not limited to poly-styrene-butadiene, polyisobutylene, ethylene-propylene copolymer, poly-neoprene, butadiene-acrylonitrile copolymer, fluoroelastomers, polyurethane, polysulfide, polyacrylate among others. Rubber of the invention may also include one or more additives, which include a vulcanizing agent, a vulcanization accelerator, a process oil, an anti-aging agent, an antioxidant and an anti-ozonant. In producing rubber of the invention, the components may be blended or mixed with the $CO_2$ sequestering composition using any convenient protocol. Exemplary methods for blending the compositions include banbury mixers, sigman blade mixers, double-arm mixers, vortexing mixers, mixers that employ sonication, mixers that employ heavy agitation, among others. The rubber may be further shaped by rotary pressing, extruding, stamping, cutting, molding or any other convenient protocol into the final rubber product.

The amount of non-cementitious additives in the rubber product may vary, and may be more than 1% by weight, or more than 3% by weight, or more than 5% by weight, or more than 10% by weight, or more than 25% by weight, or more than 50% by weight, or more than 60% by weight, or more than 70% by weight, or more than 80% by weight, or more than 90% by weight, or between 10-95% by weight, or between 10-85% by weight, or between 10-75% by weight, or between 10-65% by weight, or between 10-55% by weight, or between 10-45% by weight, or between 10-35% by weight, or between 10-25% by weight, or between 10-15% by weight, or between 25-95% by weight, or between 25-85% by weight, or between 25-75% by weight, or between 25-60% by weight, or between 25-50% by weight, or between 50-85% by weight, or between 50-75% by weight, or between 50-60% by weight.

Chalk

In one aspect, there are provided non-cementitious compositions, comprising a carbonate additive, wherein the carbonate additive comprises vaterite, wherein the non-cementitious composition is for chalk. In one aspect, there are provided non-cementitious compositions, comprising a carbonate additive, wherein the carbonate additive comprises reactive vaterite, wherein the non-cementitious composition is for chalk. As used herein, "chalk" is used in its conventional sense to refer to a marking element usually in the form of a stick or block used for writing or drawing on a rough surface. In some embodiments, the carbonate additive is a $CO_2$ sequestering additive. In one aspect, there are provided non-cementitious compositions, comprising a $CO_2$ sequestering additive, wherein the $CO_2$ sequestering additive comprises vaterite, wherein the non-cementitious composition is for chalk. In one aspect, there are provided non-cementitious compositions, comprising a $CO_2$ sequestering additive, wherein the $CO_2$ sequestering additive comprises reactive vaterite, wherein the non-cementitious composition is for chalk. In one aspect, there are provided non-cementitious compositions, comprising a $CO_2$ sequestering additive, wherein the $CO_2$ sequestering additive comprises vaterite wherein the $CO_2$ sequestering additive has a $\delta^{13}C$ of less than −12‰, and wherein the non-cementitious composition is for chalk. In one aspect, there are provided non-cementitious compositions, comprising a $CO_2$ sequestering additive, wherein the $CO_2$ sequestering additive comprises reactive vaterite wherein the $CO_2$ sequestering additive has a $\delta^{13}C$ of less than −12‰, and wherein the non-cementitious composition is for chalk.

In producing chalk of the invention, an amount of the carbonate composition may be employed as colorants and to improve workability of the product. The chalk products of the invention may be produced in accordance with traditional manufacturing protocols with the exception that an amount of the carbonate additive or carbonate composition is employed. In some embodiments, in producing chalk products of the invention with the vaterite, the vaterite in the carbonate composition act as a filler that replaces a certain amount of the non-cementitious additive in the chalk product thereby producing a less expensive and an environmentally friendly product. Traditionally, fillers are added such that the filler does not react or bind with the non-cementitious additive. In some embodiments, in producing chalk products of the invention with the reactive vaterite, the reactive vaterite in the carbonate composition does not act as a filler but instead transforms to aragonite upon contact with non-cementitious additive and water which aragonite may bind to the non-cementitious additive resulting in bonding and/or linkage.

The amount of carbonate additive in the chalk product may vary, and may be more than 1% by weight, or more than 3% by weight, or more than 5% by weight, or more than 10% by weight, or more than 25% by weight, or more than 50% by weight, or more than 60% by weight, or more than 70% by weight, or more than 80% by weight, or more than 90% by weight, or between 10-85% by weight, or between 10-75% by weight, or between 10-65% by weight, or between 10-55% by weight, or between 10-45% by weight, or between 10-35% by weight, or between 10-25% by weight, or between 10-15% by weight, or between 25-85% by weight, or between 25-75% by weight, or between 25-60% by weight, or between 25-50% by weight, or between 50-75% by weight, or between 50-60% by weight.

The amount of aragonite in the carbonate additive or the $CO_2$ sequestering additive in the chalk product may be between 50-100% w/w; or between 50-99% w/w; or between 50-95% w/w; or between 50-90% w/w; or between 50-80% w/w; or between 50-75% w/w; or between 50-60% w/w; or between 75-99% w/w; or between 80-99% w/w.

Chalk in the present invention is a mixture of an amount of the carbonate composition comprising vaterite such as reactive vaterite with one or more non-cementitious additives, such as, thermosetting synthetic binders which is further processed into the form of sticks or blocks. Binders used in the production of chalk may be any conventional thermosetting synthetic binder. Exemplary binders include uncured epoxy, polyester, polyurethane or acrylic resins, or compatible mixtures thereof. Sticks or blocks of chalk are produced by forming a uniform mixture of the carbonate composition with the synthetic binder and pressing it under high pressure at room temperature. The procedure is preferably such that the mixture of components are processed in an extrusion press, cooled and crushed to a fine particle size, such as 100 microns or smaller, including 75 microns or smaller and preferably 60 microns or smaller. The pulverulent mixture of components obtained is then pressed at room temperature and under a pressure sufficient to consolidate the powder (e.g., 10-35 MPa) into sticks or blocks of chalky and friable consistency. Smaller sticks or blocks may also be cut from larger pre-pressed blocks. Colored chalk may also be produced using the above described method, with the exception that a colorant (i.e., dye) may be added to the carbonate composition and binder mixture.

Asphalt Products

In one aspect, there are provided non-cementitious compositions, comprising a carbonate additive, wherein the carbonate additive comprises vaterite, wherein the non-cementitious composition is for asphalt product. In one aspect, there are provided non-cementitious compositions, comprising a carbonate additive, wherein the carbonate additive comprises reactive vaterite, wherein the non-cementitious composition is for asphalt product. As used herein, "asphalt" (i.e., bitumen) is used in its conventional sense to refer to the natural or manufactured black or dark-colored solid, semisolid or viscous material composed mainly of high molecular weight hydrocarbons derived from a cut in petroleum distillation after naptha, gasoline, kerosene and other fractions have been removed from crude oil. In some embodiments, the carbonate additive is a $CO_2$ sequestering additive. In one aspect, there are provided non-cementitious compositions, comprising a $CO_2$ sequestering additive, wherein the $CO_2$ sequestering additive comprises vaterite, wherein the non-cementitious composition is for an asphalt product. In one aspect, there are provided non-cementitious compositions, comprising a $CO_2$ sequestering additive, wherein the $CO_2$ sequestering additive comprises reactive vaterite, wherein the non-cementitious composition is for an asphalt product. In one aspect, there are provided non-cementitious compositions, comprising a $CO_2$ sequestering additive, wherein the $CO_2$ sequestering additive comprises vaterite wherein the $CO_2$ sequestering additive has a $\delta^{13}C$ of less than −12‰, and wherein the non-cementitious composition is for an asphalt product. In one aspect, there are provided non-cementitious compositions, comprising a $CO_2$ sequestering additive, wherein the $CO_2$ sequestering additive comprises reactive vaterite wherein the $CO_2$ sequestering additive has a $\delta^{13}C$ of less than −12‰, and wherein the non-cementitious composition is for an asphalt product.

In producing asphalt of the invention, an amount of the carbonate composition may be employed as colorants and to improve workability of the product. Asphalt products of the invention may be produced in accordance with traditional manufacturing protocols with the exception that an amount of the carbonate additive or carbonate composition is employed. In some embodiments, in producing asphalt products of the invention with the vaterite, the vaterite in the carbonate composition act as a filler that replaces a certain amount of the non-cementitious additive in the asphalt product thereby producing a less expensive and an environmentally friendly product. Traditionally, fillers are added such that the filler does not react or bind with the non-cementitious additive. In some embodiments, in producing asphalt products of the invention with the reactive vaterite, the reactive vaterite in the carbonate composition does not act as a filler but instead transforms to aragonite upon contact with non-cementitious additive and water which aragonite may bind to the non-cementitious additive resulting in bonding and/or linkage.

The amount of carbonate additive in the asphalt product may vary, and may be more than 1% by weight, or more than 3% by weight, or more than 5% by weight, or more than 10% by weight, or more than 25% by weight, or more than 50% by weight, or more than 60% by weight, or more than 70% by weight, or more than 80% by weight, or more than 90% by weight, or between 10-85% by weight, or between 10-75% by weight, or between 10-65% by weight, or between 10-55% by weight, or between 10-45% by weight, or between 10-35% by weight, or between 10-25% by weight, or between 10-15% by weight, or between 25-85% by weight, or between 25-75% by weight, or between 25-60% by weight, or between 25-50% by weight, or between 50-75% by weight, or between 50-60% by weight.

The amount of aragonite in the carbonate additive or the $CO_2$ sequestering additive in the asphalt product may be between 50-100% w/w; or between 50-99% w/w; or between 50-95% w/w; or between 50-90% w/w; or between 50-80% w/w; or between 50-75% w/w; or between 50-60% w/w; or between 75-99% w/w; or between 80-99% w/w.

The molecular composition of asphalt products may vary. Asphalt products of the invention may be further composed of non-cementitious additives, such as, saturated and unsaturated aliphatic and aromatic compounds that possess functional groups that include, but not limited to alcohol, carboxyl, phenolic, amino, thiol functional groups. In an exemplary embodiment, asphalt products may be 80% carbon by weight, 10% hydrogen by weight, 6% sulfur by weight, 3% total weight of oxygen and nitrogen; and may also include trace amounts of various metals such as iron, nickel and vanadium. The molecular weight of asphalt products may range from 0.2 kDa to 50 kDa, such as 1 kDa to 25 kDa, including 2 kDa to 10 kDa. Components of asphalts may be asphaltenes (i.e., high molecular weight compounds that are insoluble in hexane or heptane) or maltenes (i.e., lower molecular weight compounds that are soluble in hexane or heptane). The amount of asphaltenes in asphalt products may vary, ranging from 5% to 25% by weight, such as 10% to 20%, and including 12% to 15%. In some embodiments, asphalt products of the invention may also contain a polymeric additive to enhance workability, viscoelasticity, and strain recovery. Exemplary polymeric additives include polybutadiene, polyisoprene, ethylene/vinyl acetate copolymer, polyacrylate, polymethacrylate, polychloroprene, etc.

Asphalt products of interest also include an amount of aggregate. Aggregate may be any convenient aggregate material. The aggregate material may be $CO_2$ sequestering aggregates, for example as described in U.S. patent application Ser. No. 12/475,378, titled "Rock and aggregate, and methods of making and using the same"; the disclosure of which is herein incorporated by reference. Asphalt products of the invention may be prepared in accordance with traditional manufacturing protocols, with the exception that an amount of the carbonate composition of the invention is employed. As such, an amount of the carbonate additive may be combined with other non-cementitious additives, such as, the asphalt product (e.g., asphalt, aggregate, cutback solvents, polymeric additives), and then mixed to produce the final asphalt product.

Paint

In one aspect, there are provided non-cementitious compositions, comprising a carbonate additive, wherein the carbonate additive comprises vaterite, wherein the non-cementitious composition is for paint. In one aspect, there are provided non-cementitious compositions, comprising a carbonate additive, wherein the carbonate additive comprises reactive vaterite, wherein the non-cementitious composition is for paint. In some embodiments, the carbonate additive is a $CO_2$ sequestering additive. As used herein, "paint" includes any liquid, liquefiable, or mastic composition which, after application to a substrate in a thin layer, is converted to an opaque solid film. In one aspect, there are provided non-cementitious compositions, comprising a $CO_2$ sequestering additive, wherein the $CO_2$ sequestering additive comprises vaterite, wherein the non-cementitious composition is for a paint product. In one aspect, there are provided non-cementitious compositions, comprising a $CO_2$ sequestering additive, wherein the $CO_2$ sequestering additive comprises reactive vaterite, wherein the non-cementitious composition is for a paint product. In one aspect, there are provided non-cementitious compositions, comprising a $CO_2$ sequestering additive, wherein the $CO_2$ sequestering additive comprises vaterite wherein the $CO_2$ sequestering additive has a $\delta^{13}C$ of less than −12‰, and wherein the non-cementitious composition is for a paint product. In one aspect, there are provided non-cementitious compositions, comprising a $CO_2$ sequestering additive, wherein the $CO_2$ sequestering additive comprises reactive vaterite wherein the $CO_2$ sequestering additive has a $\delta^{13}C$ of less than −12‰, and wherein the non-cementitious composition is for a paint product.

In producing paint product of the invention, an amount of the carbonate composition may be employed as colorants and to improve workability of the product. The paint products of the invention may be produced in accordance with traditional manufacturing protocols with the exception that an amount of the carbonate additive or carbonate composition is employed. In some embodiments, in producing paint products of the invention with the vaterite, the vaterite in the carbonate composition act as a filler that replaces a certain amount of the non-cementitious additive in the paint product thereby producing a less expensive and an environmentally friendly product. Fillers may be added such that the filler does not react or bind with the non-cementitious additive. In some embodiments, in producing paint products of the invention with the reactive vaterite, the reactive vaterite in the carbonate composition does not act as a filler but instead transforms to aragonite upon contact with non-cementitious additive and water which aragonite may bind to the non-cementitious additive resulting in bonding and/or linkage.

The amount of carbonate additive in the paint product may vary, and may be more than 1% by weight, or more than 3% by weight, or more than 5% by weight, or more than 10% by weight, or more than 25% by weight, or more than 50% by weight, or more than 60% by weight, or more than 70% by weight, or more than 80% by weight, or more than 90% by weight, or between 10-85% by weight, or between 10-75% by weight, or between 10-65% by weight, or between 10-55% by weight, or between 10-45% by weight, or between 10-35% by weight, or between 10-25% by weight, or between 10-15% by weight, or between 25-85% by weight, or between 25-75% by weight, or between 25-60% by weight, or between 25-50% by weight, or between 50-75% by weight, or between 50-60% by weight.

The amount of aragonite in the carbonate additive or the $CO_2$ sequestering additive in the paint product may be between 50-100% w/w; or between 50-99% w/w; or between 50-95% w/w; or between 50-90% w/w; or between 50-80% w/w; or between 50-75% w/w; or between 50-60% w/w; or between 75-99% w/w; or between 80-99% w/w.

Paint products of the invention may be further composed of non-cementitious additives, such as, one or more of the following components: pigments, binders, solvents and additives. Pigments are granular solids incorporated into the paint, e.g., to contribute color, toughness or simply to reduce the cost of the paint. Pigments of interest include natural and synthetic types. Natural pigments include various clays, calcium carbonate, mica, silicas, and talcs. Synthetic pigments include engineered molecules, calcined clays, blanc fix, precipitated calcium carbonate, and synthetic silicas. Hiding pigments, in making paint opaque, also protect the substrate from the harmful effects of ultraviolet light. Hiding pigments include titanium dioxide, phthalo blue, red iron oxide, and many others. Fillers are a special type of pigment that serve to thicken the film, support its structure and simply increase the volume of the paint. Fillers of interest include inert materials, such as talc, lime, baryte, clay, etc. Floor paints that will be subjected to abrasion may even contain fine quartz sand as a filler. Not all paints may include fillers. Some paints contain very large proportions of pigment/filler and binder.

The carbonate additive of the invention may be employed in place of all or some of the above pigment components in a given paint. The binder, or resin, is the film forming component of paint. The binder imparts adhesion, binds the pigments together, and strongly influences such properties as gloss potential, exterior durability, flexibility, and toughness. Binders of interest include synthetic or natural resins such as acrylics, polyurethanes, polyesters, melamine resins, epoxy, or oils, etc. Solvents of interest may be present, e.g., to adjust the viscosity of the paint. They may be volatile so as not to become part of the paint film. Solvents may be included to control flow and application properties, and affect the stability of the paint while in liquid state. Solvents of interest include water, e.g., water-based paints and organic solvents, e.g., aliphatics, aromatics, alcohols, and ketones. Organic solvents such as petroleum distillate, esters, glycol ethers, and the like find use. Additives of interest include additives to modify surface tension, improve flow properties, improve the finished appearance, increase wet edge, improve pigment stability, impart antifreeze properties, control foaming, control skinning, etc. Other types of additives include catalysts, thickeners, stabilizers, emulsifiers, texturizers, adhesion promoters, UV stabilizers, flatteners (de-glossing agents), biocides to fight bacterial growth, and the like.

Paint products of the invention may be prepared in accordance with traditional manufacturing protocols with the exception that an amount of carbonate additive of the invention is employed. The amount of carbonate additive in the paint may vary, and may be 1% by weight or more, such as 3% by weight or more, including 5% by weight or more, such as 25% by weight or more. As such, an amount of the carbonate additive may be combined with other components of the paint such as pigment, binder, solvent, or additive and then mixed to produce the final paint product.

The amount of non-cementitious additives in the paint product may vary, and may be more than 1% by weight, or more than 3% by weight, or more than 5% by weight, or more than 10% by weight, or more than 25% by weight, or more than 50% by weight, or more than 60% by weight, or more than 70% by weight, or more than 80% by weight, or more than 90% by weight, or between 10-95% by weight, or between 10-85% by weight, or between 10-75% by weight, or between 10-65% by weight, or between 10-55% by weight, or between 10-45% by weight, or between 10-35% by weight, or between 10-25% by weight, or between 10-15% by weight, or between 25-95% by weight, or between 25-85% by weight, or between 25-75% by weight, or between 25-60% by weight, or between 25-50% by weight, or between 50-85% by weight, or between 50-75% by weight, or between 50-60% by weight.

Personal Care, Cleaning and Other Non-Ingestible Products

In one aspect, there are provided non-cementitious compositions, comprising a carbonate additive, wherein the carbonate additive comprises vaterite, wherein the non-cementitious composition is for non-ingestible products. In one aspect, there are provided non-cementitious compositions, comprising a carbonate additive, wherein the carbonate additive comprises reactive vaterite, wherein the non-cementitious composition is for non-ingestible products. In some embodiments, the carbonate additive is a $CO_2$ sequestering additive. As used herein, "non-ingestible" includes compounds that are not suitable for consumption. Of interest are non-ingestible formulations which incorporate the carbonate composition and non-cementitious additives of the invention into personal care products. In one aspect, there are provided non-cementitious compositions, comprising a $CO_2$ sequestering additive, wherein the $CO_2$ sequestering additive comprises vaterite, wherein the non-cementitious composition is for non-ingestible product. In one aspect, there are provided non-cementitious compositions, comprising a $CO_2$ sequestering additive, wherein the $CO_2$ sequestering additive comprises reactive vaterite, wherein the non-cementitious composition is for non-ingestible product. In one aspect, there are provided non-cementitious compositions, comprising a $CO_2$ sequestering additive, wherein the $CO_2$ sequestering additive comprises vaterite wherein the $CO_2$ sequestering additive has a $\delta^{13}C$ of less than −12‰, and wherein the non-cementitious composition is for a non-ingestible product. In one aspect, there are provided non-cementitious compositions, comprising a $CO_2$ sequestering additive, wherein the $CO_2$ sequestering additive comprises reactive vaterite wherein the $CO_2$ sequestering additive has a $\delta^{13}C$ of less than −12‰, and wherein the non-cementitious composition is for a non-ingestible product. Personal care products of the invention are compositions intended for cleaning purposes or personal use such as for health and/or hygiene purposes. Personal care products may be products that relate to sun-care (e.g., sunscreens, sun-tan lotion, self tanning compositions, bronzers), baby-care (e.g., diapers, baby wipes, baby powder, diaper rash products), facial and body treatment (e.g., acne prevention wipes, acne treatment cream, facial cleansing soap and exfoliating soap, antiperspirants, deodorants, aftershave lotion, bath soap, bath wash, shaving cream, shaving gel, makeup removal, moisturizers, anti-wrinkle creams, lotions), foot-care (anti-itch cream, anti-fungal creams), oral-care (toothpaste, mouthwash), hair-care (shampoo, conditioner, hair spray, hair gel, mouse, colorants, depilatory treatments, hair bleach) and First Aid (bandages, antiseptic sprays, antibacterial gels). Another type of personal care product is cosmetics. Cosmetics of the invention are makeup products that include, but are not limited to mascara, eyeshadow, eyeliner, blush, concealer, foundation, face powder, lipstick, lip gloss, lip treatment, lipliner and nail polish. Another type of personal care product are cleaning products. Cleaning products of the invention are compounds used primarily in the removal of dirt, stains, impurities, microorganisms and the like. Cleaning products of the invention may be products that relate to laundry cleaners (e.g., laundry detergent, stain remover, fabric softener), dishwashing products (dishwashing liquid, dishwashing powders, dishwashing gels, rinse agents, fast-dry agents), room deodorizing products, bathroom cleaners (toilet, shower, marble, porcelain), powdered bleach, shoe polish and all-purpose cleaners.

In some embodiments, in producing non-ingestible products of the invention with the vaterite, the vaterite in the carbonate composition act as a filler that replaces a certain amount of the non-cementitious additive in the non-ingestible product thereby producing a less expensive and an environmentally friendly product. Traditionally, fillers are added such that the filler does not react or bind with the non-cementitious additive. In some embodiments, carbonate composition of the invention may be employed in non-ingestible products as an abrasive, absorbent, buffering agent, anti-caking agent, colorant, opacifying agent, UV-scattering agent or oral care agent in addition to the vaterite such as reactive vaterite transformation to aragonite for linkage or bonding. In producing ingestible products of the invention with the reactive vaterite, the reactive vaterite in the carbonate composition does not act as a filler but instead transforms to aragonite upon contact with non-cementitious additive and water which aragonite may bind to the non-cementitious additive resulting in bonding and/or linkage.

Traditional abrasives, absorbents, buffering agents, fillers, colorants, anti-caking agents, opacifying agents, UV-scattering agents or oral care agents that are conventionally found in non-ingestible products may be substituted entirely or a certain amount removed and replaced using the $CO_2$ sequestering composition provided herein. The carbonate composition used to replace traditional additives may be present in amounts such as 1% by weight or more, such as 3% by weight or more, including 5% by weight or more, such as 25% by weight or more, 50% by weight or more, 75% by weight or more. The amount of carbonate additive in the non-ingestible product may vary, and may be more than 1% by weight, or more than 3% by weight, or more than 5% by weight, or more than 10% by weight, or more than 25% by weight, or more than 50% by weight, or more than 60% by weight, or more than 70% by weight, or more than 80% by weight, or more than 90% by weight, or between 10-85% by weight, or between 10-75% by weight, or between 10-65% by weight, or between 10-55% by weight, or between 10-45% by weight, or between 10-35% by weight, or between 10-25% by weight, or between 10-15% by weight, or between 25-85% by weight, or between 25-75% by weight, or between 25-60% by weight, or between 25-50% by weight, or between 50-75% by weight, or between 50-60% by weight.

The amount of aragonite in the carbonate additive or the $CO_2$ sequestering additive in the non-ingestible product may be between 50-100% w/w; or between 50-99% w/w; or between 50-95% w/w; or between 50-90% w/w; or between 50-80% w/w; or between 50-75% w/w; or between 50-60% w/w; or between 75-99% w/w; or between 80-99% w/w.

In some embodiments, the carbonate composition of the invention may be employed in non-ingestible products as an abrasive. By "abrasive" is meant a compound that contains an amount of roughness which when used on a surface is able to abrade, smooth, buff, polish, grind and the like. The roughness of the abrasive may vary, depending on the particle sizes of the carbonate composition. In some instances, the particle sizes of the carbonate composition are small (≤0.5 micron) and may be incorporated into non-ingestible products where only a mild abrasive is desired (e.g., bathroom cleaners, baby wipes). In other instances, the particle sizes of the carbonate precipitate are large (≥5 micron) and may be incorporated into non-ingestible products where a strong abrasive is desired (e.g., bath soap, toothpaste). Exemplary non-ingestible products of the invention employing the carbonate composition as an abrasive include toothpaste, shoe polish, mouthwash, facial cleansing soaps, exfoliating products, acne prevention wipes, bath soap, bath wash, makeup remover, baby wipes, diaper rash products, bathroom cleaners, powdered bleach and all purpose cleaners. In some embodiments, the carbonate composition is employed as an abrasive for paint removal, such as in processes employing blasting techniques wherein the abrasive is suspended in a liquid and applied to a painted or coated surface. The carbonate composition may be used as an abrasive for paint removal in cases where the surfaces are delicate, such as lightweight metal and plastic surfaces, in some embodiments of the invention.

In other embodiments, the carbonate composition of the invention may be employed in non-ingestible products as an absorbent. By "absorbent" is meant a compound that possesses the capacity to absorb or soak up liquids (i.e., drying agent). Exemplary non-ingestible products of the invention employing the carbonate composition as an absorbent include eyeshadow, blush, concealer, foundation, face powder, sunscreen, sun-tan lotion, self tanning compositions, bronzers, baby powder, diaper rash products, deodorants and antiperspirants.

In other embodiments, the carbonate composition of the invention may be employed in non-ingestible products as an anticaking agent. By "anticaking agent" is meant a compound that prevents solid compositions from forming large aggregates (i.e., clumps) and facilitates a consistent granular or powdered composition. Exemplary non-ingestible products of the invention employing the carbonate composition as an anticaking agent include baby powder, foundation, face powder, blush, eyeshadow, diaper rash products, concealer, laundry detergent, dishwashing powder, rinse agents, fast-dry agents, room deodorizing powders, bathroom cleaners and powdered bleach.

In other embodiments, the carbonate composition of the invention may be employed in non-ingestible products as a buffering agent. By "buffering agent" is meant a compound that minimizes changes in pH. As such, the carbonate component may act to buffer any acidic or basic components traditionally used in formulations for these products or may be used to maintain a suitable pH during its use. Exemplary non-ingestible products of the invention employing the carbonate composition as a buffering agent include lip gloss, nail polish, sunscreens, sun-tan lotion, baby wipes, acne prevention wipes, acne treatment cream, facial cleansing soap and exfoliating soap, antiperspirants, deodorants, aftershave lotion, bath soap, bath wash, shaving cream, shaving gel, makeup removal, moisturizers, anti-wrinkle creams, anti-drying lotions, anti-itch cream, anti-fungal creams, conditioner, hair spray, hair gel, mouse, hair colorants, depilatory treatments, hair bleach, antiseptic sprays, antibacterial gels, laundry detergent, stain remover, teeth whitening agents, dishwashing liquid, dishwashing powders, dishwashing gels, rinse agents, fast-dry agents, bathroom cleaners and all-purpose cleaners.

In other embodiments, the carbonate composition of the invention may be employed in non-ingestible products as a filler. By "filler" is meant a non-reactive, solid ingredient used to dilute other solids, or to increase the volume of a product. In some instances, the carbonate composition may be used to dilute a potent active ingredient, which may be present in very small amounts, so that the product can be handled more easily. In other instances, the carbonate composition may be used to increase the volume of an expensive ingredient without disturbing the main function of the product. Exemplary non-ingestible products of the invention employing the carbonate composition as a filler include baby powder, foundation, face powder, blush, eyeshadow, diaper rash products, concealer, laundry detergent, dishwashing powder, rinse agents, fast-dry agents, room deodorizing powders, bathroom cleaners and powdered bleach.

In other embodiments, the carbonate composition of the invention may be employed in non-ingestible products as a colorant. By "colorant" is meant a compound that is able to impart a color to a product. Since the carbonate precipitate of the invention is inherently white in color, it is able to improve the white color of already white products, and lighten the color of those products that are not white. Exemplary non-ingestible products of the invention employing the carbonate composition as a filler include eyeshadow, blush, concealer, foundation, face powder, sunscreens, sun-tan lotion, self tanning compositions, bronzers, baby powder, acne treatment cream, facial cleansing soap, exfoliating soap, antiperspirants, deodorants, bath soap, bath wash, shaving cream, moisturizers, anti-wrinkle cream, teeth whitening agents, lotions, anti-inch cream, anti-fungal cream, toothpaste, shampoo, conditioner, hair mousse, hair colorants, laundry detergent, dishwashing powders and room deodorizing products.

In other embodiments, the carbonate composition of the invention may be employed in non-ingestible products as an opacifying agent. By "opacifying agent" is meant a substance that reduces the clear or transparent appearance of a product. The opacity of the non-ingestible product may vary depending on the particle sizes of the carbonate composition. For substantially opaque materials (e.g., anti-wrinkle cream), large particle sizes may be used (≥1 micron). For compositions where a less substantial opacity is desired, small particles may be used (≤0.5 micron). Exemplary non-ingestible products of the invention employing the carbonate composition as an opacifying agent include anti-wrinkle cream, bronzer, sun-tan lotion and self-tanning compositions.

In other embodiments, the carbonate composition of the invention may be employed in non-ingestible products as an oral-care agent. By "oral-care agent" is meant a compound that may be used to polish teeth, reduce oral odor or otherwise cleanse or deodorize the teeth and mouth. In addition to being a mild abrasive for polishing teeth, the carbonate composition, when incorporated in products used for oral hygiene, can buffer acids that facilitate tooth decay and provide a whitening component to oral-care products. Exemplary non-ingestible products of the invention employing the carbonate composition as an oral-care agent include toothpaste, teeth whitening agents and mouthwash.

In other embodiments, the carbonate composition of the invention may be employed in non-ingestible products as a UV-scattering agent. By "UV-scattering agent" is meant a compound that can sufficiently scatter UV light. Depending on the particle sizes of the carbonate precipitate, the amount of UV light (i.e., light having wavelengths ≤380 nm) that is scattered and thus unavailable for absorption may vary. In some instances, the amount of UV light scattered may be 10% or more, including 25% or more, such as 50% or more. In some embodiments of the invention, the carbonate composition may be the only component used to protect against UV radiation. In other embodiments, the carbonate composition may be used in combination with conventional UV absorbing compositions to protect against UV radiation. Exemplary non-ingestible products of the invention employing the carbonate composition as a UV-scattering agent include sunscreen, face powder, blush and foundation.

Food, Vitamins, Nutritional Supplements, Pharmaceuticals and other Ingestible Products In one aspect, there are provided non-cementitious compositions, comprising a carbonate additive, wherein the carbonate additive comprises vaterite, wherein the non-cementitious composition is for ingestible products. In one aspect, there are provided non-cementitious compositions, comprising a carbonate additive, wherein the carbonate additive comprises reactive vaterite, wherein the non-cementitious composition is for ingestible products. In some embodiments, the carbonate additive is a $CO_2$ sequestering additive. As used herein, "ingestible product" includes compositions that are taken orally, even though they may not be digested, where ingestibles are formulated for human consumption. Ingestibles of the invention may include food products, vitamins, nutritional supplements, pharmaceuticals and mineral fortified products. In one aspect, there are provided non-cementitious compositions, comprising a $CO_2$ sequestering additive, wherein the $CO_2$ sequestering additive comprises vaterite, wherein the non-cementitious composition is for an ingestible product. In one aspect, there are provided non-cementitious compositions, comprising a $CO_2$ sequestering additive, wherein the $CO_2$ sequestering additive comprises reactive vaterite, wherein the non-cementitious composition is for an ingestible product. In one aspect, there are provided non-cementitious compositions, comprising a $CO_2$ sequestering additive, wherein the $CO_2$ sequestering additive comprises vaterite wherein the $CO_2$ sequestering additive has a $\delta^{13}C$ of less than $-12‰$, and wherein the non-cementitious composition is for an ingestible product. In one aspect, there are provided non-cementitious compositions, comprising a $CO_2$ sequestering additive, wherein the $CO_2$ sequestering additive comprises reactive vaterite wherein the $CO_2$ sequestering additive has a $\delta^{13}C$ of less than $-12‰$, and wherein the non-cementitious composition is for an ingestible product.

Of interest are novel ingestible formulations which incorporate the carbonate composition provided herein into food products. Food products are any ingestible solids or liquids, usually composed of carbohydrates, fats, water and/or proteins that are consumed for nutrition or pleasure. In certain embodiments, the carbonate composition provided herein may be employed in food products as a buffering agent, filler, anti-caking agent, colorant, emulsifier or stabilizer. Traditional buffering agents, fillers, anti-caking agents, colorants, emulsifiers and stabilizers conventionally found in food products may be substituted entirely or a certain amount removed and replaced by the carbonate compositions provided herein.

In some embodiments, the carbonate composition may be employed in food products as a buffering agent. As described above, the carbonate composition may act to minimize pH changes caused by any acidic or basic components traditionally used in formulations for these products or may be used to maintain a suitable pH for taste. Exemplary food products employing the carbonate composition as a buffering agent include condiments, fat emulsions (e.g., salad dressings) water-based flavored drinks (e.g., energy drinks, sports drinks, electrolyte drinks), soybean products (e.g., soy sauce), processed fruits, canned fruits, processed vegetables, canned vegetables, processed meats, canned meats, beer, wine, cider, malt beverages and canned soups.

In other embodiments, the carbonate composition may be employed in food products as a filler. As described above, a filler is a non-reactive, solid ingredient used to dilute other solids, or to increase the volume of a product. Exemplary food products employing the carbonate composition as a filler include seasonings, dairy-based products, confectionary substances, baby food, baby formula, sweeteners, milk powders, edible casings and milk substitutes.

In other embodiments, the carbonate composition may be employed in food products as an anti-caking agent. As described above, an anti-caking agent is used to prevent solid compositions from forming large aggregates (i.e., clumps) and facilitates a consistent granular or powdered composition. Exemplary food products employing the carbonate composition as an anti-caking agent include milk powders, baby formula, confectionary substances, sweetners and seasonings.

In other embodiments, the carbonate composition may be employed in food products as an emulsifier. By "emulsifier" is meant a substance that forms or maintains a uniform mixture of two or more immiscible phases. In some instances, the carbonate composition can be used to form a mixture of oil and water in food products. Exemplary food products employing the carbonate composition as an emulsifier include fat emulsions (e.g., salad dressings), broths and condiments.

In other embodiments, the carbonate composition may be employed in food products as a colorant. As described above, a colorant is a compound that is able to impart a color to a product. Since the carbonate precipitate provided herein is inherently white in color, it is able to improve the white color of already white products, and lighten the color of those products that are not white. Exemplary food products employing the carbonate composition as a colorant include dairy based products, milk substitutes, milk powder, sweeteners, seasonings, baby formula, dried egg products and confectionary substances.

In other embodiments, the carbonate composition may be employed in food products as a stabilizer. By "stabilizer" is meant a substance that facilitates a uniform dispersion of two or more immiscible substances. Exemplary food products employing the carbonate composition as a stabilizer include dairy based products, canned soups, milk substitutes, liquid whey and condiments.

Also of interest are novel ingestible formulations which incorporate the carbonate composition into vitamins, nutritional supplements and pharmaceuticals. Vitamins, nutritional supplements and pharmaceuticals may include any ingestible solids or liquids that are not food products (as described above) consumed for nutritional or medicinal purposes. In certain embodiments, the carbonate composition may be employed in vitamins, nutritional supplements and pharmaceuticals as buffering agents, fillers, anti-caking agents, colorants, and binders. By "binder" is meant a substance that is used to hold together ingredients of a compressed tablet or cake. Vitamins, nutritional supplements and pharmaceuticals may be in the form or a powder, syrup, liquid, tablet, capsule with powder filling, liquid-gel capsule and the like. Vitamins, nutritional supplements and pharmaceuticals may include, but are not limited to over-the-counter medications, behind-the-counter medications, prescription medications, liquid nutritional drinks, nutritional powders, weight-loss supplementals, multivitamins, nutraceuticals, laxatives, antacids and the like. Traditional buffering agents, fillers, anti-caking agents, colorants and binders conventionally found in vitamins, nutritional supplements and pharmaceuticals may be substituted entirely or a certain amount removed and replaced by the carbonate compositions provided herein.

An exemplary embodiment, depending upon the components in the water and the gaseous stream used to generate the carbonate precipitate (as described in detail below) include preparing the carbonate carbonate precipitate in tablet form for use as a dietary supplement or as an antacid (e.g., calcium supplement). Substantially pure calcium and magnesium carbonate precipitate provided by methods of the invention may be further processed into tablets by any convenient protocol. The carbonate precipitate may also be incorporated into tablets containing multiple dietary supplements (e.g., multivitamin).

In another exemplary embodiment, the carbonate composition of invention may be used for the mineral fortification of food products. By "mineral fortification" is meant the addition of minerals (e.g., calcium, magnesium) to food during production or processing. Food products of the invention may be fortified with minerals by substantially pure carbonate precipitate using any convenient protocol, such as for example mixing the $CO_2$ sequestering composition with the food product. Depending on the type of food product, the amount of carbonate composition added may vary, ranging from 5 mg to 1500 mg, such as 10 mg to 500 mg and including 100 mg to 200 mg. Exemplary food products that may be fortified with carbonate compositions of the invention include, but are not limited to: baked goods (e.g., breads, cookies, biscuits, crackers, waffles, pancakes, cakes); bars (e.g., baked bars, breakfast bars, granola bars, energy bars); beverages (e.g., opaque beverages, both dairy and non-dairy); breakfast cereals; chewing gum; candies (e.g., opaque hard candies, chocolate, nougats, caramels, cream filled); frozen desserts (e.g., ice cream, frozen soy desserts, frozen yogurts); infant formulas; ingredient enrichment (e.g., flour, meals, grains, wheat, corn, rice, oats); liquid meals (e.g., replacement meals, special formulations for diabetic, diet or slimming drinks); milks; pastas (e.g., macaroni, spaghetti, noodles, couscous, ramen, instant noodles); powdered drink mixes (e.g., flavored milks, energy drinks, protein drinks); probiotics; soymilks; tofu; yogurts (e.g., bulk-fermented yogurts, drinkable yogurts, yogurt-based smoothies).

Animal Ingestible Products

In one aspect, there are provided non-cementitious compositions, comprising a carbonate additive, wherein the carbonate additive comprises vaterite, wherein the non-cementitious composition is for an animal ingestible product. In one aspect, there are provided non-cementitious compositions, comprising a carbonate additive, wherein the carbonate additive comprises reactive vaterite, wherein the non-cementitious composition is for animal ingestible product. In some embodiments, the carbonate additive is a $CO_2$ sequestering additive. By "animal ingestible" is meant compositions that are taken orally and are formulated for non-human (e.g., livestock, pets) consumption. In one aspect, there are provided non-cementitious compositions, comprising a $CO_2$ sequestering additive, wherein the $CO_2$ sequestering additive comprises vaterite, wherein the non-cementitious composition is for an animal ingestible product. In one aspect, there are provided non-cementitious compositions, comprising a $CO_2$ sequestering additive, wherein the $CO_2$ sequestering additive comprises reactive vaterite, wherein the non-cementitious composition is for an animal ingestible product. In one aspect, there are provided non-cementitious compositions, comprising a $CO_2$ sequestering additive, wherein the $CO_2$ sequestering additive comprises vaterite wherein the $CO_2$ sequestering additive has a $\delta^{13}C$ of less than −12‰, and wherein the non-cementitious composition is for an animal ingestible product. In one aspect, there are provided non-cementitious compositions, comprising a $CO_2$ sequestering additive, wherein the $CO_2$ sequestering additive comprises reactive vaterite wherein the $CO_2$ sequestering additive has a $\delta^{13}C$ of less than −12‰, and wherein the non-cementitious composition is for an animal ingestible product Animal Ingestible products of the invention may include but are not limited to animal food products, vitamins, nutritional supplements and pharmaceuticals for animal consumption. Of interest are novel animal-ingestible product formulations which employ the carbonate composition of the invention as buffering agents, fillers, anti-caking agents, colorants, emulsifiers, stabilizers and binders into food products, vitamins, nutritional supplements and pharmaceuticals formulated for animal consumption. Traditional buffering agents, fillers, anti-caking agents, colorants, emulsifiers, stabilizers and binders conventionally found in animal-ingesitble products may be substituted entirely or a certain amount removed and replaced by the carbonate compositions of the present invention.

Agricultural Products

In one aspect, there are provided non-cementitious compositions, comprising a carbonate additive, wherein the carbonate additive comprises vaterite, wherein the non-cementitious composition is for agricultural products. In one aspect, there are provided non-cementitious compositions, comprising a carbonate additive, wherein the carbonate additive comprises reactive vaterite, wherein the non-cementitious composition is for agricultural products. In some embodiments, the carbonate additive is a $CO_2$ sequestering additive. In one aspect, there are provided non-cementitious compositions, comprising a $CO_2$ sequestering additive, wherein the $CO_2$ sequestering additive comprises vaterite, wherein the non-cementitious composition is for agricultural product. In one aspect, there are provided non-cementitious compositions, comprising a $CO_2$ sequestering additive, wherein the $CO_2$ sequestering additive comprises reactive vaterite, wherein the non-cementitious composition is for agricultural product. In one aspect, there are provided non-cementitious compositions, comprising a $CO_2$ sequestering additive, wherein the $CO_2$ sequestering additive comprises vaterite wherein the $CO_2$ sequestering additive has a $\delta^{13}C$ of less than −12‰, and wherein the non-cementitious composition is for agricultural product. In one aspect, there are provided non-cementitious compositions, comprising a $CO_2$ sequestering additive, wherein the $CO_2$ sequestering additive comprises reactive vaterite wherein the $CO_2$ sequestering additive has a $\delta^{13}C$ of less than −12‰, and wherein the non-cementitious composition is for agricultural product.

By "agricultural products" is meant any composition that is employed in cultivating land, raising crops or vegetation, farming, and feeding, breeding, and raising livestock or any other activity associated therewith. Agricultural products of the invention may be soil amendment compositions (e.g., fertilizer, remediation), pest control (fungicides, insecticides) or nutritional and/or medicinal ingestible compositions for livestock (as detailed above). The carbonate composition of the invention may be added to traditional agricultural products as a supplement or entirely replace conventionally used agricultural products.

In some embodiments, the carbonate composition of the invention is a soil amendment. The "soil amendment" includes a composition that aims to improve or remediate the desired properties of soil for agricultural usage. In some instances the soil amendment is a fertilizer to supply nutrients (e.g., calcium, magnesium) to the soil. In other instances, the soil amendment is a buffering agent to reduce changes to the pH of the soil. The carbonate composition of the invention may be contacted with the soil in the form of slurry or a powder. The carbonate precipitate is either mixed with water prior to being dispensed onto the surface of the soil or is dispensed as a dry powder. Contacting the composition with the soil may be achieved using any convenient protocol. It may be gravity fed or pumped through hoses, spray nozzles or fixed sprayers to uniformly apply the composition. In other instances, the soil stabilization compositions of the invention may be poured from a reservoir or applied manually without the use of any industrial machinery. The composition may also be applied by releasing the composition at a depth within the soil by pumping the composition beneath the surface of the soil to be treated or by digging to a depth in the soil using conventional digging machinery and further applying the composition. The composition is then mixed into the soil. In any of the various treatments within the scope of the present invention, the soil may be mixed in situ or may be temporarily removed from the ground for mixing and then replaced. Mixing the soil with the carbonate composition may be accomplished using any convenient mixing equipment (e.g., rotary mixers, etc.). The prepared carbonate composition and soil mixture is then rotated and the entire mixture is blended in a uniform manner.

In other embodiments, the carbonate composition of the invention may be incorporated into pesticides. The term "pesticide" is used in its conventional sense to mean any compound that is used to eliminate, control or inhibit the proliferation of any organism which has characteristics that are regarded as injurious or unwanted. Pesticides of the invention may include those formulations used against insects, fungi, bacteria, rodents and the like. The carbonate composition may be employed in pesticides to improve the pesticide action or to aid in the application of the pesticide. For example, the carbonate composition may be employed as a water absorbent or as a granulating agent. In other instances, the composition may be employed as a crop-dusting filler to facilitate the uniform distribution of the pesticide on vegetation or crops. Pesticides of the invention may be prepared using any conventional protocol with the exception that an amount of the carbonate composition is added. The amount of carbonate additive in the pesticide may vary, and may be 1% by weight or more, such as 3% by weight or more, including 5% by weight or more, such as 25% by weight or more. The carbonate composition may be incorporated into the pesticides during the formulation of the pesticide or may be subsequently added to the finished pesticide product. Incorporation of the composition into the pesticide may be accomplished by mixing the composition with the pesticide and rotating the mixture under agitation, vortex or sonication and blending into a uniform pesticide product.

Environmental Remediation

In one aspect, there are provided non-cementitious compositions, comprising a carbonate additive, wherein the carbonate additive comprises vaterite, wherein the non-cementitious composition is for environmental remediation. In one aspect, there are provided non-cementitious compositions, comprising a carbonate additive, wherein the carbonate additive comprises reactive vaterite, wherein the non-cementitious composition is for environmental remediation. In some embodiments, the carbonate additive is a $CO_2$ sequestering additive. The "environmental remediation" includes the removal of pollution or contaminants from environmental media such as soil, groundwater, sediment or water for the general protection of human health and the environment. In one aspect, there are provided non-cementitious compositions, comprising a $CO_2$ sequestering additive, wherein the $CO_2$ sequestering additive comprises vaterite, wherein the non-cementitious composition is for environmental remediation. In one aspect, there are provided non-cementitious compositions, comprising a $CO_2$ sequestering additive, wherein the $CO_2$ sequestering additive comprises reactive vaterite, wherein the non-cementitious composition is for environmental remediation. In one aspect, there are provided non-cementitious compositions, comprising a $CO_2$ sequestering additive, wherein the $CO_2$ sequestering additive comprises vaterite wherein the $CO_2$ sequestering additive has a $\delta^{13}C$ of less than −12‰, and wherein the non-cementitious composition is for environmental remediation. In one aspect, there are provided non-cementitious compositions, comprising a $CO_2$ sequestering additive, wherein the $CO_2$ sequestering additive comprises reactive vaterite wherein the $CO_2$ sequestering additive has a $\delta^{13}C$ of less than −12‰, and wherein the non-cementitious composition is for environmental remediation.

In some embodiments, environmental remediation employing the carbonate composition of the invention is forest soil restoration. The application of the carbonate composition may be employed in forest soil restoration for neutralizing acidic soil, improving the calcium and magnesium content in soil, increasing the biological activity of organically influenced soil horizons, intensifying the nitrification process in the soil or stabilizing metal organic complexes in order to decrease or prevent heavy-metal pollution. The carbonate composition of the invention may be contacted with the forest soil using any convenient protocol (as discussed above). It may be applied using devices that are gravity fed or it can be pumped through hoses, spray nozzles or fixed sprayers. The composition may also be poured from a reservoir or applied manually without the use of any industrial machinery. In some instances, the carbonate composition may be dispensed from a helicopter or crop-dusting airplane.

In other embodiments, environmental remediation employing the carbonate composition of the invention is the neutralization of over-acidified water. By "acidified water" is meant a large body of water (e.g., pond, lake) that has a pH below 6.5 under ambient conditions and is often lower, such as 6.0 and including 5.0. The carbonate composition can be applied by any convenient protocol. In some instances, the composition is applied as a slurry or as a finely ground powder. Slurries are typically sprayed onto the water surface from boats or from stations located on the water, whereas powder is dispensed by helicopter or fixed-wing planes. The application of the carbonate composition may cause increases in pH that vary ranging from 1 to 4, including 2 to 4, such as 2.5 to 3.5. The amount of the carbonate composition applied to the acidified water may vary considerably (depending on the size and location of the body of water and the pH of the water) ranging from 0.1 kg to 100 kg or more, such as 1000 kg or more, including 10,000 kg or more.

II. Methods

Aspects of the invention include methods of preparing carbonate compositions and non-cementitious compositions from the carbonate compositions. In some embodiments, the carbonate compositions may be prepared by producing a carbonate additive or the $CO_2$ sequestering additive. In one aspect, there is provided a method of producing a non-cementitious composition, the method comprising producing a carbonate additive, wherein the carbonate additive comprises vaterite; and producing a non-cementitious composition comprising the carbonate additive. In one aspect, there is provided a method of producing a non-cementitious composition, the method comprising producing a carbonate additive, wherein the carbonate additive comprises reactive vaterite; and producing a non-cementitious composition comprising the carbonate additive. In some embodiments, the method further comprises adding a non-cementitious additive to the carbonate additive to form the non-cementitious composition. In some embodiments, the method further comprises producing the carbonate additive by sequestering $CO_2$ to form the carbonate additive. The "carbonate compositions, "carbonate additive" and "$CO_2$ sequestering additive", are used interchangeably herein.

In one aspect, there is provided a method for producing a non-cementitious product, the method comprising a) producing a carbonate additive, wherein the carbonate additive comprises reactive vaterite; b) mixing the carbonate additive with a non-cementitious additive; and c) producing a non-cementitious product. In some embodiments, there is provide a method for producing a non-cementitious product, the method comprising a) contacting $CO_2$ from a $CO_2$ source with a proton removing agent to form a solution; b) contacting the solution with water comprising alkaline earth-metal ions under one or more precipitation conditions to make the carbonate additive comprising reactive vaterite; c) mixing the carbonate additive with a non-cementitious additive; and d) producing a non-cementitious product.

In some embodiments, the method to produce the carbonate additive or the $CO_2$ sequestering additive comprises carbonation such as absorbing carbon dioxide in an alkaline solution to form a solution comprising bicarbonate ions, carbonate ions, or combination thereof; and treating the solution with divalent cations comprising calcium, magnesium, or combination thereof under one or more precipitation conditions to form carbonate additive comprising vaterite such as reactive vaterite. The precipitation conditions have been described herein. In some embodiments, carbide lime provides both a source of proton removing agent and a source of divalent cations to form the carbonate additive described herein.

In some embodiments of the foregoing aspect and embodiment, the step a) and step b) are conducted at the same time and the carbonate additive comprising reactive vaterite is formed in situ. In some embodiments of the foregoing aspect and embodiments, the non-cementitious additive is pulp and the carbonate additive comprising reactive vaterite is transformed to aragonite in situ to form paper product. In some embodiments, there is provided a method for producing a paper product, the method comprising a) contacting $CO_2$ with a solution comprising proton removing agent, alkaline earth-metal ions, and pulp under one or more precipitation conditions to make the carbonate additive comprising reactive vaterite in situ; b) transforming the reactive vaterite to aragonite in situ, and c) forming a paper product.

In some embodiments, there is provided a method for producing a non-cementitious product comprising a) producing a carbonate additive comprising calcining limestone to form calcium oxide, forming hydrated lime from the calcium oxide, and treating the hydrated lime with $CO_2$ to form the carbonate additive comprising reactive vaterite, and b) mixing the carbonate additive with a non-cementitious additive to form the non-cementitious product. In some embodiments, the foregoing method of producing the carbonate additive is a traditional PCC manufacturing process except that the carbonate additive formed comprises reactive vaterite.

Figure 2:
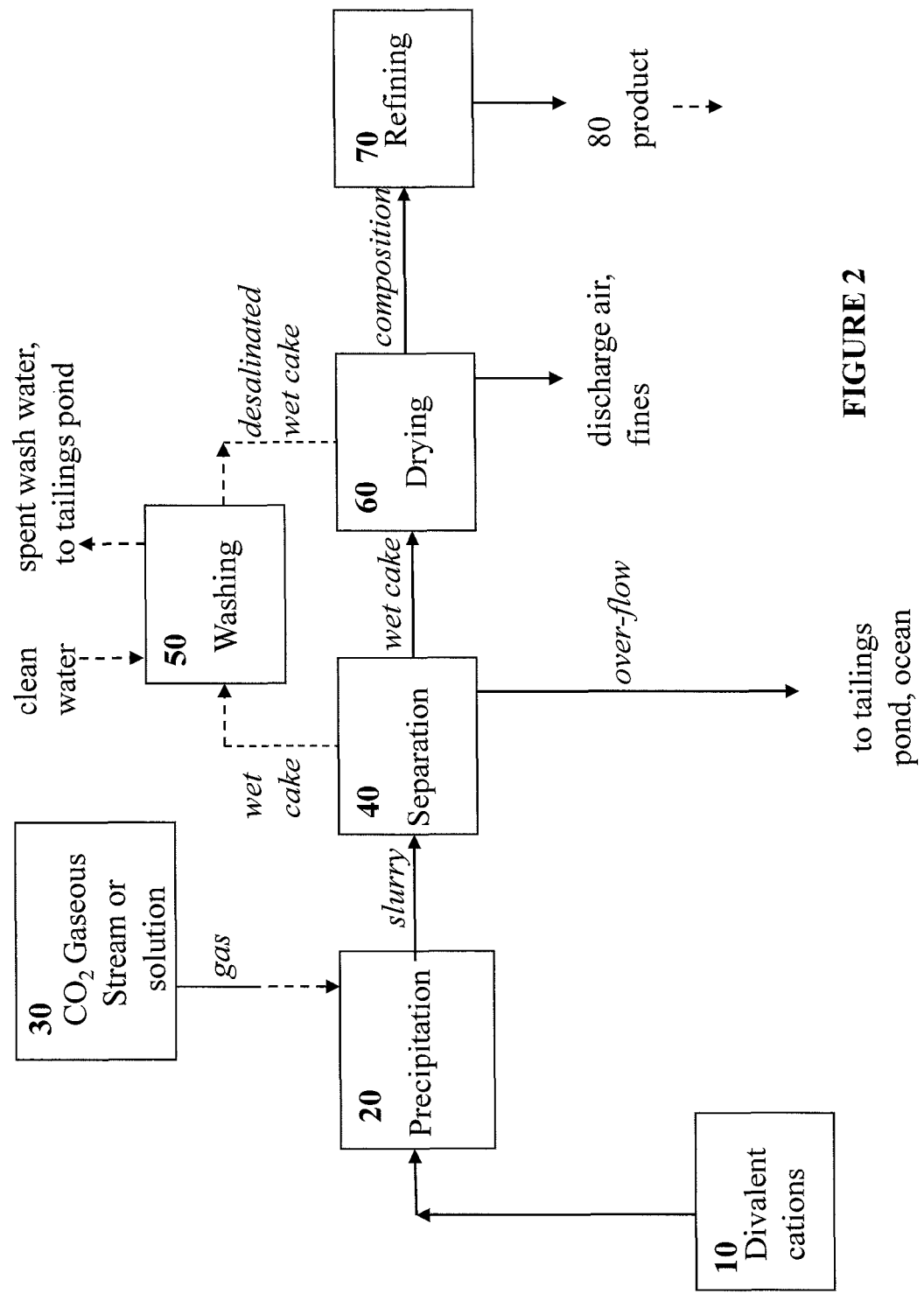
FIG. 2 illustrates a schematic of a carbonate additive production process according to some embodiments of the invention.

In some embodiments, the methods and systems of the invention include a source of aqueous medium, a source of carbon dioxide, a source of proton removing agent, and a source of divalent cations. Such components have been described herein. FIG. 2 illustrates a schematic flow diagram of a process for producing a carbonate additive according to some embodiments provided herein.

Carbon Dioxide

In some embodiments, as depicted in FIG. 2, an aqueous medium such as water with a proton removing agent, is charged with $CO_2$ to produce $CO_2$ charged solution 30, which $CO_2$ charged solution is then subjected to carbonate compound precipitation conditions. In some embodiments, the $CO_2$ is contacted with carbide lime solution wherein the carbide lime solution provides both the proton removing agent and the calcium ions, as described herein below. In such embodiments, the carbonate additive is formed. As depicted in FIG. 2, a $CO_2$ gaseous stream 30 is contacted with the aqueous medium to produce a $CO_2$ charged water. By $CO_2$ charged water is meant water that has had $CO_2$ gas contacted with it, where $CO_2$ molecules have combined with water molecules to produce, e.g., carbonic acid, bicarbonate and/or carbonate ion. In embodiments, where divalent cations, such as calcium and/or magnesium ions, are present in the aqueous medium such as hydrated lime or carbide lime, the calcium and/or magnesium carbonate and/or bicarbonate ions are formed in the $CO_2$ charged water. Charging water in this step results in an increase in the $CO_2$ content of the water, e.g., in the form of carbonic acid, bicarbonate and/or carbonate ion, and a concomitant decrease in the $pCO_2$ of the waste stream that is contacted with the water. The $CO_2$ charged water may be acidic, having a pH of 6 or less, such as 5 or less and including 4 or less. In certain embodiments, the concentration of $CO_2$ of the gas that is used to charge the water is 10% or higher, 25% or higher, including 50% or higher, such as 75% or even higher.

The $CO_2$ source may be a liquid, solid (e.g., dry ice) or gaseous $CO_2$ source. In certain embodiments, the $CO_2$ source is a gaseous $CO_2$ source. This gaseous $CO_2$ is, in certain instances, a waste stream or product from an industrial plant. The nature of the industrial plant may vary in these embodiments, where industrial plants of interest includes, but is not limited to, power plants (e.g., as described in further detail in International Application No. PCT/US08/88318, titled, "Method of sequestering $CO_2$," filed 24 Dec. 2008, the disclosure of which is herein incorporated by reference), chemical processing plants, steel mills, paper mills, cement plants (e.g., as described in further detail in U.S. Provisional Application Ser. No. 61/088,340, the disclosure of which is herein incorporated by reference), and other industrial plants that produce $CO_2$ as a byproduct. By waste stream is meant a stream of gas (or analogous stream) that is produced as a byproduct of an active process of the industrial plant. The gaseous stream may be substantially pure $CO_2$ or a multi-component gaseous stream that includes $CO_2$ and one or more additional gases. Multi-component gaseous streams (containing $CO_2$) that may be employed as a $CO_2$ source in embodiments of the subject methods include both reducing, e.g., syngas, shifted syngas, natural gas, and hydrogen and the like, and oxidizing condition streams, e.g., flue gases from combustion. Exhaust gases containing NOx, SOx, VOCs, particulates and Hg would incorporate these compounds along with the carbonate in the precipitated product. Particular multi-component gaseous streams of interest that may be treated according to the subject invention include, but are not limited to, oxygen containing combustion power plant flue gas, turbo charged boiler product gas, coal gasification product gas, shifted coal gasification product gas, anaerobic digester product gas, wellhead natural gas stream, reformed natural gas or methane hydrates, and the like.

Thus, the waste streams may be produced from a variety of different types of industrial plants. Suitable waste streams for the invention include waste streams, such as, flue gas, produced by industrial plants that combust fossil fuels (e.g., coal, oil, natural gas) or anthropogenic fuel products of naturally occurring organic fuel deposits (e.g., tar sands, heavy oil, oil shale, etc.). In some embodiments, a waste stream suitable for systems and methods of the invention is sourced from a coal-fired power plant, such as a pulverized coal power plant, a supercritical coal power plant, a mass burn coal power plant, a fluidized bed coal power plant. In some embodiments, the waste stream is sourced from gas or oil-fired boiler and steam turbine power plants, gas or oil-fired boiler simple cycle gas turbine power plants, or gas or oil-fired boiler combined cycle gas turbine power plants. In some embodiments, waste streams produced by power plants that combust syngas (i.e., gas that is produced by the gasification of organic matter, for example, coal, biomass, etc.) are used. In some embodiments, waste streams from integrated gasification combined cycle (IGCC) plants are used. In some embodiments, waste streams produced by Heat Recovery Steam Generator (HRSG) plants are used to produce compositions in accordance with systems and methods of the invention.

Waste streams produced by cement plants are also suitable for systems and methods of the invention. Cement plant waste streams include waste streams from both wet process and dry process plants, which plants may employ shaft kilns or rotary kilns, and may include pre-calciners. These industrial plants may each burn a single fuel, or may burn two or more fuels sequentially or simultaneously.

Contact protocols for absorbing $CO_2$, include, but are not limited to: direct contacting protocols, e.g., bubbling the gas through the volume of water, concurrent contacting means, i.e., contact between unidirectionally flowing gaseous and liquid phase streams, countercurrent means, i.e., contact between oppositely flowing gaseous and liquid phase streams, and the like. Thus, contact may be accomplished through use of infusers, bubblers, fluidic Venturi reactor, sparger, gas filter, spray, tray, or packed column reactors, and the like, as may be convenient.

A variety of different methods may be employed to prepare the carbonate additive of the compositions of the invention. $CO_2$ sequestration protocols of interest include, but are not limited to, those disclosed in U.S. patent application Ser. Nos. 12/126,776, titled, "Hydraulic cements comprising carbonate compound compositions," filed 23 May 2008; the disclosures of which is herein incorporated by reference in its entirety.

In some embodiments, the method to make the carbonate additive comprising vaterite includes optimizing the traditional PCC process such that the calcium carbonate containing vaterite polymorph is formed. Some examples of the methods to produce the carbonate additive comprising vaterite, are described herein.

In some embodiments, the water from salt water source or the divalent cations such as, alkaline earth-metal containing water such as hydrated lime or carbide lime is contacted with a solution charged with the partially or fully dissolved $CO_2$, which $CO_2$ solution is then subjected to one or more carbonate compound precipitation conditions. In such embodiments, the hydrated lime or the carbide lime also provides proton removing agents or alkalinity sufficient to precipitate calcium and/or magnesium carbonates. In some embodiments, there are provided methods to produce the carbonate additive comprises producing carbonate additive by carbonation of hydrated lime under precipitation conditions such that vaterite containing carbonate additive is formed. The precipitation conditions have been described herein.

In some embodiments a non-cementitious additive may be added along with the divalent cations or may be added in the carbide lime solution along with the contacting of the $CO_2$ or the $CO_2$ charged solution such that the carbonate additive containing reactive vaterite is formed in situ. Further, the reactive vaterite may also transform in situ to aragonite resulting in the non-cementitious product. For example, the carbide lime solution may be mixed with pulp and $CO_2$ may be passed through the solution such that the carbonate additive containing the reactive vaterite is formed in situ. The reactive vaterite may subsequently transform to aragonite in situ and set and harden to form paper product.

In some embodiments, the method to produce the carbonate additive comprises producing carbonate additive by carbonation of carbide lime under precipitation conditions such that vaterite containing carbonate additive is formed. The precipitation conditions have been described herein. Carbide lime includes calcium hydroxide which may or may not include calcium oxide and further includes other impurities commonly found in carbide lime. Other synonyms of carbide lime include carbide sludge, generator slurry, lime slurry, lime sludge, lime hydrate, calcium hydrate, hydrated lime, lime water, and slaked lime. Carbide lime is a hydrated lime slurry which may be produced as a by-product of the generation of acetylene gas according to the following formula:

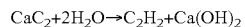

$$CaC_2 + 2H_2O \rightarrow C_2H_2 + Ca(OH)_2$$

The use of carbide lime to form vaterite containing precipitate has been described in detail in U.S. Provisional Patent Application No. 61/617,243, filed 29 Mar. 2012, titled "Methods and Systems for Utilizing Carbide Lime," which is incorporated herein by reference in its entirety. Such use of carbide lime to form calcium carbonate is also described in application with Attorney docket number CLRA-081, filed on even date herewith, which is incorporated herein by reference in its entirety.

In some embodiments, the solution charged with the partially or fully dissolved $CO_2$ is made by parging or diffusing the $CO_2$ gaseous stream through a solution to make a $CO_2$ charged water. In some embodiments, the solution with $CO_2$ includes a proton removing agent or a pH raising agent. In some embodiments, the $CO_2$ gas is bubbled or parged through a solution containing a proton removing agent, such as sodium or potassium hydroxide or sodium or potassium carbonate, in an absorber. In some embodiments, the absorber may include a bubble chamber where the $CO_2$ gas is bubbled through the solution containing the proton removing agent. In some embodiments, the absorber may include a spray tower where the solution containing the proton removing agent is sprayed or circulated through the $CO_2$ gas. In some embodiments, the absorber may include a pack bed to increase the surface area of contact between the $CO_2$ gas and the solution containing the proton removing agent. In some embodiments, a typical absorber fluid temperature is 32-37° C. The absorber for absorbing $CO_2$ in the solution is described in U.S. application Ser. No. 12/721,549, filed on Mar. 10, 2010, which is incorporated herein by reference in its entirety. The $CO_2$ charged water may be then contacted with the divalent cation i.e. alkaline earth metal containing water to form the carbonate additive.

Proton Removing Agent

In order to produce carbonate additive, protons are removed from various species (e.g. carbonic acid, bicarbonate, hydronium, etc.) in the solution to shift the equilibrium towards carbonate. The terms "source of alkalinity" or "proton removing agents" or "pH raising agent," or "base," are used interchangeably herein. As protons are removed, more $CO_2$ goes into solution. In some embodiments, proton-removing agents and/or methods are used while contacting a divalent cation-containing aqueous solution with $CO_2$ to increase $CO_2$ absorption in one phase of the precipitation reaction, wherein the pH may remain constant, increase, or even decrease, followed by a rapid removal of protons (e.g., by addition of a base) to cause rapid precipitation of carbonate-containing precipitation material. Protons may be removed from the various species (e.g. carbonic acid, bicarbonate, hydronium, etc.) by any suitable approach, including, but not limited to, use of naturally occurring proton-removing agents, use of microorganisms and fungi, use of synthetic chemical proton-removing agents, recovery of man-made waste streams, and using electrochemical means.

In some embodiments, the hydrated lime or the carbide lime that is being used as a source of divalent cations also acts as a source of proton removing agents due to the presence of $Ca(OH)_2$.

The pH of the water or the solution absorbing carbon dioxide may be raised using any convenient approach. In certain embodiments, a pH raising agent may be employed, where examples of such agents include oxides, hydroxides (e.g., calcium oxide in fly ash, potassium hydroxide, sodium hydroxide, brucite ($Mg(OH)_2$), etc.), carbonates (e.g., sodium carbonate) and the like. In some embodiments, the proton removing agent is coal ash from a coal-fired power plant, which contains many oxides, to elevate the pH of the water. Other coal processes, like the gasification of coal, to produce syngas, also produce hydrogen gas and carbon monoxide, and may serve as a source of hydroxide as well. Some naturally occurring minerals, such as serpentine, contain hydroxide and can be dissolved yielding a hydroxide source. The addition of serpentine, also releases silica and magnesium into the solution, leading to the formation of silica containing carbonate compounds. The amount of pH elevating agent that is added to the water may depend on the particular nature of the agent and the volume of water being modified, and may be sufficient to raise the pH of the water to the desired value. Alternatively, the pH of the water source can be raised to the desired level by electrolysis of water. Where electrolysis is employed, a variety of different protocols may be taken, such as use of the Mercury cell process (also called the Castner-Kellner process); the Diaphragm cell process and the membrane cell process.

Naturally occurring proton-removing agents encompass any proton-removing agents that can be found in the wider environment that may create or have a basic local environment. Some embodiments provide for naturally occurring proton-removing agents including minerals that create basic environments upon addition to solution. Such minerals include, but are not limited to, lime (CaO); periclase (MgO); iron hydroxide minerals (e.g., goethite and limonite); and volcanic ash. Methods for digestion of such minerals and rocks comprising such minerals are provided herein. Some embodiments provide for using naturally alkaline bodies of water as naturally occurring proton-removing agents. Examples of naturally alkaline bodies of water include, but are not limited to surface water sources (e.g. alkaline lakes such as Mono Lake in California) and ground water sources (e.g. basic aquifers such as the deep geologic alkaline aquifers located at Searles Lake in California). Other embodiments provide for use of deposits from dried alkaline bodies of water such as the crust along Lake Natron in Africa's Great Rift Valley. In some embodiments, organisms that excrete basic molecules or solutions in their normal metabolism are used as proton-removing agents. Examples of such organisms are fungi that produce alkaline protease (e.g., the deep-sea fungus Aspergillus ustus with an optimal pH of 9) and bacteria that create alkaline molecules (e.g., cyanobacteria such as *Lyngbya* sp. from the Atlin wetland in British Columbia, which increases pH from a byproduct of photosynthesis). In some embodiments, organisms are used to produce proton-removing agents, wherein the organisms (e.g., *Bacillus pasteurii*, which hydrolyzes urea to ammonia) metabolize a contaminant (e.g. urea) to produce proton-removing agents or solutions comprising proton-removing agents (e.g., ammonia, ammonium hydroxide). In some embodiments, organisms are cultured separately from the precipitation reaction mixture, wherein proton-removing agents or solution comprising proton-removing agents are used for addition to the precipitation reaction mixture. In some embodiments, naturally occurring or manufactured enzymes are used in combination with proton-removing agents to invoke precipitation of the carbonate additive. Carbonic anhydrase, which is an enzyme produced by plants and animals, accelerates transformation of carbonic acid to bicarbonate in aqueous solution.

Chemical agents for effecting proton removal generally refer to synthetic chemical agents that are produced in large quantities and are commercially available. For example, chemical agents for removing protons include, but are not limited to, hydroxides, organic bases, super bases, oxides, ammonia, and carbonates. Hydroxides include chemical species that provide hydroxide anions in solution, including, for example, sodium hydroxide (NaOH), potassium hydroxide (KOH), calcium hydroxide ($Ca(OH)_2$), or magnesium hydroxide ($Mg(OH)_2$). Organic bases are carbon-containing molecules that are generally nitrogenous bases including primary amines such as methyl amine, secondary amines such as diisopropylamine, tertiary such as diisopropylethylamine, aromatic amines such as aniline, heteroaromatics such as pyridine, imidazole, and benzimidazole, and various forms thereof. In some embodiments, an organic base selected from pyridine, methylamine, imidazole, benzimidazole, histidine, and a phophazene is used to remove protons from various species (e.g., carbonic acid, bicarbonate, hydronium, etc.) for precipitation of the carbonate additive. In some embodiments, ammonia is used to raise pH to a level sufficient to precipitate precipitation material from a solution of divalent cations and an industrial waste stream. Super bases suitable for use as proton-removing agents include sodium ethoxide, sodium amide ($NaNH_2$), sodium hydride (NaH), butyl lithium, lithium diisopropylamide, lithium diethylamide, and lithium bis(trimethylsilyl)amide. Oxides including, for example, calcium oxide (CaO), magnesium oxide (MgO), strontium oxide (SrO), beryllium oxide (BeO), and barium oxide (BaO) are also suitable proton-removing agents that may be used. Carbonates for use in the invention include, but are not limited to, sodium carbonate.

In addition to comprising cations of interest and other suitable metal forms, waste streams from various industrial processes may provide proton-removing agents. Such waste streams include, but are not limited to, mining wastes; fossil fuel burning ash (e.g., combustion ash such as fly ash, bottom ash, boiler slag); slag (e.g. iron slag, phosphorous slag); cement kiln waste; oil refinery/petrochemical refinery waste (e.g. oil field and methane seam brines); coal seam wastes (e.g. gas production brines and coal seam brine); paper processing waste; water softening waste brine (e.g., ion exchange effluent); silicon processing wastes; agricultural waste; metal finishing waste; high pH textile waste; and caustic sludge. Mining wastes include any wastes from the extration of metal or another precious or useful mineral from the earth. In some embodiments, wastes from mining are used to modify pH, wherein the waste is selected from red mud from the Bayer aluminum extraction process; waste from magnesium extraction from sea water (e.g., $Mg(OH)_2$ such as that found in Moss Landing, Calif.); and wastes from mining processes involving leaching. For example, red mud may be used to modify pH. Fossil fuel burning ash, cement kiln dust, and slag, collectively waste sources of metal oxides, may be used in alone or in combination with other proton-removing agents to provide proton-removing agents for the invention. Agricultural waste, either through animal waste or excessive fertilizer use, may contain potassium hydroxide (KOH) or ammonia ($NH_3$) or both. As such, agricultural waste may be used in some embodiments of the invention as a proton-removing agent. This agricultural waste is often collected in ponds, but it may also percolate down into aquifers, where it can be accessed and used.

Electrochemical methods are another means to remove protons from various species in a solution, either by removing protons from solute (e.g., deprotonation of carbonic acid or bicarbonate) or from solvent (e.g., deprotonation of hydronium or water). Deprotonation of solvent may result, for example, if proton production from $CO_2$ dissolution matches or exceeds electrochemical proton removal from solute molecules. In some embodiments, low-voltage electrochemical methods are used to remove protons, for example, as $CO_2$ is dissolved in the precipitation reaction mixture or a precursor solution to the precipitation reaction mixture (i.e., a solution that may or may not contain divalent cations). In some embodiments, $CO_2$ dissolved in an aqueous solution that does not contain divalent cations is treated by a low-voltage electrochemical method to remove protons from carbonic acid, bicarbonate, hydronium, or any species or combination thereof resulting from the dissolution of $CO_2$. A low-voltage electrochemical method operates at an average voltage of 2, 1.9, 1.8, 1.7, or 1.6 V or less, such as 1.5, 1.4, 1.3, 1.2, 1.1V or less, such as 1V or less, such as 0.9 V or less, 0.8 V or less, 0.7 V or less, 0.6 V or less, 0.5 V or less, 0.4 V or less, 0.3 V or less, 0.2 V or less, or 0.1V or less. Low-voltage electrochemical methods that do not generate chlorine gas are convenient for use in systems and methods of the invention. Low-voltage electrochemical methods to remove protons that do not generate oxygen gas are also convenient for use in systems and methods of the invention. In some embodiments, low-voltage electrochemical methods generate hydrogen gas at the cathode and transport it to the anode where the hydrogen gas is converted to protons. Electrochemical methods that do not generate hydrogen gas may also be convenient. In some embodiments, electrochemical processes to remove protons do not generate a gas at the anode. In some instances, electrochemical methods to remove protons do not generate any gaseous by-byproduct. Electrochemical methods for effecting proton removal are further described in U.S. patent application Ser. No. 12/344,019, titled, "Methods of sequestering $CO_2$," filed 24 Dec. 2008, which is incorporated herein by reference in its entirety.

Low voltage electrochemical processes may produce hydroxide at the cathode and protons at the anode; where such processes utilize a salt containing chloride, e.g. NaCl, a product of the process will be HCl. In some embodiments of the invention, the HCL from a low-voltage electrochemical process as described herein may be used to make poly(vinyl chloride) (PVC). HCl from a low-voltage electrochemical process, e.g. a process that operates at a voltage of less than 2.0V, or less than 1.5V, or less than 1.0V, may be used in reactions well-known in the art to produce a vinyl chloride monomer. The vinyl chloride monomer may be used to produce poly(vinyl chloride) in some embodiments. In further embodiments, the PVC can be mixed with a carbonate precipitate formed by the methods described herein, e.g. a slightly wet carbonate precipitate, to form a building material. In some embodiments, the PVC/carbonate mixture may be extruded to form a slightly foamed profile, such as, e.g. a 2×4 or other lumber material.

Carbonate/PVC lumber formed by such methods is thus encompassed by the invention. Such lumber may be $CO_2$-sequestering because the carbonate in the lumber is a $CO_2$-sequestering additive. In some embodiments, the amount of $CO_2$ sequestering additive in the formed element comprising PVC is 5 wt % or more. In some embodiments, the amount of $CO_2$ sequestering additive in the formed element comprising PVC is 10 wt % or more, 15 wt % or more, 20 wt % or more, 25 wt % or more, 30 wt % or more, 35 wt % or more, such as 40 wt % or more, 45 wt % or more, 50 wt %, 55 wt % or more, 60 wt % or more, such as up to 65 wt % or more. In some embodiments, the amount of $CO_2$ sequestering additive in the formed element comprising PVC is 60 wt % or more. In some embodiments, the PVC and $CO_2$ sequestering additive are mixed and formed in a screw extruder. In some embodiments, the formed element is injection molded. In some embodiments, the PVC is foamed to create a cellular structure that will hold anchoring devices such as nails and screws. In some embodiments, the formed element comprising PVC and $CO_2$ sequestering additive is used to fabricate building elements that are flame resistant. In some embodiments, the formed element comprising PVC and $CO_2$ sequestering additive is such that the amount of $CO_2$ sequestering additive increases the finishability, i.e. ease of cutting and sanding, of the formed element. In some embodiments, the formed element comprising PVC and $CO_2$ sequestering additive is such that the amount of $CO_2$ sequestering additive enhances the coloring or appearance of the formed element. In some embodiments, the formed element comprising PVC and $CO_2$ sequestering additive is such that the amount of $CO_2$ sequestering additive gives stiffness to the formed element. In some embodiments, the $CO_2$ sequestering additive is added to the PVC during the production of the PVC. In some such embodiments, the PVC can be derived from the $CO_2$ sequestering methods of the invention.

Alternatively, electrochemical methods may be used to produce caustic molecules (e.g., hydroxide) through, for example, the chlor-alkali process, or modification thereof. Electrodes (i.e., cathodes and anodes) may be present in the apparatus containing the divalent cation-containing aqueous solution or gaseous waste stream-charged (e.g., $CO_2$-charged) solution, and a selective barrier, such as a membrane, may separate the electrodes. Electrochemical systems and methods for removing protons may produce by-products (e.g., hydrogen) that may be harvested and used for other purposes. Additional electrochemical approaches that may be used in systems and methods of the invention include, but are not limited to, those described in U.S. patent application Ser. No. 12/503,557, titled, "$CO_2$ Utilization in Electrochemical Systems," filed 15 Jul. 2009, the disclosures of which is herein incorporated by reference.

Combinations of the above mentioned sources of proton removal may be employed. One such combination is the use of a microorganisms and electrochemical systems. Combinations of microorganisms and electrochemical systems include microbial electrolysis cells, including microbial fuel cells, and bio-electrochemically assisted microbial reactors. In such microbial electrochemical systems, microorganisms (e.g. bacteria) are grown on or very near an electrode and in the course of the metabolism of material (e.g. organic material) electrons are generated that are taken up by the electrode.

Divalent Cations, Such as, Alkaline Earth Metals

In some embodiments, an order for the addition of the $CO_2$ or the $CO_2$ charged water and the alkaline earth metal containing water to the reactor for the precipitation, may be varied. In some embodiments, the $CO_2$ gaseous stream or the solution containing the partially or fully dissolved $CO_2$ or the affluent from the absorber containing an alkaline solution of $CO_2$ is added to the reactor containing the alkaline earth-metal containing water for precipitation of the carbonate precipitate in the precipitation step 20. In some embodiments, the alkaline earth-metal containing water is added to the reactor containing the $CO_2$ gaseous stream or the solution containing the partially or fully dissolved $CO_2$ or the affluent from the absorber containing an alkaline solution of $CO_2$ for precipitation of the carbonate precipitate in the precipitation step 20. In some embodiments, the alkaline earth-metal containing water is added to the reactor containing less than 20%, or less than 15%, or less than 10%, or less than 5% of the $CO_2$ gaseous stream or the solution containing the partially or fully dissolved $CO_2$ or the affluent from the absorber containing an alkaline solution of $CO_2$ for precipitation of the carbonate precipitate in the precipitation step 20.

The source of divalent cations, such as alkaline earth metal ions, is any aqueous medium containing alkaline earth metals, such as, but are not limited to, calcium, magnesium, strontium, barium, etc. or combination thereof. In some embodiments, the alkaline earth metal is calcium, magnesium, or combination thereof and the source of alkaline earth metal is any aqueous medium containing calcium, magnesium or combination thereof. In some embodiments, alkaline earth metal source is also the source of water and/or source of alkalinity, as described herein regarding hydrated lime or carbide lime. In some embodiments, the aqueous solution of alkaline earth metal ions may comprise cations derived from freshwater, brackish water, seawater, or brine (e.g., naturally occurring subterranean brines or anthropogenic subterranean brines such as geothermal plant wastewaters, desalination plant waste waters), as well as other salines having a salinity that is greater than that of freshwater, any of which may be naturally occurring or anthropogenic.

Divalent cations (e.g., alkaline earth metal cations such as $Ca^{2+}$ and $Mg^{2+}$), which are useful for producing carbonate additive of the invention, may be found in industrial wastes, seawater, brines, hard water, minerals, and many other suitable sources.

In some locations, industrial waste streams from various industrial processes provide for convenient sources of cations (as well as in some cases other materials useful in the process, e.g., metal hydroxide). Such waste streams include, but are not limited to, mining wastes; fossil fuel burning ash (e.g., fly ash, bottom ash, boiler slag); slag (e.g., iron slag, phosphorous slag); cement kiln waste (e.g., cement kiln dust); oil refinery/petrochemical refinery waste (e.g., oil field and methane seam brines); coal seam wastes (e.g., gas production brines and coal seam brine); paper processing waste; water softening waste brine (e.g., ion exchange effluent); silicon processing wastes; agricultural waste; metal finishing waste; high pH textile waste; and caustic sludge.

In some locations, a convenient source of cations for use in systems and methods of the invention is water (e.g., an aqueous solution including cations such as seawater or subterranean brine), which may vary depending upon the particular location at which the invention is practiced. Suitable aqueous solutions of cations that may be used include solutions including one or more divalent cations, e.g., alkaline earth metal cations such as $Ca^{2+}$ and $Mg^{2+}$. In some embodiments, the aqueous source of cations comprises alkaline earth metal cations. In some embodiments, the alkaline earth metal cations include calcium, magnesium, or a mixture thereof. In some embodiments, the aqueous solution of cations comprises calcium in amounts ranging from 50 to 50,000 ppm, 50 to 40,000 ppm, 50 to 20,000 ppm, 100 to 10,000 ppm, 200 to 5000 ppm, or 400 to 1000 ppm, or 10,000 to 50,000 ppm, or 20,000 to 50,000 ppm, or 20,000 to 30,000 ppm.

In some embodiments, mineral rich freshwater may be a convenient source of cations (e.g., cations of alkaline earth metals such as $Ca^{2+}$ and $Mg^{2+}$). Any of a number of suitable freshwater sources may be used, including freshwater sources ranging from sources relatively free of minerals to sources relatively rich in minerals. Mineral-rich freshwater sources may be naturally occurring, including any of a number of hard water sources, lakes, or inland seas. Some mineral-rich freshwater sources such as alkaline lakes or inland seas (e.g., Lake Van in Turkey) also provide a source of pH-modifying agents. Mineral-rich freshwater sources may also be anthropogenic. For example, a mineral-poor (soft) water may be contacted with a source of cations such as alkaline earth metal cations (e.g., $Ca^{2+}$, $Mg^{2+}$, etc.) to produce a mineral-rich water that is suitable for methods and systems described herein. Cations or precursors thereof (e.g., salts, minerals) may be added to freshwater (or any other type of water described herein) using any convenient protocol (e.g., addition of solids, suspensions, or solutions). In some embodiments, divalent cations selected from $Ca^{2+}$ and $Mg^{2+}$ are added to freshwater. In some embodiments, monovalent cations selected from $Na^+$ and $K^+$ are added to freshwater. In some embodiments, freshwater including $Ca^{2+}$ is combined with magnesium silicates (e.g., olivine or serpentine), or products or processed forms thereof, yielding a solution including calcium and magnesium cations.

Many minerals provide sources of cations and, in addition, some minerals are sources of base. Divalent cation-containing minerals include mafic and ultramafic minerals such as olivine, serpentine, and other suitable minerals, which may be dissolved using any convenient protocol. In one embodiment, cations such as calcium may be provided for methods and compositions of this invention from feldspars such as anorthite. Cations may be obtained directly from mineral sources or from subterranean brines, high in calcium or other divalent cations. Other minerals such as wollastonite may also be used. Dissolution may be accelerated by increasing surface area, such as by milling by conventional means or by, for example, jet milling, as well as by use of, for example, ultrasonic techniques. In addition, mineral dissolution may be accelerated by exposure to acid or base.

Metal silicates (e.g., magnesium silicates) and other minerals including cations of interest may be dissolved, for example, in acid such as HCl (optionally from an electrochemical process) to produce, for example, magnesium and other metal cations for use in compositions of the invention. In some embodiments, magnesium silicates and other minerals may be digested or dissolved in an aqueous solution that has become acidic due to the addition of carbon dioxide and other components of waste gas (e.g., combustion gas). Alternatively, other metal species such as metal hydroxide (e.g., $Mg(OH)_2$, $Ca(OH)_2$) may be made available for use by dissolution of one or more metal silicates (e.g., olivine and serpentine) with aqueous alkali hydroxide (e.g., NaOH) or any other suitable caustic material. Any suitable concentration of aqueous alkali hydroxide or other caustic material may be used to decompose metal silicates, including highly concentrated and very dilute solutions. The concentration (by weight) of an alkali hydroxide (e.g., NaOH) in solution may be, for example, from 30% to 80% (w/w).

Aqueous Medium

The carbonate additives of the invention include carbonate compositions that may be produced by precipitating a calcium and/or magnesium carbonate composition from water. In certain embodiments, the water from which the carbonate precipitates are produced is a salt water. The salt water-derived carbonate compound composition includes a composition derived from salt water. The salt water is employed in its conventional sense to refer to a number of different types of aqueous liquids other than fresh water, where the salt water includes brackish water, sea water and brine (including manmade brines, e.g., geothermal plant wastewaters, desalination waste waters, etc), as well as other salines having a salinity that is greater than that of freshwater. Brine is water saturated or nearly saturated with salt and has a salinity that is 50 ppt (parts per thousand) or greater. Brackish water is water that is saltier than fresh water, but not as salty as seawater, having a salinity ranging from 0.5 to 35 ppt. Seawater is water from a sea or ocean and has a salinity ranging from 35 to 50 ppt. The salt water source from which the mineral composition of the invention is derived may be a naturally occurring source, such as a sea, ocean, lake, swamp, estuary, lagoon, etc., or a man-made source. In certain embodiments, the salt water source of the mineral composition is seawater.

In some embodiments, the water in the process may be a mineral rich, e.g., calcium and/or magnesium rich, freshwater source. In some embodiments, the water employed in the process includes one or more alkaline earth metals, e.g., magnesium, calcium, etc. In some embodiments, the water includes those that include calcium in amounts ranging from 50 to 20,000 ppm, such as 100 to 10,0000 ppm and including 200 to 5,000 ppm. In some embodiments, the water includes magnesium in amounts ranging from 50 to 20,000 ppm, such as 200 to 10,000 ppm and including 500 to 5,000 ppm.

In some embodiments, calcium rich waters may be combined with magnesium silicate minerals, such as olivine or serpentine, in solution that has become acidic due to the addition on carbon dioxide to form carbonic acid, which dissolves the magnesium silicate, leading to the formation of calcium magnesium silicate carbonate compounds.

In certain embodiments, the water may be obtained from the power plant that is also providing the gaseous waste stream. For example, in water cooled power plants, such as seawater cooled power plants, water that has been employed by the power plant may then be sent to the precipitation system and employed as the water in the precipitation reaction. In certain of these embodiments, the water may be cooled prior to entering the precipitation reactor.

In some embodiments, the aqueous medium is a solution of hydrated lime. The hydrated lime may be produced by calcining of limestone. The calcining of the limestone may result in the formation of calcium oxide which when hydrated results in hydrated lime. The hydrated lime may be then contacted with carbon dioxide to precipitate the carbonate additive comprising reactive vaterite of the invention. The hydrated lime provides both a source of divalent cations as well as proton removing agents to facilitate precipitation of the carbonate additive. The vaterite may be formed as a reactive vaterite or may be activated using the methods of the invention to form the reactive vaterite.

In some embodiments, the aqueous medium is a solution of carbide lime. In some embodiments, the carbide lime provides divalent cations for producing the precipitation material. In some embodiments, the divalent cations comprise $Ca^{2+}$, $Mg^{2+}$, or a combination thereof. In some embodiments, the carbide lime also provides proton-removing agents for producing the carbonate additive. In some embodiments, the carbide lime provides proton-removing agents upon hydration of CaO, MgO, or a combination thereof in the aqueous solution. In some embodiments, the carbide lime is obtained from acetylene production process, metallurgical process, calcium cyanamide production process, landfill, or combination thereof. Accordingly, in one aspect, there is provided a method including contacting an aqueous solution comprising carbide lime with carbon dioxide from an industrial process; producing a carbonate additive comprising reactive vaterite; and producing a non-cementitious composition from the carbonate additive.

Stabilizers

In one aspect, the formation of the carbonate additive comprising reactive vaterite is facilitated by stabilizing the composition by using stabilizers, such as sodium sulfate. The use of stabilizers during the preparation of the carbonate containing non-cementitious compositions results in more stable reactive vaterite containing compositions or that the stability of the composition can be optimized by optimizing the amount of the stabilizer. The reactive vaterite containing compositions provided herein are stable compositions in a dry powdered or wet form. The metastable forms, i.e. vaterite convert to the stable forms, such as aragonite, when contacted with water. The stabilizer as provided herein may stabilize the reactive vaterite forms such that the conversion of vaterite to aragonite is slowed down or eliminated during the process of formation of the carbonate additive and the stability of the reactive vaterite form increases. In some embodiments, the stabilizer may affect the Gibbs free energy of transformation of one form to the other (as illustrated in FIG. 1).

As used herein, "stabilizer" includes any reagent that stabilizes the metastable forms, i.e. vaterite, of carbonate in the composition. In some embodiments, the stabilizer is a sulfate. The sulfate includes any molecule that provides sulfate ions in the solution. Examples of sulfate include, but not limited to, sea water, an alkali metal sulfate, alkaline earth metal sulfate, lignosulfate, or combination thereof. Such sulfates include, but not limited to, sodium sulfate, potassium sulfate, calcium sulfate, magnesium sulfate, barium sulfate, etc. In some embodiments, the sulfate is sodium sulfate. Such stabilizers have been described in U.S. patent application Ser. No. 13/457,156, filed Apr. 26, 2012, which is incorporated herein by reference in its entirety. In some embodiments, the stabilizer stabilizes the reactive vaterite forms of the carbonate in the composition from hours to days to few weeks to many years. In some embodiments, the stabilizer stabilizes the reactive vaterite forms of the carbonate in the composition for up to 20 years; or for up to 10 years; or for up to 5 years; or for up to 1 year; or from few hours to 2 weeks; or from 2 weeks to 20 years; or from 2 weeks to 10 years; or from 2 weeks to 5 years; or from 2 weeks to 1 year; or from 2 weeks to few months such as 6 months, 8 months etc.

In some embodiments, a stabilizer is added to the solution containing $CO_2$ or $CO_2$ charged water 30 which is then contacted with the alkaline earth metal ions in the precipitation step 20. In some embodiments, the stabilizer is added to the alkaline earth metal solution 10 which is then contacted with the solution containing $CO_2$ in the precipitation step 20. In such embodiments, the stabilizer may be dissolved in the alkaline earth metal containing solution before it is added to the solution containing $CO_2$. In some embodiments, the stabilizer is added to the precipitation step in the reactor before both the alkaline earth metal ions and the solution of $CO_2$ are added. In some embodiments, the stabilizer is added to the precipitation step simultaneously when both the alkaline earth metal ions and the solution of $CO_2$ are added for the precipitation. In some embodiments, the stabilizer is added to the precipitation step after both the alkaline earth metal ions and the solution of $CO_2$ are added for the precipitation. In some embodiments, the stabilizer is added to the slurry containing the carbonate precipitate that is taken out from the precipitation step 20.

Precipitation Conditions

In methods of producing the carbonate additives of the invention, the precipitation of the carbonate additive is carried out in one or more precipitation conditions sufficient to produce a carbonate compound composition containing reactive vaterite and a mother liquor (i.e., the part of the water that is left over after precipitation of the carbonate compound(s) from the saltwater). The resultant precipitates and mother liquor may collectively make up the carbonate additive provided herein. Any convenient precipitation conditions may be employed, which conditions result in the production of the carbonate additive.

In some embodiments, the methods include contacting the volume of water that is subjected to the precipitation conditions with a source of $CO_2$. Contact of the water with the source $CO_2$ may occur before and/or during the time when the water is subjected to precipitation conditions. Accordingly, embodiments of the invention include methods in which the volume of water is contacted with a source of $CO_2$ prior to subjecting the volume of salt water to precipitation conditions. Embodiments of the invention include methods in which the volume of salt water is contacted with a source of $CO_2$ while the volume of salt water is being subjected to carbonate precipitation conditions. Embodiments of the invention include methods in which the volume of water is contacted with a source of a $CO_2$ both prior to subjecting the volume of salt water to carbonate precipitation conditions and while the volume of salt water is being subjected to carbonate precipitation conditions. In some embodiments, the same water may be cycled more than once, wherein a first cycle of precipitation removes primarily calcium carbonate and magnesium carbonate minerals, and leaves remaining alkaline water to which other alkaline earth ion sources may be added, that can have more carbon dioxide cycled through it, precipitating more carbonate compounds.

At precipitation step 20, carbonate compounds, which may be amorphous or crystalline, are precipitated. Precipitation conditions include those that change the physical environment of the water to produce the desired precipitate product, i.e. the precipitation conditions that favor the formation of the carbonate additive comprising reactive vaterite.

In some embodiments, there is provide a method for producing a non-cementitious product, the method comprising a) contacting $CO_2$ with a proton removing agent to form a solution; b) contacting the solution with water comprising alkaline earth-metal ions under one or more precipitation conditions to make the carbonate additive comprising reactive vaterite; c) mixing the carbonate additive with a non-cementitious additive; and d) producing a non-cementitious product.

In some embodiments, there is provided a method for producing a non-cementitious product comprising a) producing a carbonate additive comprising calcining limestone to form calcium oxide, forming hydrated lime from the calcium oxide, and treating the hydrated lime with $CO_2$ under one or more precipitation conditions to form the carbonate additive comprising reactive vaterite, and b) mixing the carbonate additive with a non-cementitious additive to form the non-cementitious product. In some embodiments, the foregoing method of producing the carbonate additive is a traditional PCC manufacturing process except that the carbonate additive formed comprises reactive vaterite. In some embodiments, the foregoing method further includes c) transforming the reactive vaterite to aragonite to form the non-cementitious product.

In some embodiments, there is provided a method for producing a paper product, the method comprising a) contacting $CO_2$ with a solution comprising proton removing agent, alkaline earth-metal ions, and pulp under one or more precipitation conditions to make the carbonate additive comprising reactive vaterite in situ; b) transforming the reactive vaterite to aragonite in situ, and c) forming a paper product.

The one or more precipitation conditions include those that modulate the environment of the $CO_2$ charged precipitation reaction mixture to produce the desired carbonate additive comprising reactive vaterite. Such one or more precipitation conditions, that can be used in the foregoing method embodiments or the method embodiments described herein, suitable to form reactive vaterite containing carbonate additive include, but are not limited to, temperature, pH, pressure, ion ratio, precipitation rate, presence of additive, presence of ionic species, concentration of additive and ionic species, stirring, residence time, mixing rate, forms of agitation such as ultrasonics, presence of seed crystals, catalysts, membranes, or substrates, dewatering, drying, ball milling, etc. In some embodiments, the average particle size of the reactive vaterite may also depend on the one or more precipitation conditions used in the precipitation of the carbonate additive. In some embodiments, the percentage of the reactive vaterite in the carbonate additive may also depend on the one or more precipitation conditions used in the precipitation process.

For example, the temperature of the $CO_2$-charged solution may be raised to a point at which an amount suitable for precipitation of the desired carbonate additive occurs. In such embodiments, the temperature of the $CO_2$ charged solution may be raised to a value from 5° C. to 70° C., such as from 20° C. to 50° C., and including from 25° C. to 45° C. While a given set of precipitation conditions may have a temperature ranging from 0° C. to 100° C., the temperature may be raised in certain embodiments to produce the desired precipitation material. In certain embodiments, the temperature of the precipitation reaction mixture is raised using energy generated from low or zero carbon dioxide emission sources (e.g., solar energy source, wind energy source, hydroelectric energy source, waste heat from the flue gases of the carbon emitter, etc). In some embodiments, the temperature of the precipitation reaction mixture may be raised utilizing heat from flue gases from coal or other fuel combustion.

The pH of the $CO_2$-charged precipitation reaction mixture may also be raised to an amount suitable for precipitation of the desired carbonate additive. In such embodiments, the pH of the $CO_2$-charged precipitation reaction mixture is raised to alkaline levels for precipitation, wherein carbonate is favored over bicarbonate. The pH may be raised to pH 9 or higher, such as pH 10 or higher, including pH 11 or higher. For example, when carbide lime is used to raise the pH of the precipitation reaction mixture or precursor of the precipitation reaction mixture, the pH may be about pH 12.5 or higher.

Adjusting major ion ratios during precipitation may influence the nature of the carbonate additive. Major ion ratios may have considerable influence on polymorph formation. For example, as the magnesium:calcium ratio in the water increases, aragonite may become the major polymorph of calcium carbonate in the carbonate additive over low-magnesium vaterite. At low magnesium:calcium ratios, low-magnesium calcite may become the major polymorph. In some embodiments, where $Ca^{2+}$ and $Mg^{2+}$ are both present, the ratio of $Ca^{2+}$ to $Mg^{2+}$ (i.e., $Ca^{2+}:Mg^{2+}$) in the precipitation material is 1:1 to 1:2.5; 1:2.5 to 1:5; 1:5 to 1:10; 1:10 to 1:25; 1:25 to 1:50; 1:50 to 1:100; 1:100 to 1:150; 1:150 to 1:200; 1:200 to 1:250; 1:250 to 1:500; or 1:500 to 1:1000. In some embodiments, the ratio of $Mg^{2+}$ to $Ca^{2+}$ (i.e., $Mg^{2+}:Ca^{2+}$) in the precipitation material is 1:1 to 1:2.5; 1:2.5 to 1:5; 1:5 to 1:10; 1:10 to 1:25; 1:25 to 1:50; 1:50 to 1:100; 1:100 to 1:150; 1:150 to 1:200; 1:200 to 1:250; 1:250 to 1:500; or 1:500 to 1:1000.

Precipitation rate may also have an effect on compound phase formation, with the most rapid precipitation rate achieved by seeding the solution with a desired phase. Without seeding, rapid precipitation may be achieved by rapidly increasing the pH of the precipitation reaction mixture, which may result in more amorphous constituents. The higher the pH, the more rapid is the precipitation, which may result in a more amorphous carbonate additive.

Accordingly, a set of precipitation conditions to produce a desired carbonate additive may include, as above, the temperature and pH, as well as, in some instances, the concentrations of additives and ionic species in the water. The additives which are the activators of the reactive vaterite, have been described herein below. The presence of the additives and the concentration of the additives may also favor formation of the reactive vaterite. Precipitation conditions may also include factors such as mixing rate, forms of agitation such as ultrasonics, and the presence of seed crystals, catalysts, membranes, or substrates. In some embodiments, precipitation conditions include supersaturated conditions, temperature, pH, and/or concentration gradients, or cycling or changing any of these parameters. The protocols employed to prepare carbonate additive according to the invention may be batch, semi-batch, or continuous protocols. The precipitation conditions may be different to produce a given carbonate additive in a continuous flow system compared to a semi-batch or batch system.

The carbonate additive, following production from a precipitation reaction mixture, is separated from the reaction mixture to produce separated carbonate additive (e.g., wet cake) and a supernatant as illustrated in FIG. 2. In the systems of the invention, the separation step may be carried out on the separation station. The carbonate additive may be stored in the supernatant for a period of time following precipitation and prior to separation (e.g., by drying). For example, the carbonate additive may be stored in the supernatant for a period of time ranging from few min to hours to 1 to 1000 days or longer, such as 1 to 10 days or longer, at a temperature ranging from 1° C. to 40° C., such as 20° C. to 25° C. Separation of the carbonate additive from the precipitation reaction mixture is achieved using any of a number of convenient approaches, including draining (e.g., gravitational sedimentation of the precipitation material followed by draining), decanting, filtering (e.g., gravity filtration, vacuum filtration, filtration using forced air), centrifuging, pressing, or any combination thereof. Separation of bulk water from the carbonate additive produces a wet cake of carbonate additive, or a dewatered carbonate additive. Some examples of the separation are described in U.S. patent application Ser. No. 13/409,856, filed Mar. 1, 2012, which is herein incorporate by reference. Liquid-solid separator such as Epuramat's Extrem-Separator ("ExSep") liquid-solid separator, Xerox PARC's spiral concentrator, or a modification of either of Epuramat's ExSep or Xerox PARC's spiral concentrator, may be useful for the separation of the carbonate additive from the precipitation reaction mixture.

In some embodiments, the resultant dewatered carbonate additive such as the wet cake material is directly used to make the products described herein. For example, the wet cake of the dewatered carbonate additive is mixed with one or more non-cementitious additives and activators (described herein), and is spread out on the conveyer belt where the reactive vaterite in the carbonate additive transforms to aragonite and sets and hardens. The cake may be pressed to remove excess water. The hardened material is then cut into desired shapes such as paper, polymeric products etc. described herein. In some embodiments, the sheet of the paper made from the wet cake is put on top and bottom of the slurry of the precipitate when the reactive vaterite in the carbonate additive transforms to aragonite and sets and hardens between the sheets of the paper. After the setting and hardening of the precipitation material (vaterite transformation to aragonite), the material is cut into desired shapes, such as, cement siding boards and drywall etc.

In some embodiments, the amount of the one or more activation additives may be optimized depending on the desired time required for the transformation of the vaterite to aragonite (described herein). For example, for some applications, it may be desired that the material transform rapidly and in certain other instance, a slow transformation may be desired. In some embodiments, the wet cake may be heated on the conveyer belt to hasten the transformation of the vaterite to aragonite (thermal activation described herein). In some embodiments, the wet cake may be poured in the molds of desired shape and the molds are then heated in the autoclave to hasten the transformation of the vaterite to aragonite. Accordingly, the continuous flow process, batch process or semi-batch process, all are well within the scope of the invention.

In some embodiments, the precipitate of the carbonate additive, once separated from the precipitation reaction mixture, is washed with fresh water, then placed into a filter press to produce a filter cake with 30-60% solids. This filter cake is then mechanically pressed in a mold, using any convenient means, e.g., a hydraulic press, at adequate pressures, e.g., ranging from 5 to 5000 psi, such as 1000 to 5000 psi, to produce a formed solid. In processes involving the use of temperature and pressure, the dewatered cake may be dried. The cake may be then exposed to a combination of rewatering, and elevated temperature and/or pressure for a certain time. The combination of the amount of water added back, the temperature, the pressure, and the time of exposure, as well as the thickness of the cake, can be varied according to composition of the starting material and the desired results.

A number of different ways of exposing the material to temperature and pressure are described herein; it will be appreciated that any convenient method may be used. An exemplary drying protocol is exposure to 40° C. for 24-48 hours, but greater or lesser temperatures and times may be used as convenient, e.g., 20-60° C. for 3-96 hours or even longer. Water is added back to the desired percentage, e.g., to 1%-50%, e.g., 1% to 10%, such as 1, 2, 3, 4, 5, 6, 7, 8, 9, or 10% w/w, such as 5% w/w, or 4-6% w/w, or 3-7% w/w. Thickness and size of the cake may be adjusted as desired; the thickness can vary in some embodiment from 0.05 inch to 5 inches, e.g. 0.1-2 inches, or 0.3-1 inch. In some embodiments the cake may be 0.5 inch to 6 feet or even thicker. The cake is then exposed to elevated temperature and/or pressure for a given time, by any convenient method, for example, in a platen press using heated platens. The heat to elevate the temperature, e.g., for the platens, may be provided, e.g., by heat from an industrial waste gas stream such as a flue gas stream. The temperature may be any suitable temperature; in general, for a thicker cake a higher temperature is desired; examples of temperature ranges are 40-150° C., e.g., 60-120°

C., such as 70-110° C., or 80-100° C. Similarly, the pressure may be any suitable pressure to produce the desired results; exemplary pressures include 1000-100,000 pounds per square inch (psi), including 2000-50,000 psi, or 2000-25,000 psi, or 2000-20,000 psi, or 3000-5000 psi. Finally, the time that the cake is pressed may be any suitable time, e.g., 1-100 seconds, or 1-100 minute, or 1-50 minutes, or 2-25 minutes, or 1-10,000 days. The resultant hard tablet may optionally be then cured, e.g., by placing outside and storing, by placing in a chamber wherein they are subjected to high levels of humidity and heat, etc.

Another method of providing temperature and pressure is the use of a press, as described more fully in U.S. patent application Ser. No. 12/475,378, filed 29 May 2009. A suitable press, e.g., a platen press, may be used to provide pressure at the desired temperature (using heat supplied, e.g., by a flue gas or by other steps of the process to produce a precipitate, e.g., from an electrochemical process) for a desired time. A set of rollers may be used in similar fashion.

Use of a heated die section may assist in the formation of the product by accelerating the transition of the carbonate mineral to a hard, stable form. Heated dies may also be used in the case of binders to harden or set the binder. Temperatures of 100° C. to 600° C. are commonly used in the heated die section. Heat for the heated die may come in whole or in part from the flue gas or other industrial gas used in the process of producing the precipitate, where the flue gas is first routed to the die to transfer heat from the hot flue gas to the die.

In some embodiments, the production of the carbonate additive and the products is carried out in the same facility. In some embodiments, the carbonate additive is produced in one facility and is transported to another facility to make the end product. The carbonate additive may be transported in the slurry form, wet cake form, or dry powder form.

The resultant supernatant of the precipitation process, or a slurry of carbonate additive may also be processed as desired. For example, the supernatant or slurry may be returned to the precipitator, or to another location. In some embodiments, the supernatant may be contacted with a source of $CO_2$, as described above, to sequester additional $CO_2$. For example, in embodiments in which the supernatant is to be returned to the precipitation reactor, the supernatant may be contacted with a gaseous waste source of $CO_2$ in a manner sufficient to increase the concentration of carbonate ion present in the supernatant. As described above, contact may be conducted using any convenient protocol. In some embodiments, the supernatant has an alkaline pH, and contact with the $CO_2$ source is carried out in a manner sufficient to reduce the pH to a range between pH 5 and 9, pH 6 and 8.5, or pH 7.5 to 8.2. The resultant supernatant may be disposed of using any convenient protocol. In certain embodiments, it may be sent to a tailings pond for disposal. In certain embodiments, it may be disposed of in a naturally occurring body of water, e.g., ocean, sea, lake or river. In certain embodiments, the supernatant is returned to the source of feedwater for the methods of invention, e.g., an ocean or sea. Alternatively, the supernatant may be further processed, e.g., subjected to desalination protocols, as described further in U.S. application Ser. No. 12/163,205; the disclosure of which is herein incorporated by reference.

In some embodiments, the stability of the reactive vaterite in the carbonate precipitate can be optionally optimized by rinsing the precipitate with chemical activators. The "chemical activators" used herein includes activators that remove stabilizer from the precipitate thereby activating the vaterite. In one aspect, there are provided methods for making a composition, comprising (a) contacting $CO_2$ from a $CO_2$ source with a proton removing agent to form a solution; (b) contacting the solution with water comprising alkaline earth-metal under one or more precipitation conditions to make a carbonate additive comprising reactive vaterite; (c) rinsing the carbonate additive with solution comprising chemical activators that activate the reactive vaterite in the carbonate additive; and (d) mixing the carbonate additive with non-cementitious additive to form a non-cementitious composition. In some embodiments, the method further comprises drying the carbonate additive to form the non-cementitious composition of the invention. In some embodiments, the method further comprises combining the non-cementitious composition with water and facilitating vaterite transformation to aragonite when the composition sets and hardens wherein the facilitation is provided by the chemical activators.

In some embodiments of the above described aspect, the stability of the carbonate additive containing vaterite and optionally stabilizer (as described herein) may be further optimized by rinsing the carbonate additive precipitate with chemical additives or activators. For example, in some embodiments, it may be desired to stabilize the vaterite precipitate only during the precipitation process. In such embodiments, the stabilizer may be added during the precipitation process and is partially or fully removed after the precipitation by rinsing the carbonate additive precipitate with solution containing chemical activators. In some embodiments, the carbonate additive precipitate may have been obtained by separating the solid from the slurry and filter pressing the settled solid. Such rinsing may remove the stabilizer from the carbonate additive precipitate thereby activating the vaterite or making the vaterite less stable and more reactive. In some embodiments, it may be desired to stabilize the vaterite precipitate not only during the precipitation process but also during the drying process (as described herein). In such embodiments, the dried composition may be kept in storage and is rinsed with chemical activators at the time of use to generate a reactive vaterite. In some embodiments, the vaterite precipitate may get over stabilized by the stabilizer and it may be desired to destabilize the vaterite precipitate. In such embodiments, the precipitate or the dried composition is rinsed with chemical activators to generate a reactive or destabilized vaterite. As described herein, the stability of the vaterite is related to the optimized activation of the vaterite such that when the composition is combined with water, the vaterite transforms to aragonite resulting in cementation.

In some embodiments, the chemical activators are solutions comprising carbonate ions and/or magnesium ions. In such embodiments, the above described rinsing comprises rinsing the carbonate additive precipitate or the dried composition with a first solution comprising carbonate ions and then a second solution comprising magnesium ions. In some embodiments, the precipitate or the dried composition may be rinsed with a solution comprising magnesium carbonate such that the solution provides both the magnesium ions as well as carbonate ions. It is contemplated that the rinsing with the first solution comprising carbonate ions modifies the surface chemistry of the precipitate in such a way that the sulfate ions in the precipitate are partially or fully replaced by the carbonate ions making the overall surface charge negative. It is further contemplated that the rinsing with the second solution comprising magnesium ions partially or fully replaces the carbonate ions with the magnesium ions such that the overall surface charge is positive. The reduction in the sulfate content of the precipitate and subsequent rinsing with magnesium ions may activate vaterite and facilitate transformation of vaterite to aragonite when the composition is combined with water.

In one aspect, in addition to stabilizing the reactive vaterite during the production process, the vaterite may be activated by the activation of vaterite to form reactive vaterite, as described herein, such that the reactive vaterite leads to aragonitic pathway and not calcite pathway during dissolution-reprecipitation process. In one aspect of the invention, the vaterite containing composition is activated in such a way that after the dissolution-reprecipitation process, aragonite formation is enhanced and calcite formation is suppressed. The activation of the vaterite containing composition may result in control over the aragonite formation and crystal growth. The activation of the vaterite containing composition may be achieved by various processes. Various examples of the activation of vaterite, such as, but not limited to, nuclei activation, thermal activation, mechanical activation, chemical activation, or combination thereof, are described herein.

In some embodiments, the vaterite is activated through various processes such that aragonite formation and its morphology and/or crystal growth can be controlled upon reaction of vaterite containing composition with water. The aragonite formed results in higher tensile strength and fracture tolerance to the non-cementitious compositions formed from the reactive vaterite. In some embodiments, vaterite may be activated by mechanical means, as described herein. For example, the vaterite containing compositions may be activated by creating surface defects on the vaterite composition such that aragonite formation is accelerated. In some embodiments, the activated vaterite is a ball-milled vaterite or is a vaterite with surface defects such that aragonite formation pathway is facilitated. The vaterite containing compositions may also be activated by providing chemical or nuclei activation to the vaterite composition. Such chemical or nuclei activation may be provided by one or more of aragonite seeds, inorganic additive, or organic additive. The aragonite seed present in the compositions provided herein may be obtained from natural or synthetic sources. The natural sources include, but not limited to, reef sand, limestone, hard skeletal material of certain fresh-water and marine invertebrate organisms, including pelecypods, gastropods, mollusk shell, and calcareous endoskeleton of warm- and cold-water corals, pearls, rocks, sediments, ore minerals (e.g., serpentine), and the like. The synthetic sources include, but not limited to, precipitated aragonite, such as formed from sodium carbonate and calcium chloride; or aragonite formed by the transformation of vaterite to aragonite, such as transformed vaterite described herein.

In some embodiments, the inorganic additive or organic additive in the compositions provided herein can be any additive that activates vaterite. Such additives have been described as "activating" or "activation additives". The "activating" or "activation additives" used herein includes additives that activate reactive vaterite to transform to aragonite during or after dissolution/reprecipitation process.

Some examples of inorganic additive or organic additive in the compositions provided herein, include, but not limited to, sodium decyl sulfate, lauric acid, sodium salt of lauric acid, urea, citric acid, sodium salt of citric acid, phthalic acid, sodium salt of phthalic acid, taurine, creatine, dextrose, poly(n-vinyl-1-pyrrolidone), aspartic acid, sodium salt of aspartic acid, magnesium chloride, acetic acid, sodium salt of acetic acid, glutamic acid, sodium salt of glutamic acid, strontium chloride, gypsum, lithium chloride, sodium chloride, glycine, sodium citrate dehydrate, sodium bicarbonate, magnesium sulfate, magnesium acetate, sodium polystyrene, sodium dodecylsulfonate, poly-vinyl alcohol, or combination thereof. In some embodiments, inorganic additive or organic additive in the compositions provided herein, include, but not limited to, taurine, creatine, poly(n-vinyl-1-pyrrolidone), lauric acid, sodium salt of lauric acid, urea, magnesium chloride, acetic acid, sodium salt of acetic acid, strontium chloride, magnesium sulfate, magnesium acetate, or combination thereof. In some embodiments, inorganic additive or organic additive in the compositions provided herein, include, but not limited to, magnesium chloride, magnesium sulfate, magnesium acetate, strontium chloride, strontium sulfate, or combination thereof. Such activation of the vaterite to form activated or reactive vaterite, are described in U.S. patent application Ser. No. 13/457,156, filed Apr. 26, 2012, which is incorporated herein by reference in its entirety.

Without being limited by any theory, it is contemplated that the activation of vaterite by ball-milling or by addition of aragonite seed, inorganic additive or organic additive or combination thereof may result in control of formation of aragonite during dissolution-reprecipitation process of the activated vaterite including control of properties, such as, but not limited to, polymorph, morphology, particle size, cross-linking, agglomeration, coagulation, aggregation, sedimentation, crystallography, inhibiting growth along a certain face of a crystal, allowing growth along a certain face of a crystal, or combination thereof. For example, the aragonite seed, inorganic additive or organic additive may selectively target the morphology of aragonite, inhibit calcite growth and promote the formation of aragonite that may generally not be favorable kinetically.

In some embodiments, in the foregoing methods, the one or more inorganic additives are alkaline earth metal ions selected from beryllium, magnesium, strontium, barium, or combination thereof. In some embodiments, the one or more inorganic additives are a salt of the ion including, but not limited to, magnesium, strontium, barium, sodium, potassium, chloride, bromide, iodide, etc. For example, the one or more inorganic additives added during the process are, but not limited to, beryllium chloride, magnesium chloride, magnesium bromide, magnesium iodide, strontium chloride, strontium bromide, strontium iodide, barium chloride, barium bromide, barium iodide, sodium chloride, sodium bromide, sodium iodide, potassium chloride, potassium bromide, potassium iodide, etc.

In some embodiments, in the foregoing methods, the amount of the one or more inorganic additives added during the process is more than 0.1% by weight, or more than 0.5% by weight, or more than 1% by weight, or more than 1.5% by weight, or more than 1.6% by weight, or more than 1.7% by weight, or more than 1.8% by weight, or more than 1.9% by weight, or more than 2% by weight, or more than 2.1% by weight, or more than 2.2% by weight, or more than 2.3% by weight, or more than 2.4% by weight, or more than 2.5% by weight, or more than 2.6% by weight, or more than 2.7% by weight, or more than 2.8% by weight, or more than 2.9% by weight, or more than 3% by weight, or more than 3.5% by weight, or more than 4% by weight, or more than 4.5% by weight, or more than 5% by weight, or between 0.5-5% by weight, or between 0.5-4% by weight, or between 0.5-3% by weight, or 0.5-2% by weight, or 0.5-1% by weight, or 1-3% by weight, or 1-2.5% by weight, or 1-2% by weight, or 1.5-2.5% by weight, or 2-3% by weight, or 2.5-3% by weight, or 0.5% by weight, or 1% by weight, or 1.5% by weight, or 2% by weight, or 2.5% by weight, or 3% by weight, or 3.5% by weight, or 4% by weight, or 4.5% by weight, or 5% by weight. In some embodiments, in the foregoing methods, the amount of the one or more inorganic additives added during the process is between 0.5-3% by weight or between 1.5-2.5% by weight.

In some embodiments, a combination of the additive ions may be needed for the activation of the vaterite to aragonite. For example, in some embodiments, both strontium and magnesium ions were found to be useful in the conversion process of the reactive vaterite to aragonite when in a cellulose matrix, as shown in the examples. Magnesium alone trended toward stability of the vaterite particles with little effect from temperature over given time spans. When strontium alone was used, the dissolution/precipitation reaction that occurred formed the mineral strontianite, a mineral in the aragonite family according to the macro/microstructure but composed of $SrCO_3$ instead of $CaCO_3$. This formed at cure solution levels as low as 100 mM, below which the vaterite remained stable. Morphologically, the strontianite appeared to take several forms relating to the aspect ratios of the reprecipitated crystallites.

In some embodiments, the total divalent cation molarity (e.g., $Mg^{2+}$, $Sr^{2+}$, or $Mg^{2+}$ and $Sr^2$) in the solution added to the carbonate additive or the non-cementitious composition may be between 0.05-0.5M or between 0.05-0.1M or between 0.1-0.25M or between 0.25-0.5M with ionic ratios (Mg:Sr) between 1:5 and 5:1 or between 1:5 to 2:1 or 1:2 to 2:1 or 1:1.

The resultant dewatered carbonate additive may be dried to produce a product, as illustrated at step 60 of FIG. 1. Drying can be achieved by air drying the filtrate. Where the filtrate is air dried, air drying may be at room or elevated temperature. In yet another embodiment, the precipitate is spray dried to dry the precipitate, where the liquid containing the precipitate is dried by feeding it through a hot gas (such as the gaseous waste stream from the power plant), e.g., where the liquid feed is pumped through an atomizer into a main drying chamber and a hot gas is passed as a co-current or counter-current to the atomizer direction. Depending on the particular drying protocol of the system, the drying station may include a filtration element, freeze drying structure, spray drying structure, etc. In some embodiments, the precipitate may be dried by fluid bed dryer. In certain embodiments, waste heat from a power plant or similar operation may be used to perform the drying step when appropriate. For example, in some embodiments, dry product is produced by the use of elevated temperature (e.g., from power plant waste heat), pressure, or a combination thereof.

Where desired, the dewatered carbonate additive from the separation reactor 40 may be washed before drying, as illustrated at optional step 50 of FIG. 1. The precipitate may be washed with freshwater, e.g., to remove salts (such as NaCl) from the dewatered precipitate. Used wash water may be disposed of as convenient, e.g., by disposing of it in a tailings pond, etc. The precipitate may be rinsed with activators as described above.

At step 70, the dried precipitate is refined, e.g., to provide for desired physical characteristics, such as particle size, surface area, etc., or to add one or more components to the precipitate, to produce a final product 80. In some embodiments, the one or more inorganic additives may be added along with the non-cementitious additives to transform the reactive vaterite to the aragonite and make a non-cementitious composition. In certain embodiments, the precipitate product is refined (i.e., processed) in some manner prior to subsequent use. Refinement may include a variety of different protocols. In certain embodiments, the product is subjected to mechanical refinement, e.g., grinding, in order to obtain a product with desired physical properties, e.g., particle size, etc.

In some embodiments, the particles with different morphologies, such as fine or agglomerated, and/or the particles with different sizes may be mixed to make the compositions of the invention. For example, a composition of the invention may include a mix of fine disperse particles with larger agglomerated particles or the composition of the invention may include a mix of particles with different sizes, e.g., particles with sizes ranging between 0.1 micron to 100 micron. In some embodiments, the composition of the invention may be modulated by mixing the particles with different particle size, surface area, zeta potential, and/or morphologies.

The vaterite containing composition may be optionally activated by refining, milling, aging, and/or curing, e.g., to provide for desired physical characteristics, such as activation, particle size, surface area, zeta potential, etc. The vaterite containing composition may also be activated by adding an aragonite seed, inorganic additive or organic additive, as described herein. Further, one or more components may be added to the composition, such as non-cementitious additives, to produce a final non-cementitious product of the invention 80.

III. Systems

Aspects of the invention further include systems, e.g., processing plants or factories, for producing the carbonate additive compositions comprising vaterite, as well as non-cementitious compositions of the invention. Systems of the invention may have any configuration which enables practice of the particular production method of interest.

In one aspect, there is provided a system for making the composition of the invention, including (a) an input for an alkaline earth-metal containing water; (b) an input for a flue gas from an industrial plant including carbon of a fossil fuel origin; (c) a first reactor connected to the inputs of step (a) and step (b) that is configured to make the carbonate additive comprising vaterite; and (d) a second reactor connected to the first reactor configured to make the non-cementitious composition of the invention from the carbonate additive and a non-cementitious additive.

Figure 3:
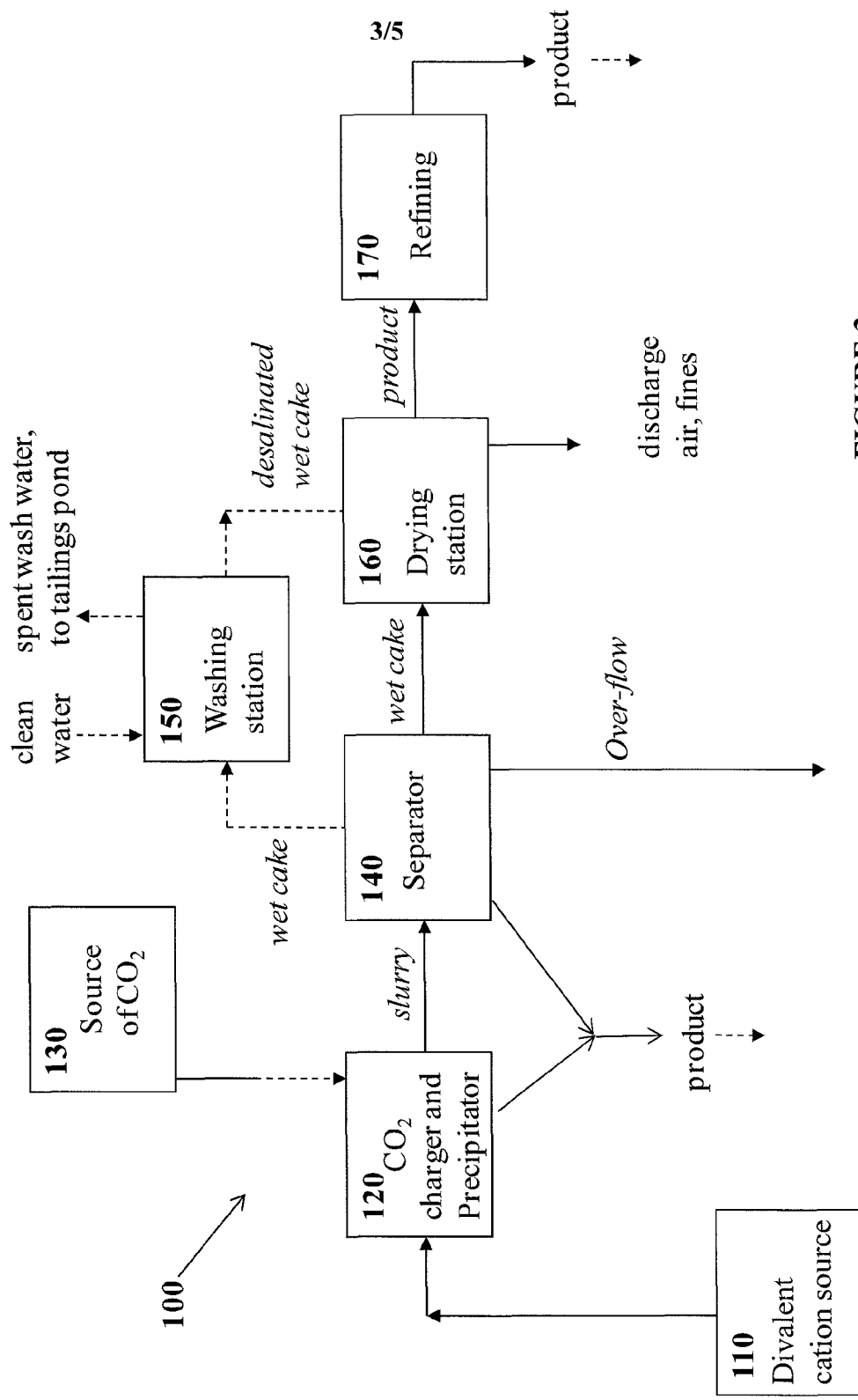
FIG. 3 illustrates a schematic of a carbonate additive production system according to some embodiments of the invention.

FIG. 3 provides an illustrative schematic of a system 100 to conduct the methods of some embodiments of the invention. In FIG. 3, system 100 includes an divalent cation source 110, such as, alkaline earth-metal containing water. In some embodiments, the divalent cation source 110 includes a structure having an input for water, such as a pipe or conduit from an ocean, etc. Where the water source is seawater, the input is in fluid communication with a source of sea water. For example, the input is a pipe line or feed from ocean water to a land based system or an inlet port in the hull of ship, e.g., where the system is part of a ship, e.g., in an ocean based system. Water may be sent to the systems of the invention by any convenient protocol, such as, but not limited to, turbine motor pump, rotary lobe pump, hydraulic pump, fluid transfer pump, geothermal well pump, a water-submersible vacuum pump, among other protocols.

The methods and systems of the invention may also include one or more detectors configured for monitoring the source of aqueous medium or the source of carbon dioxide (not illustrated in FIG. 2 or FIG. 3). Monitoring may include, but is not limited to, collecting data about the pressure, temperature and composition of the water or the carbon dioxide gas. The detectors may be any convenient device configured to monitor, for example, pressure sensors (e.g., electromagnetic pressure sensors, potentiometric pressure sensors, etc.), temperature sensors (resistance temperature detectors, thermocouples, gas thermometers, thermistors, pyrometers, infrared radiation sensors, etc.), volume sensors (e.g., geophysical diffraction tomography, X-ray tomography, hydroacoustic surveyers, etc.), and devices for determining chemical makeup of the water or the carbon dioxide gas (e.g, IR spectrometer, NMR spectrometer, UV-vis spectrophotometer, high performance liquid chromatographs, inductively coupled plasma emission spectrometers, inductively coupled plasma mass spectrometers, ion chromatographs, X-ray diffractometers, gas chromatographs, gas chromatography-mass spectrometers, flow-injection analysis, scintillation counters, acidimetric titration, and flame emission spectrometers, etc.).

In some embodiments, detectors may also include a computer interface which is configured to provide a user with the collected data about the aqueous medium, divalent cation and/or the carbon dioxide gas. For example, a detector may determine the internal pressure of the aqueous medium, divalent cation solution, and/or the carbon dioxide gas and the computer interface may provide a summary of the changes in the internal pressure within the aqueous medium, divalent cation solution, and/or the carbon dioxide gas over time. In some embodiments, the summary may be stored as a computer readable data file or may be printed out as a user readable document.

In some embodiments, the detector may be a monitoring device such that it can collect real-time data (e.g., internal pressure, temperature, etc.) about the aqueous medium, divalent cation solution, and/or the carbon dioxide gas. In other embodiments, the detector may be one or more detectors configured to determine the parameters of the aqueous medium, divalent cation solution, and/or the carbon dioxide gas at regular intervals, e.g., determining the composition every 1minute, every 5 minutes, every 10 minutes, every 30 minutes, every 60 minutes, every 100 minutes, every 200 minutes, every 500 minutes, or some other interval.

FIG. 3 also illustrates a $CO_2$ source 130. This source may vary, as described above. In some embodiments, the $CO_2$ source 130 includes a structure having an input for $CO_2$, such as a pipe or conduit. Where the $CO_2$ source is flue gas from the power plant, the input is in gaseous communication with the source of $CO_2$ in the plant. For example, the input is a pipe line or feed from power plant to the system. Alternatively, the $CO_2$ source may be a cylinder or series of cylinders connected to the input for the $CO_2$ source. In some embodiments, the $CO_2$ source is a gas/liquid absorber producing a solution containing $CO_2$, as described above.

The inputs for the divalent cation such as alkaline earth metal ions source and the $CO_2$ source are connected to the $CO_2$ charger and precipitator reactor 120. The precipitation reactor 120 is connected to the two inputs and is configured to make the carbonate additive precipitate. The charger and precipitation reactor 120 may be configured to include any number of different elements, such as temperature regulators (e.g., configured to heat the water to a desired temperature), chemical additive elements, e.g., for introducing chemical pH elevating agents (such as NaOH) into the water, electrolysis elements, e.g., cathodes/anodes, etc. This reactor 120 may operate as a batch process or a continuous process. It is to be understood that system in FIG. 3 is for illustration purposes only and that the system may be modified to achieve the same result. For example, the system may have more than one reactor, and/or more than one source of alkaline earth metal ions, and/or more than one source of $CO_2$ interconnected in the system. The charger and/or reactor can be a continuous stir tank reactor (CSTR), plug flow reactor (PFR), a tank, a batch reactor, or combination thereof. Such reactors, such as, CSTR, PFR, etc. are well known in the art. In some embodiments, the reactor is PFR. The PFR may have pipes optionally with inline mixing elements to mix the solutions. In some embodiments, the turbulence in the pipe mixes the solutions without the need for mixing elements. In some embodiments, static inline mixing elements may be present inside the pipes to mix the solutions. The length and the diameter of the pipes may be modulated that may affect the mixing of the solutions, the residence time of the precipitate, the morphology of the precipitate, the particle size of the precipitate, etc. In some embodiments, the inside of the pipes in the PFR may be coated with a material that resists the build up of the precipitate inside the pipes. Such coating can be Teflon or any other material. An average flow of the solution containing the partially or fully dissolved $CO_2$ or the affluent from the absorber containing an alkaline solution of $CO_2$ to the reactor may be 4-6 GPM (gallons per minute), or 5-6 GPM, or 4-5 GPM, or 3-8 GPM. An average flow of the alkaline earth metal ion containing water to the reactor may be 8-10 GPM (gallons per minute), or 8-9 GPM, or 9-10 GPM, or 5-15 GPM.

The product of the precipitation reaction, e.g., the slurry may be removed from the reactor and used to make the carbonate additive composition of the invention. Alternatively, the product of the precipitation reaction, e.g., the slurry is then processed at a bulk dewatering station 140, as illustrated in FIG. 3. The dewatering station 140 may use a variety of different water removal processes, including processes such as continuous centrifugation, centrifugation, filter centrifugation, gravitational settling, and the like. The slurry obtained after bulk dewatering but still wetted in a mother supernate can be used to make the carbonate additive composition of the invention. The dewatering station 140 may be any number of dewatering stations connected to each other to dewater the slurry (e.g., parallel, in series, or combination thereof).

In some embodiments, systems may also include a desalination station (not illustrated in FIG. 3). The desalination station may be in fluid communication with the liquid-solid separator 140 such that the liquid product may be conveyed from the liquid-solid separator to the desalination station directly. The systems may include a conveyance (e.g., pipe) where the output depleted brine may be directly pumped into the desalination station or may flow to desalination station by gravity. Desalination stations of the invention may employ any convenient protocol for desalination, and may include, but are not limited to distillers, vapor compressors, filtration devices, electrodialyzers, ion-exchange membranes, nanofiltration membranes, reverse osmosis desalination membranes, multiple effect evaporators or a combination thereof.

The system shown in FIG. 3 may also include a drying station 160 or a series of drying stations for drying the dewatered carbonate additive produced at station 140. Depending on the particular drying protocol of the system, the drying station 160 may include a filtration element, freeze drying structure, oven drying, spray drying structure, etc., as described above.

Also shown in FIG. 3, is an optional washing station 150, where bulk dewatered precipitate from separation station 140 is washed, e.g., to remove salts and other solutes from the precipitate, prior to drying at the drying station 160. Dried precipitate from station 160 is then sent to refining station 170, where the precipitate may be mechanically processed and/or one or more components may be added to the precipitate (e.g., as described herein) to produce the non-cementitious compositions of the invention. The refining station 170 may have grinders, millers, crushers, compressors, blender, etc. in order to obtain desired physical properties in the composition of the invention.

The system may further include outlet conveyers, e.g., conveyer belt, slurry pump, that allow for the removal of precipitate from one or more of the following: the contacting reactor, precipitation reactor, drying station, or from the refining station. In certain embodiments, the system may further include a station for preparing the non-cementitious composition from the carbonate additive. This station can be configured to produce a variety of non-cementitious compositions from the carbonate precipitate, such as described herein.

In some embodiments, the system of the invention includes a processing station that may include a compressor configured to pressurize the flue gas or the source of carbon dioxide, the source of alkaline earth metal ions, the reaction mixture in the reactor, the precipitate, the dewatered precipitate and/or the dried precipitate, as desired. Compressors of the invention may employ any convenient compression protocol, and may include, but are not limited to, positive displacement pumps (e.g., piston or gear pumps), static or dynamic fluid compression pumps, radial flow centrifugal-type compressors, helical blade-type compressors, rotary compressors, reciprocating compressors, liquid-ring compressors, among other devices for fluid compression. In some embodiments, the compressor may be configured to pressurize to a pressure of 5 atm or greater, such as 10 atm or greater, such as 25 atm or greater, including 50 atm or greater.

In some embodiments, the systems of the invention may include a control station, configured to control the amount of the carbon dioxide and/or the amount of alkaline earth metal ions conveyed to the precipitator or the charger; the amount of the precipitate conveyed to the separator; the amount of the precipitate conveyed to the drying station; and/or the amount of the precipitate conveyed to the refining station. A control station may include a set of valves or multi-valve systems which are manually, mechanically or digitally controlled, or may employ any other convenient flow regulator protocol. In some instances, the control station may include a computer interface, (where regulation is computer-assisted or is entirely controlled by computer) configured to provide a user with input and output parameters to control the amount, as described above.

As indicated above, the system may be present on land or sea. For example, the system may be a land based system that is in a coastal region, e.g., close to a source of sea water, or even an interior location, where water is piped into the system from a salt water source, e.g., ocean. Alternatively, the system may be a water based system, e.g., a system that is present on or in water. Such a system may be present on a boat, ocean based platform etc., as desired.

It is to be understood that the methods and the systems depicted in the figures are in no way limiting to the scope of the invention. One or more the steps in the methods may be skipped or the order of the steps may be altered to make the products and compositions of the invention. Similarly, one or more of the components in the systems may be avoided to make the products and compositions of the invention. For example, the source of divalent cation may already be present in the reactor when the $CO_2$ source is added to the reactor, or vice versa.

In certain embodiments, a system is employed to perform the above methods. Following production of the carbonate additive, as described above, the carbonate additive is then employed to produce a non-cementitious composition of the invention, as described herein.

IV. Utility

Compositions of the invention find use in a variety of different applications, as reviewed above. The subject methods and systems find use in $CO_2$ sequestration, particularly via sequestration in a variety of diverse man-made products.

The $CO_2$ sequestering includes the removal or segregation of $CO_2$ from a gaseous stream, such as a gaseous waste stream, and fixating it into a stable non-gaseous form so that the $CO_2$ cannot escape into the atmosphere. The $CO_2$ sequestration includes the placement of $CO_2$ into a storage stable form, where the $CO_2$ is fixed at least during the useful life of the composition. As such, sequestering of $CO_2$ according to methods of the invention results in prevention of $CO_2$ gas from entering the atmosphere and long term storage of $CO_2$ in a manner that $CO_2$ does not become part of the atmosphere.

V. Packages

In one aspect, there is provided a package including the composition of the invention. In some embodiments, there is provided a package including a non-cementitious composition formed from the carbonate additive of the invention. In some embodiments, there is provided a package including a non-cementitious product formed from the carbonate additive of the invention. The package further includes a packaging material that is adapted to contain the composition or the products made from the compositions. The package may contain one or more of such packaging materials. The packaging material includes, but is not limited to, metal container; sacks; bags such as, but not limited to, paper bags or plastic bags; boxes; silo such as, but not limited to, tower silo, bunker silo, bag silo, low level mobile silo, or static upright silo; and bins. It is understood that any container that can be used for carrying or storing the composition or the products made from the compositions of the invention is well within the scope of the invention. In some embodiments, these packages are portable. In some embodiments, these packages and/or packaging materials are disposable or recyclable. The packaging material are further adapted to store and/or preserve the composition or the products made from the compositions of the invention for longer than few months to few years. In some embodiments, the packaging materials are further adapted to store and/or preserve the composition or the products made from the compositions of the invention for longer than 1 week, or longer than 1 month, or longer than 2 months, or longer than 5 months, or longer than 1 year, or longer than 2 years, or longer than 5 years, or longer than 10 years, or between 1 week to 1 year, or between 1 month to 1 year, or between 1 month to 5 years, or between 1 week to 10 years.

The following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g. amounts, temperature, etc.) but some experimental errors and deviations should be accounted for. Unless indicated otherwise, parts are parts by weight, molecular weight is weight average molecular weight, temperature is in degrees Centigrade, and pressure is at or near atmospheric.

In the examples and elsewhere, abbreviations have the following meanings

| | |
|---|---|
| g = | gram |
| gsm = | grams/meter square |
| $g/cm^3$ = | gram per centimeter cube |
| kN/M = | kilonewton/meter |
| KPa = | kilopascal |
| $KPa*m^2/g$ = | kilopascal*meter square/gram |

-continued

| | |
|---|---|
| L = | liter |
| M = | molar |
| mg = | milligram |
| mg/g = | milligram/gram |
| min. = | minute |
| ml = | milliliter |
| mm = | millimeter |
| mM = | millimole |
| μm or um = | micrometer |
| mN = | millinewton |
| mNm$^2$/g = | millinewton*meter square/gram |
| MPa = | megapascal |
| N*m/g = | Newton*meter/gram |
| ppm = | parts per million |
| psi = | pounds per square inch |
| RH = | relative humidity |
| S = | seconds |
| S/100 ml air = | sec req'd for 100 mL of air to pass through pores |
| w/v = | weight/volume |
| w/w = | weight/weight |

EXAMPLES

Example 1

Making Paper from Reactive Vaterite Composition and Transformation to Aragonite in Paper This experiment illustrates recrystallization of the reactive vaterite to aragonite in a cellulose fiber matrix. The transformation of the reactive vaterite to aragonite improved the mechanical properties of the paper. The increase in the allowable loading level of reactive vaterite in the cellulosic fiber can offset the use of expensive and environmentally unfriendly wood based cellulose pulp.

The reactive vaterite material was formed by diluting concentrated $CaCl_2$ to 0.319 mol/L and subsequently $Na_2SO_4$ was dissolved to a concentration of 0.0061 mol/L in the hard brine solution. An alkaline brine was prepared by absorbing $CO_2$ into a 1.382 mol/L NaOH solution, until the pH was between 10-11. The two solutions were mixed flowed into a mixed tank at rates of 8.17 gpm of hard brine solution and 3.88 gpm of alkaline solution. The precipitated slurry was pumped out of the bottom of the tank at a rate that maintained a constant volume of 70 gallons in the tank (average liquid residence time in the tank was 5.8 min). The slurry was allowed to gravity settle, while continuously decanting. The concentrated slurry was then filter pressed and subsequently dried in a swirl fluidized dryer. The dry composition showed properties shown in Table 1. The particle size distribution was determined by a static light scattering technique and the mineralogy analysis of the composition was determined by powder x-ray diffraction, and quantified using Rietveld refinement.

Other materials used: Northern Hardwood Pulp; Northern Softwood Pulp—both dried and never dried (slurry).

In one experiment, the pulps were prepared for the formation of paper hand sheets according to TAPPI standard method T218. The reactive vaterite material was then added at final weight % of 0.5, 2, 8, 25, 32, 45, 50, 60, and 75. The prepared pulp was then vacuum filtered to form a sheet, pressed at 350 kPa for 2 min, and was subjected to a variety of curing temperatures and humidity levels: 25° C., 40° C., 60° C., 130° C., and 15% RH-100% RH (relative humidity). Curing times at these temperatures and humidity levels were 5 min, 30 min, 1 hour, 3 hours, 8 hours, 24 hours, and 72 hours.

In a second experiment, in addition to controls with deionized water, paper pulps were made with between 0 and 10 wt % $MgCl_2$. Dry powders were also pretreated before combining with cellulose by rinsing with a 1.4M $Na_2CO_3$ solution, rendering the surface of the particle with a negative charge, and following with a 0.5M $MgCl_2$ solution to adsorb positive magnesium ions to the negatively charged surface. The pretreated solids were then combined with deionized water during the above mentioned pulping process and then cured and tested under the various temperatures and humidity levels.

To achieve a wet environment that facilitated the transformation above the boiling point of water, a pressure vessel was used (Humbolt Boekel Autoclave H-3240). By heating the water to induce steam, then closing the vessel to increase pressure, further heat energy entered the system as a temperature increase rather than vaporization of the excess water.

At high loading levels of reactive vaterite in the pulp composite system (32-75 wt %) with a source of magnesium (from either the pulping solution or from a pretreatment of the dry powder), conversion was achieved to aragonite—bridging fibers of cellulose together. Similar compositions can be made with lower loading of the reactive vaterite composition such as 5-30 wt % of the reactive vaterite composition in the non-cementitious composition.

Figure 4:
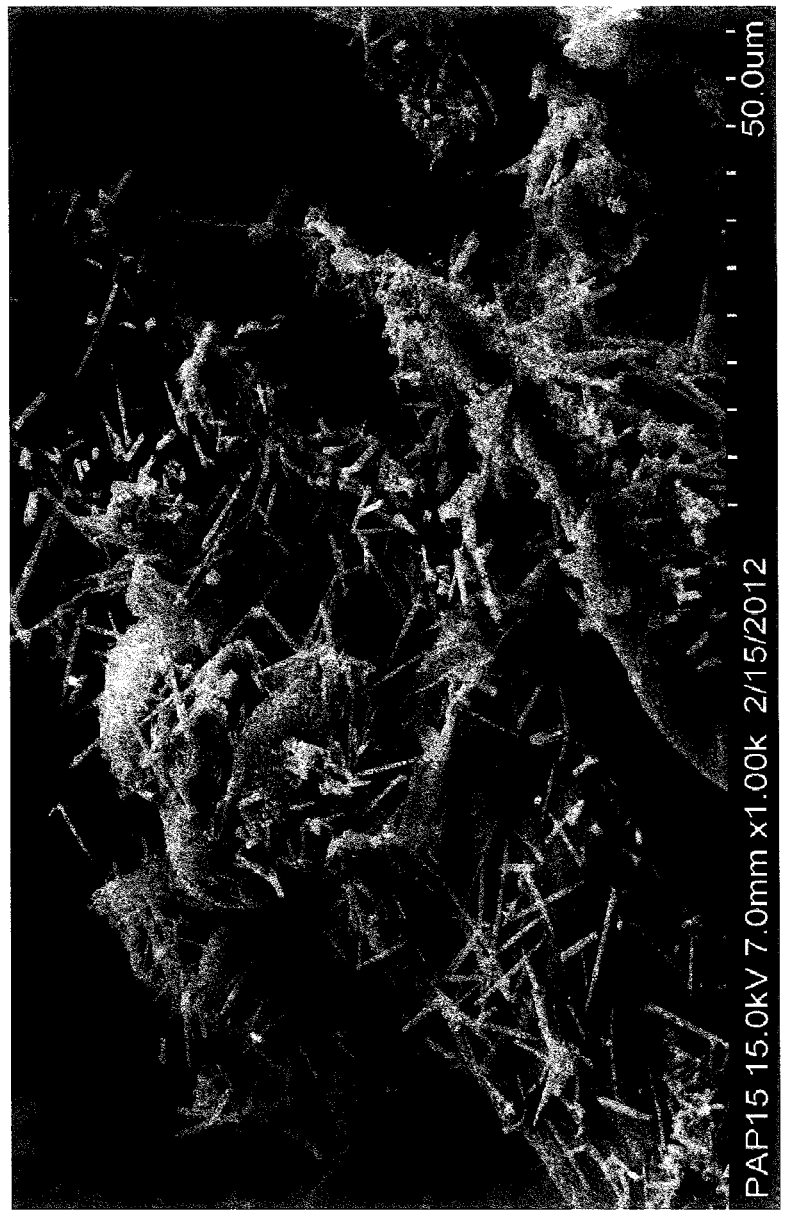
FIG. 4 illustrates vaterite to aragonite formation in the paper product, as described in Example 1.

It is contemplated that this effect may result in a greater binding between the cellulose fibers and the carbonate reactive vaterite, increasing the tensile, burst, and tear strength of the resultant paper and allow for the higher loading to achieve the transformation. The aragonite—vaterite—pulp system is illustrated in FIG. 4 which illustrates the binding of the carbonate particles to the fiber as a result of the transformation of the vaterite to aragonite. Transformation in this sample was done at a relatively slow kinetic rate in a 60° C. at 95% humidity chamber that required three days to transform to aragonite. Paper sample contained 75 wt % reactive vaterite and was cured in a humidity chamber at 60° C., 95% relative humidity for three days.

To increase the rate of transformation from three day time period and enhance the paper making process, the effects of increased temperature, specifically above the boiling point of water were studied. It was found that transformation fully occurred within three hours of treatment at 130° C., 100%

TABLE 1

Figure 5:
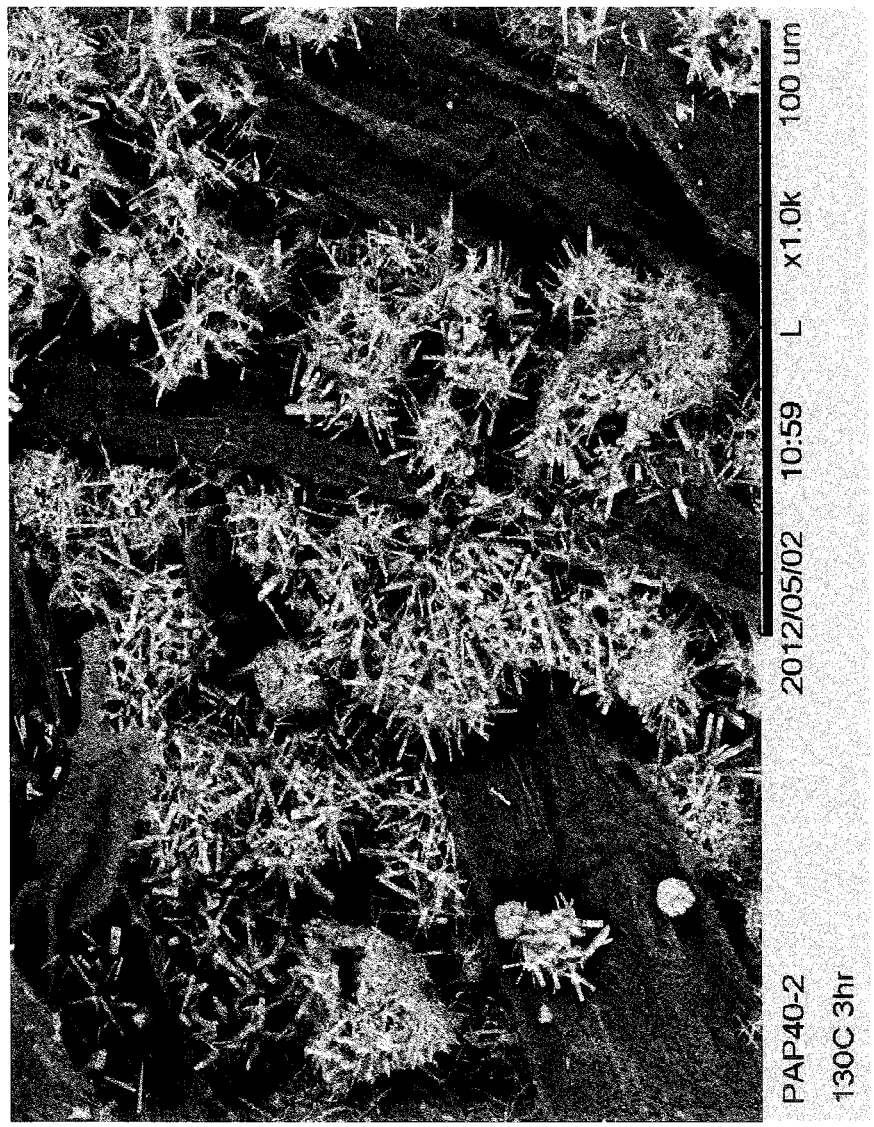
FIG. 5 illustrates vaterite to aragonite formation in the paper product, as described in Example 1.

| Process Conditions | | | | Resulting Material Characteristics | | | | |
|---|---|---|---|---|---|---|---|---|
| | | | | PSA | | | | |
| [Ca] | [CO$_3$] | Ca:CO$_3$ | Na$_2$SO$_4$ | mean | PSA SD | % Vat | % Cal | % Arag |
| 0.319M | 0.651M | 1.05:1 | 0.0061M | 22.0 um | 8.75 um | 79 | 21 | 0 | humidity, when the carbonate material tested was either combined with paper in a solution of 1.5 wt % MgCl₂ or pre-rinsed with negatively charged 1.4 molar sodium carbonate solution and then magnesium ions were adsorbed to the surface from a 0.5 molar MgCl₂ solution. FIG. 5 illustrates vaterite particles that transformed into an aragonite web and were attached to cellulose fibers. Paper sample contained 60wt % reactive vaterite that was pretreated with a 1.4M Na₂CO₃ rinse followed by a 0.5M MgCl₂ rinse, then combined with cellulose pulp and DI water at 0.5% solids. The paper was then treated at 130° C., 100% relative humidity for three hours.

Example 2

Preparation of Vaterite Material by Carbonation of Hydrated Lime

Mine high purity calcium carbonate rock. Crush the rocks to the particle size needed for processing—small stones or powder. Separate some of the impurities from the crushed rock. Calcine (heat) in a kiln to 1850° F., which takes the calcium carbonate apart, forming lime (CaO) and carbon dioxide gas (CO₂). The carbon dioxide can be captured for reuse.

$$CaCO_3 + Heat \rightarrow CaO + CO_2 \uparrow$$

Add the lime to water to form calcium hydroxide (hydrated lime or slake).

$$CaO + H_2O \rightarrow Ca(OH)_2$$

Separate out additional impurities from the slaked lime. Combine the captured carbon dioxide with the slaked lime. Calcium carbonate reforms, and since it is insoluble in water, precipitates out. The calcium carbonate is a reactive vaterite or the calcium carbonate formed is activated to form reactive vaterite.

$$Ca(OH)_2 + CO_2 \rightarrow CaCO_3 \downarrow + H_2O$$

Separate additional impurities and grit from the PCC slurry. If the PCC is to be used in a paper mill or shipped to a latex paint plant, the lower solids slurry may be used as is, or processed to bring up the solids level, then tested before transfer or shipment. If the PCC is to be used as a dry product, the slurry is dewatered, dried, milled, packaged and tested.

Example 3

Transformation of Reactive Vaterite to Aragonite in Paper at High PSA and High % Mass Loading In this study, nine handsheets were formed according to a method adapted from TAPPI 218 with 4g of pulp disintegrated for two minutes at the highest speed setting. The vaterite composition was prepared as described in the method in Example 1. The XRD of the vaterite precipitate showed 79% vaterite and 21% calcite. The PSA showed a distribution with a mean of 22.0 um and a standard deviation of 8.75 um.

The vaterite composition was added to the pulp and was mixed for 30 seconds to evenly disperse throughout the fibers. Then the pulp slurry was diluted to 1000 ml using same liquid as mixed (~0.5% solids) and filtered through a Whatman 1 filter paper under vacuum. When three of these sheets were prepared, they were transferred to smooth metal plates, sandwiched with paper towels and pressed for two minutes at approximately 350 kPa. All formed sheets were then dried at 40° C. overnight before any further treatment occurred.

Samples of sheets were subjected to 130° C. in the autoclave for 30 min-3 hrs. For every sample cured in the autoclave, a sample was set aside to dry at room temperature, and two samples were set into the humidity chamber (60° C., 95% RH) for periods of 3 hrs, 3 days, and 7 days.

TABLE 2

| % Mass Loading of vaterite PCC in pulp | Temp. in ° C. | Cure Time (hrs) | Process Treatment | % Vaterite | % Calcite | % Aragonite |
|---|---|---|---|---|---|---|
| 60 | 130 | 3 | 1.5% MgCl₂ in pulp | 3.8 | 26.7 | 69.6 |
| 60 | 130 | 3 | Mg prerinse | 0 | 22.4 | 77.6 |
| 60 | 130 | 0.5 | 1.5% MgCl₂ in pulp | 30.1 | 23.4 | 46.6 |
| 60 | 130 | 0.5 | Mg prerinse | 3.9 | 22.2 | 73.9 |
| 60 | 60 | 3 | 1.5% MgCl₂ in pulp | 74.6 | 25.4 | 0 |
| 60 | 60 | 3 | Mg prerinse | 62.6 | 19.8 | 17.6 |

As illustrated in Table 2, it was observed that an increase in temperature from 60 to 130° C. increased transformation rate of vaterite to aragonite. It was also observed that at high temperature and pressure, the conversion time of vaterite to aragonite could be reduced to between 30 minutes to 3 hours for complete conversion as compared to a period of 3-7 days.

Example 3

Transformation of Reactive Vaterite to Aragonite in Paper at Low PSA and Low % Mass Loading In this study, the reactive material was formed with a low PSA of 2 um. The reactive and small vaterite after transformation demonstrated an interconnected network of aragonitic needles, wrapping around the fibers, filling in the spaces between overlapping fibers and bridging gaps between fibers connected to the much smaller fibrils. The 2um material was loaded in the paper between 15 wt % and 45 wt %.

The vaterite material was prepared as described in the method in Example 1. The dry composition showed properties shown in Table 3. The particle size distribution was determined by a static light scattering technique and the mineralogy analysis of the composition was determined by powder x-ray diffraction, and quantified using Rietveld refinement.

TABLE 3

| Process Conditions | | | | | Resulting Material Characteristics | | | |
|---|---|---|---|---|---|---|---|---|
| [Ca] | [CO₃] | Ca:CO₃ | Na₂SO₄ | MgCl₂ | PSA mean | % Vat | % Cal | % Arag |
| 0.37M | 1.4M | 1.04:1 | 6 mM | 8 mM | 2.0 um | 95 | 5 | 0 |

In the experiment, the pulps and the paper hand sheets were prepared according to TAPPI standard method T205 with the vaterite material at 25% weight. One set of hand sheets were cured in 0.25M $Mg^{2+}$ and 0.25M $Sr^{2+}$ solution when the reactive vaterite transformed to aragonite completely. One set of hand sheets were cured in 0.25M $Mg^{2+}$ solution when the vaterite stayed stable and did not transform to aragonite. The curing was done at 60° C., 95% relative humidity for 24 hours. The cured sheets with aragonite showed a 10.9% increase in tear strength index and a 4.8% increase in burst strength index as compared to the cured sheet with stable vaterite. However, the cured sheets showed a 3.2% decrease in the tensile strength index.

It is contemplated that if the sheets are rinsed after the curing step, then some or all the evaporite may be removed from the sheets resulting in less weight of the sheet. Since the burst strength index, tensile strength index, and the tear strength index are based on the basis weight of the sheet (as shown in the formulas below), the resulting numbers would vary.

Burst Strength Index=[6.89(conversion factor)×burst pressure measured (psi)]/Basis Weight (gsm) =kPa*m^2/g Tensile Strength Index=[measured Tensile force (KN/m)/Basis Weight (gsm)]×1000=N*m/g Tear Strength Index=[measured Tear force (mN)/Basis Weight (gsm)]=mN*m^2/g Therefore, considering the weight of the sheet before curing (which would be close to the weight of the sheet after curing and rinsing), there is a 22.2% increase in the burst strength index, a 12.2% increase in the tensile strength index, and a 28.4% increase in the tear strength index for the cured sheets with aragonite.

Example 4

Comparison of Traditional PCC with 2 Micron Stable Vaterite for Paper

A study was conducted to compare characteristic paper properties with the addition of precipitated calcium carbonate of the invention containing stable vaterite (vaterite that does not transform to aragonite) to that of a traditionally used PCC. The PCC containing vaterite may be used as a filler or coating pigment to improve the optical properties of the paper. The precipitated calcium carbonate of the invention containing vaterite, was prepared as described in Example 1. The precipitate contained 98.8% vaterite and 1.2% calcite. The PSA of the precipitate showed a distribution with a mean of 2.3 um and a standard deviation of 0.8 um.

Handsheets were prepared that were a blend of hardwood and softwood Kraft pulp which is a standard furnish used for copy paper. All handsheets were created from a blend of 85% hardwood pulp and 15% softwood pulp and refined to a freeness of 305 ml. The hardwood and softwood pulps were procured from the New Page Wisconsin Rapids mill. Six sets of handsheets were prepared consisting of a set at 5%, 10%, and 15% PCC by weight using two different PCC samples (vaterite containing calcium carbonate of the invention and Control). The control PCC was Albacar 5970 produced by Specialty Minerals. Nalco Core Shell 61067 was used as a retention aid package to help retain the PCC. The dosage rate used was in the 0.1% range.

The handsheets were produced in accordance with TAPPI standard T205. Handsheets were tested for: basis weight, caliper, density, tear, tensile, and burst following TAPPI standard T220. Table 4 below shows the results of the tests for the control samples i.e. Albacar 5970 (C5, C10, and C15) and for vaterite containing composition of the invention (T5, T10, and T15).

TABLE 4

| | | Hand Sheet Properties T220 | | | |
|---|---|---|---|---|---|
| Set | PCC % | Sheet weight g | Basis weight gsm | Caliper 0.001" | Density g/cm³ |
| C5 | 5 | 1.27 | 58.85 | 3.93 | 0.61 |
| C10 | 10 | 1.27 | 58.30 | 4.02 | 0.59 |
| C15 | 15 | 1.21 | 60.10 | 3.89 | 0.63 |
| T5 | 5 | 1.26 | 60.20 | 3.98 | 0.62 |
| T10 | 10 | 1.24 | 60.90 | 4.03 | 0.62 |
| T15 | 15 | 1.21 | 60.90 | 3.98 | 0.62 |

The remaining testing was also performed and the TAPPI standard number followed the test indicated: Porosity (T460), Castor Oil Penetration (T462), and Water Soluble Chlorides. Chlorides were extracted using the methods in TAPPI standard T256, but the chlorides were analyzed by EPA method 4500 CL E. Samples from each set were also ashed to compare the amount of PCC retained in the sample. Tables 5-8 show comparison of the various properties of the hand sheets (shown in Table 4) prepared with the stable vaterite of the invention compared to traditional PCC. The stable vaterite containing PCC of the invention performed equally well as the Albacar for all of the physical and optical testing results. As shown in Example 3 above, the reactive vaterite composition shows improved performance in the paper product as compared to the stable vaterite, which, as shown in this example, shows equally well performance compared to traditional PCC, it is contemplated that the reactive vaterite composition will show improved performance as compared to the traditional PCC.

Table 5 shows data comparison related to burst strength and tensile strength.

TABLE 5

| | Hand Sheet Properties T220 | | | | | Bursting strength T220 | | Tensile strength T220 | |
|---|---|---|---|---|---|---|---|---|---|
| Set | PCC % | Sheet weight g | Basis weight gsm | Caliper 0.001" | Density g/cm³ | Burst psi | Burst index KPa * m²/g | Tensile kN/M | Tensile index N * m/g |
| C5 | 5 | 1.27 | 58.85 | 3.93 | 0.61 | 19.19 | 2.25 | 3.25 | 55.18 |
| C10 | 10 | 1.27 | 58.30 | 4.02 | 0.59 | 16.33 | 1.93 | 2.93 | 50.20 |
| C15 | 15 | 1.21 | 60.10 | 3.89 | 0.63 | 13.15 | 1.51 | 2.30 | 38.24 |
| T5 | 5 | 1.26 | 60.20 | 3.98 | 0.62 | 22.12 | 2.53 | 3.51 | 58.30 |
| T10 | 10 | 1.24 | 60.90 | 4.03 | 0.62 | 17.54 | 1.98 | 2.96 | 48.66 |
| T15 | 15 | 1.21 | 60.90 | 3.98 | 0.62 | 14.22 | 1.61 | 2.50 | 40.97 |

Table 6 shows data comparison related to tear resistance, air resistance (porosity), castor oil penetration.

TABLE 6

| Hand Sheet Properties T220 | | Tear resistance T220 | | Air resistance T460 | Castor oil penetration T462 | |
|---|---|---|---|---|---|---|
| Set | PCC % | Tear mN | Tear index mN * m²/g | Porosity S/100 ml air | Time s | Diameter mm |
| C5 | 5 | 421.6 | 7.16 | 5.97 | 15.88 | 8.1 |
| C10 | 10 | 409.2 | 7.02 | 4.92 | 16.04 | 8.1 |
| C15 | 15 | 350.9 | 5.84 | 4.28 | 16.18 | 8.5 |
| T5 | 5 | 423.0 | 7.03 | 5.53 | 14.89 | 8.2 |
| T10 | 10 | 391.7 | 6.43 | 6.30 | 16.48 | 8.4 |
| T15 | 15 | 335.9 | 5.52 | 4.85 | 16.95 | 8.3 |

Table 7 shows data comparison related to water soluble chloride in pulp and the amount of PCC retained in the ashed sample.

TABLE 7

| Hand Sheet Properties T220 | | | |
|---|---|---|---|
| Set | PCC % | Chloride mg/g | Ash % |
| C5 | 5 | 0.03 | 3.94 |
| C10 | 10 | 0.034 | 8.81 |
| C15 | 15 | 0.05 | 14.26 |
| T5 | 5 | 0.071 | 3.38 |
| T10 | 10 | 0.113 | 10.81 |
| T15 | 15 | 0.221 | 15.43 |

Table 8 shows data comparison related to brightness and opacity for the sheets made with albacar (C5, C10, and C15), sheets made with vaterite containing compositions (T5, T10, T15), for powder albacar and for powder form of the vaterite containing composition ($CaCO_3$).

TABLE 8

| Hand Sheet Properties T220 | | TAPPI Opacity (%) | | | | | TAPPI Brightness (%) | | | | |
|---|---|---|---|---|---|---|---|---|---|---|---|
| Set | PCC | Average | Std dev | Max | Min | n = | Average | Std dev | Max | Min | n = |
| C5 | 5 | 82.3 | 0.71 | 83.5 | 80.4 | 10 | 86.6 | 0.2 | 86.7 | 86.3 | 5 |
| C10 | 10 | 85.7 | 0.71 | 86.5 | 84.7 | 10 | 87.7 | 0.2 | 88 | 87.5 | 5 |
| C15 | 15 | 85.3 | 1.22 | 87 | 83.2 | 10 | 88.2 | 0.21 | 88.5 | 88 | 5 |
| T5 | 5 | 81.8 | 0.95 | 83.5 | 78.9 | 10 | 85.3 | 0.12 | 85.4 | 85.1 | 5 |
| T10 | 10 | 82.2 | 0.65 | 83.3 | 81.3 | 10 | 86.8 | 0.27 | 87.2 | 86.5 | 5 |
| T15 | 15 | 84.3 | 0.57 | 85.2 | 83.2 | 10 | 87.6 | 0.2 | 87.9 | 87.4 | 5 |
| Albacar | | | | | | | 94.6 | 0.03 | 94.6 | 94.6 | 15 |
| $CaCO_3$ | | | | | | | 94.6 | 0.01 | 94.6 | 94.6 | 15 |

Example 5

Measurement of $\delta^{13}C$ Value for Precipitation Material

In this experiment, carbonate-containing precipitation material is prepared using a mixture of bottled sulfur dioxide ($SO_2$) and bottled carbon dioxide ($CO_2$) gases, NaOH as a source of alkalinity, and calcium chloride as a source of divalent cations. The procedure is conducted in a closed container. The starting materials are a mixture of commercially available bottled $SO_2$ and $CO_2$ gas ($SO_2/CO_2$ gas or "simulated flue gas"). A container is filled with de-ionized water. Sodium hydroxide and calcium chloride are added to it providing a pH (alkaline) and divalent cation concentration suitable for precipitation of carbonate-containing precipitation material containing vaterite without releasing $CO_2$ into the atmosphere. $SO_2/CO_2$ gas is sparged at a rate and time suitable to precipitate precipitation material from the alkaline solution. Sufficient time is allowed for interaction of the components of the reaction, after which the precipitation material is separated from the remaining solution ("precipitation reaction mixture"), resulting in wet precipitation material and supernatant.

The $\delta^{13}C$ values for the process starting materials, precipitation material, and supernatant are measured. The analytical system used is manufactured by Los Gatos Research and uses direct absorption spectroscopy to provide $\delta^{13}C$ and concentration data for dry gases ranging from 2% to 20% $CO_2$. The instrument is calibrated using standard 5% $CO_2$ gases with known isotopic composition, and measurements of $CO_2$ evolved from samples of travertine and IAEA marble #20 digested in 2M perchloric acid yield values that are within acceptable measurement error of the values found in literature. The $CO_2$ source gas is sampled using a syringe. The $CO_2$ gas is passed through a gas dryer (Perma Pure MD Gas Dryer, Model MD-110-48F-4 made of Nafion 0 polymer), then into the bench-top commercially available carbon isotope analytical system. Solid samples are first digested with heated perchloric acid (2M $HClO_4$). $CO_2$ gas is evolved from the closed digestion system, and then passed into the gas dryer. From there, the gas is collected and injected into the analysis system, resulting in $\delta^{13}C$ data. Similarly, the supernatant is digested to evolve $CO_2$ gas that is then dried and passed to the analysis instrument resulting in $\delta^{13}C$ data.

The $\delta^{13}C$ values for the precipitation material are found to be less than −12‰. This Example illustrates that $\delta^{13}C$ values can be used to confirm the primary source of carbon in a carbonate-containing precipitation material.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method for producing a non-cementitious product, the method comprising:
    a) producing a carbonate additive, wherein the carbonate additive comprises reactive vaterite;
    b) mixing the carbonate additive with a non-cementitious additive; and
    c) transforming the reactive vaterite to aragonite and producing a non-cementitious product wherein the non-cementitious additive is a cellulosic fiber or polymeric fiber to make a paper product.

2. The method of claim 1, comprising making the non-cementitious product comprising at least 50% w/w aragonitic carbonate additive.

3. The method of claim 1, wherein producing the carbonate additive comprises contacting $CO_2$ with a proton removing agent to form a solution; and contacting the solution with water comprising alkaline earth-metal ions under one or more precipitation conditions to make the carbonate additive comprising reactive vaterite.

4. The method of claim 3, wherein the alkaline earth-metal ions comprise calcium ions, magnesium ions, or combination thereof.

5. The method of claim 4, wherein the $CO_2$ is contacted with carbide lime solution wherein the carbide lime solution provides both the proton removing agent and the calcium ions.

6. The method of claim 3, wherein the one or more precipitation conditions are selected from temperature, pH, pressure, ion ratio, precipitation rate, presence of additive, presence of ionic species, concentration of additive and ionic species, stirring, residence time, mixing rate, forms of agitation, presence of seed crystal, catalyst, membrane, or substrate, dewatering, drying, ball milling, and combinations thereof.

7. The method of claim 1, wherein the carbonate additive comprising reactive vaterite is transformed to aragonite in situ to form paper product.

8. The method of claim 1, further comprising activating the reactive vaterite to facilitate transformation of the reactive vaterite to aragonite during, or after step b) by nuclei activation, thermal activation, mechanical activation, chemical activation, or combinations thereof.

9. The method of claim 8, wherein the activation comprises adding one or more of aragonite seed, inorganic additive or organic additive.

10. The method of claim 1, comprising adding one or more of inorganic additives selected from beryllium, magnesium, strontium, barium, and combinations thereof, to the carbonate additive during, and/or after step b) to facilitate transformation of the reactive vaterite to the aragonite.

11. The method of claim 10, wherein the formation of the aragonite results in one or more of properties selected from better linkage or bonding, higher tensile strength, higher burst strength, higher tear strength, higher impact fracture toughness, and combinations thereof of the non-cementitious product as compared to the non-cementitious product comprising stable vaterite.

12. The method of claim 10, wherein amount of the one or more inorganic additives in the added solution is between 0.05-0.5M.

13. The method of claim 1, wherein producing the carbonate additive comprises calcining limestone to form calcium oxide, forming hydrated lime from the calcium oxide, and treating the hydrated lime with $CO_2$ to form the carbonate additive comprising reactive vaterite.

* * * * *